US012531940B2

(12) United States Patent
Su et al.

(10) Patent No.: US 12,531,940 B2
(45) Date of Patent: Jan. 20, 2026

(54) FOLDABLE MECHANISM AND FOLDABLE TERMINAL

(71) Applicant: Honor Device Co., Ltd., Shenzhen (CN)

(72) Inventors: Shuai Su, Shenzhen (CN); Ruihao Chen, Shenzhen (CN); Changfu Dong, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 314 days.

(21) Appl. No.: 18/256,483

(22) PCT Filed: Dec. 29, 2022

(86) PCT No.: PCT/CN2022/143223
§ 371 (c)(1),
(2) Date: Jun. 8, 2023

(87) PCT Pub. No.: WO2023/185163
PCT Pub. Date: Oct. 5, 2023

(65) Prior Publication Data
US 2024/0380829 A1 Nov. 14, 2024

(30) Foreign Application Priority Data
Mar. 31, 2022 (CN) .......................... 202210336321.3

(51) Int. Cl.
*H04M 1/02* (2006.01)
(52) U.S. Cl.
CPC ......... *H04M 1/022* (2013.01); *H04M 1/0235* (2013.01)

(58) Field of Classification Search
CPC .. H04M 1/022; H04M 1/0235; H04M 1/0268; H04M 1/0216; G06F 1/1652; G06F 1/1681
See application file for complete search history.

(56) References Cited

U.S. PATENT DOCUMENTS

| 2022/0303371 A1* | 9/2022 | Liao ................... H04M 1/0216 |
| 2023/0164253 A1 | 5/2023 | Zhengyi et al. |
| 2024/0094785 A1 | 3/2024 | Cheng et al. |

FOREIGN PATENT DOCUMENTS

| CN | 207601679 U | 7/2018 |
| CN | 208421694 U | 1/2019 |
| CN | 113067924 A | 7/2021 |
| CN | 113194183 A | 7/2021 |
| CN | 113542456 A | 10/2021 |
| CN | 114006962 A | 2/2022 |

(Continued)

*Primary Examiner* — Angelica Perez
(74) *Attorney, Agent, or Firm* — Conley Rose, P.C.

(57) ABSTRACT

A foldable mechanism and a foldable terminal. The foldable mechanism includes a base, a connection assembly, and a floating plate. The connection assembly includes a first fixed frame and a first secondary swing arm. A first sliding portion of the first secondary swing arm is slidably connected to the first fixed frame, and a first rotating portion of the first secondary swing arm is rotatably connected to the base. A first connecting portion of the floating plate is slidably and rotatably connected to a first auxiliary portion. In the foldable mechanism, the floating plate can realize floating or sinking relative to the base under the driving of the first secondary swing arm.

20 Claims, 29 Drawing Sheets

(56) References Cited

FOREIGN PATENT DOCUMENTS

| | | | |
|---|---|---|---|
| CN | 114079683 | * | 2/2022 |
| CN | 114079683 | A | 2/2022 |
| CN | 113795683 | B | 12/2022 |
| KR | 101487189 | B1 | 1/2015 |
| WO | 2021115462 | A1 | 6/2021 |

* cited by examiner and# FOLDABLE MECHANISM AND FOLDABLE TERMINAL

CROSS-REFERENCE TO RELATED APPLICATIONS

This application is a U.S. National Stage of International Application No. PCT/CN2022/143223 filed on Dec. 29, 2022, which claims priority to Chinese Patent Application No. 202210336321.3, filed with the Chinese Patent Office on Mar. 31, 2022, both of which are incorporated herein by reference in their entireties.

TECHNICAL FIELD

This application relates to the technical field of foldable terminals, and in particular, to a foldable mechanism and a foldable terminal.

BACKGROUND

With the development of science and technology, the era of a large-screen intelligent terminal is approaching, and a foldable terminal is favored by a user because of advantages such as a large screen and easy-to-carry. Currently, the foldable terminal generally implements folding and unfolding by using a foldable mechanism. However, an existing foldable mechanism often requires a large number of parts to implement folding and unfolding, resulting in a complex structure of the foldable mechanism, which is not conducive to lightweight design of the foldable terminal.

SUMMARY

This application provides a foldable mechanism and a foldable terminal to simplify a structure of the foldable mechanism and implement lightweight design of the foldable terminal.

According to a first aspect, this application provides a foldable mechanism, including a base, a connection assembly, and a floating plate, the connection assembly being mounted on the base, the floating plate being located on a top side of the base. The connection assembly includes a first fixed frame and a first secondary swing arm. The first secondary swing arm includes a first sliding portion, a first rotating portion, and a first auxiliary portion, the first rotating portion being fixedly connected between the first sliding portion and the first auxiliary portion. The first sliding portion is slidably connected to the first fixed frame, and the first rotating portion is rotatably connected to the base. The floating plate includes a first connecting portion, the first connecting portion being slidably and rotatably connected to the first auxiliary portion.

During unfolding of the foldable mechanism, for example, during switching of the foldable mechanism from a folded state to a flattened state, the first auxiliary portion slides and rotates relative to the first sliding portion to drive the floating plate to float relative to the base.

During folding of the foldable mechanism, for example, during switching of the foldable mechanism from the flattened state to the folded state, the first auxiliary portion slides and rotates relative to the first sliding portion to drive the floating plate to sink relative to the base.

In the foldable mechanism shown in this application, floating or sinking of the floating plate relative to the base is realized by using the first connecting portion of the floating plate to cooperate with the first auxiliary portion of the first secondary swing arm. In other words, the floating plate can realize floating or sinking relative to the base under the driving of the first secondary swing arm. The floating plate does not need to be assembled with the base by using a structural member such as a spring, which simplifies an overall structure of the foldable mechanism and is conducive to realizing the lightweight design of the foldable terminal.

In an implementation, the first auxiliary portion is provided with a first auxiliary groove, the first auxiliary groove having a folded position and a flattened position, the folded position of the first auxiliary groove being located on a top side of the flattened position of the first auxiliary groove. The folded position of the first auxiliary groove is located on a top side of the first auxiliary groove, and the flattened position of the first auxiliary groove is located on a bottom side of the first auxiliary groove.

The first connecting portion includes a first pin, the first pin being mounted in the first auxiliary groove and slidable and rotatable relative to the first auxiliary portion in the first auxiliary groove, so as to realize a slidable and rotatable connection between the first connecting portion and the first auxiliary portion.

When the foldable mechanism is in a folded state, the connection assembly is in the folded state, and the first pin is located at the folded position of the first auxiliary groove.

When the foldable mechanism is in a flattened state, the connection assembly is in the flattened state, and the first pin is located at the flattened position of the first auxiliary groove.

When the foldable mechanism switches from the folded state to the flattened state, the first pin slides from the folded position of the first auxiliary groove to the flattened position of the first auxiliary groove.

When the foldable mechanism switches from the flattened state to the folded state, the first pin slides from the flattened position of the first auxiliary groove to the folded position of the first auxiliary groove.

In another implementation, the first connecting portion is provided with a first auxiliary groove, the first auxiliary groove having a folded position and a flattened position, the folded position of the first auxiliary groove being located on a bottom side of the flattened position of the first auxiliary groove. The folded position of the first auxiliary groove is located on a bottom side of the first auxiliary groove, and the flattened position of the first auxiliary groove is located on a top side of the first auxiliary groove.

The first auxiliary portion includes a first pin, the first pin being mounted in the first auxiliary groove and slidable and rotatable relative to the first connecting portion in the first auxiliary groove, so as to realize a slidable and rotatable connection between the first connecting portion and the first auxiliary portion.

When the foldable mechanism is in a folded state, the connection assembly is in the folded state, and the first pin is located at the folded position of the first auxiliary groove.

When the foldable mechanism is in a flattened state, the connection assembly is in the flattened state, and the first pin is located at the flattened position of the first auxiliary groove.

When the foldable mechanism switches from the folded state to the flattened state, the first pin slides from the folded position of the first auxiliary groove to the flattened position of the first auxiliary groove.

When the foldable mechanism switches from the flattened state to the folded state, the first pin slides from the flattened position of the first auxiliary groove to the folded position of the first auxiliary groove.

In an implementation, the connection assembly of the foldable mechanism further includes a second fixed frame and a second secondary swing arm. The second secondary swing arm includes a second sliding portion, a second rotating portion, and a second auxiliary portion, the second rotating portion being fixedly connected between the second sliding portion and the second auxiliary portion. The second sliding portion is slidably connected to the second fixed frame, the second rotating portion is rotatably connected to the base, and the floating plate further includes a second connecting portion, the second connecting portion being slidably and rotatably connected to the second auxiliary portion.

When the foldable mechanism is in the folded state, the first fixed frame and the second fixed frame are folded relative to each other, and the first secondary swing arm and the second secondary swing arm are folded relative to each other.

When the foldable mechanism is in the flattened state, the first fixed frame and the second fixed frame are located on two opposite sides of the base and flattened relative to each other, and the first secondary swing arm and the second secondary swing arm are flattened relative to each other.

During the unfolding of the foldable mechanism, the first auxiliary portion slides and rotates relative to the first sliding portion, and the second auxiliary portion slides and rotates relative to the first sliding portion, to jointly drive the floating plate to float relative to the base.

During the folding of the foldable mechanism, the first auxiliary portion slides and rotates relative to the first sliding portion, and the second auxiliary portion slides and rotates relative to the first sliding portion, to jointly drive the floating plate to sink relative to the base.

In the foldable mechanism shown in this embodiment, floating or sinking of the floating plate relative to the base is realized by using the first connecting portion of the floating plate to cooperate with the first auxiliary portion of the first secondary swing arm and the second connecting portion of the floating plate to cooperate with the second auxiliary portion of the second secondary swing arm. In other words, the floating plate can realize floating or sinking relative to the base under the joint driving of the first secondary swing arm and the second secondary swing arm. The floating plate does not need to be assembled with the base through a structural member such as a spring, which simplifies an overall structure of the foldable mechanism, is beneficial to realize lightweight design of the foldable terminal, also improves left-right symmetry of the connection assembly, and ensures balance of force on left and right sides of the floating plate during movement relative to the base.

In an implementation, the second auxiliary portion is provided with a second auxiliary groove, the second auxiliary groove having a folded position and a flattened position, the folded position of the second auxiliary groove being located on a top side of the flattened position of the second auxiliary groove. The folded position of the second auxiliary groove is located on a top side of the second auxiliary groove, and the flattened position of the second auxiliary groove is located on a bottom side of the second auxiliary groove.

The second connecting portion includes a second pin, the second pin being mounted in the second auxiliary groove and slidable and rotatable relative to the second connecting portion in the second auxiliary groove, so as to realize a slidable and rotatable connection between the second connecting portion and the second auxiliary portion.

When the foldable mechanism is in a folded state, the connection assembly is in the folded state, and the second pin is located at the folded position of the second auxiliary groove.

When the foldable mechanism is in a flattened state, the connection assembly is in a flattened state, and the second pin is located at the flattened position of the second auxiliary groove.

When the foldable mechanism switches from the folded state to the flattened state, the second pin slides from the folded position of the second auxiliary groove to the flattened position of the second auxiliary groove.

When the foldable mechanism switches from the flattened state to the folded state, the second pin slides from the flattened position of the second auxiliary groove to the folded position of the second auxiliary groove.

In another implementation, the second connecting portion is provided with a second auxiliary groove, the second auxiliary groove having a folded position and a flattened position, the folded position of the second auxiliary groove being located on a bottom side of the flattened position of the second auxiliary groove. The folded position of the second auxiliary groove is located on a bottom side of the second auxiliary groove, and the flattened position of the second auxiliary groove is located on a top side of the second auxiliary groove.

The second auxiliary portion includes a second pin, the second pin being mounted in the second auxiliary groove and slidable and rotatable relative to the second connecting portion in the second auxiliary groove, so as to realize a slidable and rotatable connection between the second connecting portion and the second auxiliary portion.

When the foldable mechanism is in the folded state, the connection assembly is in the folded state, and the second pin is located at the folded position of the second auxiliary groove.

When the foldable mechanism is in the flattened state, the connection assembly is in the flattened state, and the second pin is located at the flattened position of the second auxiliary groove.

When the foldable mechanism switches from the folded state to the flattened state, the second pin slides from the folded position of the second auxiliary groove to the flattened position of the second auxiliary groove.

When the foldable mechanism switches from the flattened state to the folded state, the second pin slides from the flattened position of the second auxiliary groove to the folded position of the second auxiliary groove.

In an implementation, the foldable mechanism further includes a pressing plate assembly, the pressing plate assembly being slidably and rotatably connected to the connection assembly. The pressing plate assembly includes a first pressing plate and a second pressing plate. The first pressing plate is slidably and rotatably connected to the first fixed frame, and the second pressing plate is slidably and rotatably connected to the second fixed frame.

The first pressing plate includes a first function portion, the first function portion being slidably and rotatably connected to the first sliding portion. The second pressing plate includes a second function portion, the second function portion sliding and rotating connected to the second sliding portion.

When the foldable mechanism is in the folded state, the pressing plate assembly is in the folded state, and the first pressing plate and the second pressing plate are folded relative to each other.

When the foldable mechanism is in the flattened state, the pressing plate assembly is in the flattened state, and the first pressing plate and the second pressing plate are located on two opposite sides of the base and flattened relative to each other.

During the unfolding of the foldable mechanism, the first sliding portion slides and rotates relative to the first function portion, and the second sliding portion slides and rotates relative to the second function portion, to drive the first pressing plate and the second pressing plate to be unfolded relative to each other.

During the folding of the foldable mechanism, the first sliding portion slides and rotates relative to the first function portion, and the second sliding portion slides and rotates relative to the second function portion, to drive the first pressing plate and the second pressing plate to be folded relative to each other.

In the foldable mechanism shown in this application, a slidable and rotatable connection between the first pressing plate, the second pressing plate and the connection assembly is realized by using the first sliding portion of the first secondary swing arm to cooperate with the first function portion of the first pressing plate and the second sliding portion of the second secondary swing arm to cooperate with the second function portion of the second pressing plate. Therefore, the first pressing plate and the second pressing plate can realize relative rotation with the base by using the connection assembly. In other words, the first secondary swing arm and the second secondary swing arm of the connection assembly can also function as pressing plate swing arms at the same time. That is, in the foldable mechanism shown in this application, the pressing plate swing arms are further omitted, which simplifies an overall structure of the foldable mechanism and is conducive to the lightweight design of the foldable terminal.

In another implementation, the foldable mechanism further includes a pressing plate assembly, the pressing plate assembly being slidably and rotatably connected to the connection assembly. The pressing plate assembly includes a first pressing plate, a second pressing plate, a first pressing plate swing arm, and a second pressing plate swing arm. The first pressing plate is slidably and rotatably connected to the first fixed frame. The second pressing plate is slidably and rotatably connected to the second fixed frame. A sliding portion of the first pressing plate swing arm is slidably connected to the first pressing plate to cause the first pressing plate swing arm to be slidably connected to the first pressing plate. A rotating portion of the first pressing plate swing arm is rotatably connected to the base to cause the first pressing plate swing arm to be rotatably connected to the base. A sliding portion of the second pressing plate swing arm is slidably connected to the second pressing plate to cause the second pressing plate swing arm to be slidably connected to the second pressing plate. A rotating portion of the second pressing plate swing arm is rotatably connected to the base to cause the second pressing plate swing arm to be rotatably connected to the base.

When the foldable mechanism is in the folded state, the pressing plate assembly is in the folded state, the first pressing plate and the second pressing plate are folded relative to each other, and the first pressing plate swing arm and the first pressing plate swing arm are folded relative to each other.

When the foldable mechanism is in the flattened state, the pressing plate assembly is in the flattened state, the first pressing plate and the second pressing plate are located on two opposite sides of the base and flattened relative to each other, and the first pressing plate swing arm and the second pressing plate swing arm are flattened relative to each other.

In an implementation, when the foldable mechanism is in the flattened state, the first fixed frame and the second fixed frame are located on two opposite sides of the base and flattened relative to each other, and the first pressing plate swing arm and the second pressing plate swing arm are located on the two opposite sides of the base and flattened relative to each other. A top surface of the first pressing plate, a top surface of the second pressing plate, and a top surface of the floating plate are flush, and the top surface of the first pressing plate, the top surface of the second pressing plate, and the top surface of the floating plate form a support surface.

When the foldable mechanism is used for the foldable terminal, the support surface can support a foldable part of a display screen, which can not only ensure good display of the display screen, but also prevent damage to or a pit in the foldable part due to external force touch when the foldable part is touched, thereby improving operational reliability of the display screen.

In an implementation, the connection assembly of the foldable mechanism further includes a first main swing arm and a second main swing arm, a rotating portion of the first main swing arm being rotatably connected to the first fixed frame, a sliding portion of the first main swing arm being slidably and rotatably connected to the base, a rotating portion of the second main swing arm being rotatably connected to the second fixed frame, a sliding portion of the second main swing arm being slidably and rotatably connected to the base.

In an implementation, when the foldable mechanism is in the flattened state, both the sliding portion of the first main swing arm and the sliding portion of the second main swing arm abut against a bottom surface of the floating plate, to cause the top surface of the floating plate to remain flush with the top surface of the first pressing plate and the top surface of the second pressing plate.

In an implementation, the sliding portion of the first main swing arm is provided with a first support groove, the sliding portion of the second main swing arm is provided with a second support groove, and the floating plate includes a first support portion and a second support portion.

When the foldable mechanism is in the flattened state, a groove wall of the first support groove abuts against a bottom surface of the first support portion, and a groove wall of the second support groove abuts against a bottom surface of the second support portion. In this case, the first pressing plate and the first main swing arm can reuse a size of the foldable mechanism in a thickness direction, and the second pressing plate and the second main swing arm can reuse the size of the foldable mechanism in the thickness direction, so as to reduce the size of the foldable mechanism in the thickness direction, which is conducive to light and thin design of the foldable mechanism.

In an implementation, when the foldable mechanism is in the folded state, the first fixed frame, the second fixed frame, the first pressing plate, the second pressing plate, and the floating plate are enclosed to form an avoidance space, a cross section of the avoidance space being in a shape of a water drop.

When the foldable mechanism is used for the foldable terminal, the avoidance space of the foldable mechanism can avoid an R angle formed when the foldable part is bent, so that the foldable part may not bend at a relatively large angle, thereby preventing an undesirable phenomenon such as a crease in the display screen and helping to prolong a service life of the display screen.

In an implementation, the foldable mechanism further includes a damping assembly, the damping assembly being mounted on the base and slidably and rotatably connected to the connection assembly. The damping assembly includes a damping member, a first damping swing arm, and a second damping swing arm. The damping member is fixedly connected to the base, a rotating portion of the first damping swing arm is rotatably connected to the damping member, and a sliding portion of the first damping swing arm is slidably and rotatably connected to the first fixed frame. A rotating portion of the second damping swing arm is rotatably connected to the damping member, and a sliding portion of the second damping swing arm is slidably and rotatably connected to the second fixed frame.

When the foldable mechanism is in the folded state, the damping assembly is in the folded state, and the first damping swing arm and the second damping swing arm are folded relative to each other.

When the foldable mechanism is in the flattened state, the damping assembly is in the flattened state, and the first damping swing arm and the second damping swing arm are flattened relative to each other.

When the foldable mechanism is used for the foldable terminal, a user can obviously feel a damping force provided by the damping assembly when the user uses the foldable terminal, for example, when the foldable terminal is in the folded state or the flattened state, and when the foldable terminal switches between the folded state and the flattened state, and the user can experience a better hand feel, thereby improving user experience.

In an implementation, a support portion of the first damping swing arm is fixedly connected to a side of the rotating portion of the first damping swing arm away from the sliding portion of the first damping swing arm, and a support portion of the second damping swing arm is fixedly connected to a side of the rotating portion of the second damping swing arm away from the sliding portion of the second damping swing arm.

When the foldable mechanism is in the flattened state, both the support portion of the first damping swing arm and the support portion of the second damping swing arm abut against the bottom surface of the floating plate, to cause the top surface of the floating plate to remain flush with the top surface of the first pressing plate and the top surface of the second pressing plate.

In an implementation, a center of rotation of the first rotating portion relative to the base is a first center, and a center of rotation of the first damping swing arm relative to the base is a second center, the first center and the second center being coaxial.

In another implementation, a center of rotation of the first rotating portion relative to the base is a first center, and a center of rotation of the first damping swing arm relative to the base is a second center, the first center and the second center being spaced apart from each other.

In the foldable mechanism shown in this application, the first fixed frame, when rotating relative to the base, drives the first main swing arm to rotate relative to the first fixed frame and slide and slide relative to the base, further drives the first secondary swing arm to slide relative to the first fixed frame and rotate relative to the base, and further drives the first damping swing arm to slide and rotate relative to the first fixed frame and rotate relative to the damping member. Since the first center and the second center are spaced apart from each other, that is, the center of rotation of the first secondary swing arm does not coincide with the center of rotation of the first damping swing arm, an assembly position of the first damping swing arm on the base does not need to match an assembly position of the first secondary swing arm on the base, which improves a degree of freedom of assembly between the first damping swing arm and the base and helps to reduce the size of the foldable mechanism.

In an implementation, the floating plate is slidably connected to the base. The base is provided with a limiting hole, and the floating plate further includes a limiting portion, the limiting portion being mounted in the limiting hole and slidable relative to the base in the limiting hole, to realize the slidable connection between the floating plate and the base, which can not only limit a moving direction of the floating plate relative to the base, but also ensure accuracy of assembly between the floating plate and the base.

According to a second aspect, this application provides a foldable mechanism, including a base, a connection assembly, and a pressing plate assembly, the connection assembly being mounted on the base, the pressing plate assembly being slidably and rotatably connected to the connection assembly. The connection assembly includes a first fixed frame and a first secondary swing arm. The first secondary swing arm includes a first sliding portion and a first rotating portion fixedly connected to the first sliding portion, the first sliding portion being slidably connected to the first fixed frame, the first rotating portion being rotatably connected to the base. The pressing plate assembly includes a first pressing plate, the first pressing plate being slidably and rotatably connected to the first fixed frame. The first pressing plate includes a first function portion, the first function portion being slidably and rotatably connected to the first sliding portion.

When the foldable mechanism is in a folded state, both the connection assembly and the pressing plate assembly are in the folded state.

When the foldable mechanism is in a flattened state, both the connection assembly and the pressing plate assembly are in the flattened state.

During folding or unfolding of the foldable mechanism, the first sliding portion is slidably and rotatably connected to the first function portion to drive the first pressing plate to rotate relative to the base.

In the foldable mechanism shown in this application, a slidable and rotatable connection between the first pressing plate and the connection assembly is realized by using the first sliding portion of the first secondary swing arm to cooperate with the first function portion of the first pressing plate. Therefore, the first pressing plate can realize relative rotation with the base by using the connection assembly. In other words, the first secondary swing arm of the connection assembly can also function as a pressing plate swing arm at the same time. That is, in the foldable mechanism shown in this application, the pressing plate swing arm is further omitted, which simplifies an overall structure of the foldable mechanism and is conducive to the lightweight design of the foldable terminal.

In an implementation, the first function portion is provided with a first function groove, the first function groove having a folded position and a flattened position, the folded position of the first function groove being located on an inner side of the flattened position of the first function groove. The folded position of the first function groove is located on an inner side of the first function groove, and the flattened position of the first function groove is located on an outer side of the first function groove.

The first sliding portion includes a first pin shaft, the first pin shaft being mounted in the first function groove and slidable and rotatable relative to the first function portion in the first function groove.

When the foldable mechanism is in the folded state, the first pin shaft is located at the folded position of the first function groove.

When the foldable mechanism is in the flattened state, the first pin shaft is located at the flattened position of the first function groove.

When the foldable mechanism switches from the folded state to the flattened state, the first pin shaft slides from the folded position of the first function groove to the flattened position of the first function groove.

When the foldable mechanism switches from the flattened state to the folded state, the first pin shaft slides from the flattened position of the first function groove to the folded position of the first function groove.

In an implementation, the first sliding portion is provided with a first avoidance hole, the first pin shaft is located on a top side of the first avoidance hole, and the first function portion is at least partially received in the first avoidance hole.

When the first pin shaft slides and rotates relative to the first function portion in the first function groove, the first function portion slides and rotates relative to the first sliding portion in the first avoidance hole.

In another implementation, the first sliding portion is provided with a first function groove, the first function groove having a folded position and a flattened position, the folded position of the first function groove being located on an outer side of the flattened position of the first function groove. The folded position of the first function groove is located on an outer side of the first function groove, and the flattened position of the first function groove is located on an inner side of the first function groove.

The first connecting portion includes a first pin shaft, the first pin shaft being mounted in the first function groove and slidable and rotatable relative to the first connecting portion in the first function groove.

When the foldable mechanism is in the folded state, the first pin shaft is located at the folded position of the first function groove.

When the foldable mechanism is in the flattened state, the first pin shaft is located at the flattened position of the first function groove.

When the foldable mechanism switches from the folded state to the flattened state, the first pin shaft slides from the folded position of the first function groove to the flattened position of the first function groove.

When the foldable mechanism switches from the flattened state to the folded state, the first pin shaft slides from the flattened position of the first function groove to the folded position of the first function groove.

In an implementation, the first function groove is an arc-shaped groove.

In an implementation, the connection assembly of the foldable mechanism further includes a second fixed frame and a second secondary swing arm. The second secondary swing arm includes a second sliding portion and a second rotating portion fixedly connected to the second sliding portion, the second rotating portion being rotatably connected to the base, the second sliding portion being slidably connected to the second fixed frame. The pressing plate assembly includes a second pressing plate, the second pressing plate being slidably and rotatably connected to the second fixed frame. The second pressing plate includes a second function portion, the second function portion being slidably and rotatably connected to the second sliding portion.

During the folding or unfolding of the foldable mechanism, the second sliding portion slides and rotates relative to the second function portion to drive the second pressing plate to rotate relative to the base.

When the foldable mechanism is in the folded state, the first fixed frame and the second fixed frame are folded relative to each other, the first main swing arm and the second main swing arm are folded relative to each other, the first secondary swing arm and the second secondary swing arm are folded relative to each other, and the first pressing plate and the second pressing plate are folded relative to each other.

When the foldable mechanism is in the flattened state, the first fixed frame and the second fixed frame are located on two opposite sides of the base and flattened relative to each other, the first main swing arm and the second main swing arm are flattened relative to each other, the first secondary swing arm and the second secondary swing arm are flattened relative to each other, and the first pressing plate and the second pressing plate are located on the two opposite sides of the base and flattened relative to each other.

In the foldable mechanism shown in this application, a slidable and rotatable connection between the first pressing plate, the second pressing plate and the connection assembly is realized by using the first sliding portion of the first secondary swing arm to cooperate with the first function portion of the first pressing plate and the second sliding portion of the second secondary swing arm to cooperate with the second function portion of the second pressing plate. Therefore, the first pressing plate and the second pressing plate can realize relative rotation with the base by using the connection assembly. In other words, the first secondary swing arm and the second secondary swing arm of the connection assembly can also function as pressing plate swing arms at the same time. That is, in the foldable mechanism shown in this application, the pressing plate swing arms are further omitted, which simplifies an overall structure of the foldable mechanism and is conducive to the lightweight design of the foldable terminal.

In an implementation, the second function portion is provided with a second function groove, the second function groove having a folded position and a flattened position, the folded position of the second function groove being located on an inner side of the flattened position of the second function groove. The folded position of the second function groove is located on an inner side of the second function groove, and the flattened position of the second function groove is located on an outer side of the second function groove.

The second sliding portion includes a second pin shaft, the second pin shaft being mounted in the second function groove and slidable and rotatable relative to the second function portion in the second function groove.

When the foldable mechanism is in the folded state, the second pin shaft is located at the folded position of the second function groove.

When the foldable mechanism is in the flattened state, the second pin shaft is located at the flattened position of the second function groove.

When the foldable mechanism switches from the folded state to the flattened state, the second pin shaft slides from the folded position of the second function groove to the flattened position of the second function groove.

When the foldable mechanism switches from the flattened state to the folded state, the second pin shaft slides from the flattened position of the second function groove to the folded position of the second function groove.

In an implementation, the second sliding portion is provided with a second avoidance hole, the second pin shaft is located on a top side of the second avoidance hole, and the second function portion is at least partially received in the second avoidance hole.

When the second pin shaft slides and rotates relative to the second function portion in the second function groove, the second function portion slides and rotates relative to the second sliding portion in the second avoidance hole.

In another implementation, the second sliding portion is provided with a second function groove, the second function groove having a folded position and a flattened position, the folded position of the second function groove being located on an outer side of the flattened position of the second function groove. The folded position of the second function groove is located on an outer side of the second function groove, and the flattened position of the second function groove is located on an inner side of the second function groove.

The second connecting portion includes a second pin shaft, the second pin shaft being mounted in the second function groove and slidable and rotatable relative to the second connecting portion in the second function groove.

When the foldable mechanism is in the folded state, the second pin shaft is located at the folded position of the second function groove.

When the foldable mechanism is in the flattened state, the second pin shaft is located at the flattened position of the second function groove.

When the foldable mechanism switches from the folded state to the flattened state, the second pin shaft slides from the folded position of the second function groove to the flattened position of the second function groove.

When the foldable mechanism switches from the flattened state to the folded state, the second pin shaft slides from the flattened position of the second function groove to the folded position of the second function groove.

In an implementation, the second function groove is an arc-shaped groove.

In another implementation, the connection assembly of the foldable mechanism further includes a second fixed frame and a second secondary swing arm. The second secondary swing arm includes a second sliding portion and a second rotating portion fixedly connected to the second sliding portion, the second rotating portion being rotatably connected to the base, the second sliding portion being slidably connected to the second fixed frame. The pressing plate assembly further includes a second pressing plate and a pressing plate swing arm, the second pressing plate being slidably and rotatably connected to the second fixed frame. A rotating portion of the pressing plate swing arm is rotatably connected to the base, and a sliding portion of the pressing plate swing arm is slidably connected to the second pressing plate.

In an implementation, the foldable mechanism further includes a floating plate, the floating plate being located on a top side of the base.

When the foldable mechanism is in the flattened state, a top surface of the floating plate, a top surface of the first pressing plate, and a top surface of the second pressing plate are flush, and the top surface of the first pressing plate, the top surface of the second pressing plate, and the top surface of the floating plate form a support surface.

When the foldable mechanism is used for the foldable terminal, the support surface can support a foldable part of a display screen, which can not only ensure good display of the display screen, but also prevent damage to or a pit in the foldable part due to external force touch when the foldable part is touched, thereby improving operational reliability of the display screen.

In an implementation, the connection assembly of the foldable mechanism further includes a first main swing arm and a second main swing arm, a rotating portion of the first main swing arm being rotatably connected to the first fixed frame, a sliding portion of the first main swing arm being slidably and rotatably connected to the base, a rotating portion of the second main swing arm being rotatably connected to the second fixed frame, a sliding portion of the second main swing arm being slidably and rotatably connected to the base.

In an implementation, when the foldable mechanism is in the flattened state, both the sliding portion of the first main swing arm and the sliding portion of the second main swing arm abut against a bottom surface of the floating plate, to cause the top surface of the floating plate to remain flush with the top surface of the first pressing plate and the top surface of the second pressing plate.

In an implementation, the sliding portion of the first main swing arm is provided with a first support groove, the sliding portion of the second main swing arm is provided with a second support groove, and the floating plate includes a first support portion and a second support portion.

When the foldable mechanism is in the flattened state, a groove wall of the first support groove abuts against a bottom surface of the first support portion, and a groove wall of the second support groove abuts against a bottom surface of the second support portion. In this case, the first pressing plate and the first main swing arm can reuse a size of the foldable mechanism in a thickness direction, and the second pressing plate and the second main swing arm can reuse the size of the foldable mechanism in the thickness direction, so as to reduce the size of the foldable mechanism in the thickness direction, which is conducive to light and thin design of the foldable mechanism.

In an implementation, when the foldable mechanism is in the folded state, the first fixed frame, the second fixed frame, the first pressing plate, the second pressing plate, and the floating plate are enclosed to form an avoidance space, a cross section of the avoidance space being in a shape of a water drop.

When the foldable mechanism is used for the foldable terminal, the avoidance space of the foldable mechanism can avoid an R angle formed when the foldable part is bent, so that the foldable part may not bend at a relatively large angle, thereby preventing an undesirable phenomenon such as a crease in the display screen and helping to prolong a service life of the display screen.

In an implementation, the first secondary swing arm further includes a first auxiliary portion, the first auxiliary portion being fixedly connected to a side of the first rotating portion away from the first sliding portion. The second secondary swing arm further includes a second auxiliary portion, the second auxiliary portion being fixedly connected to a side of the second rotating portion away from the second sliding portion.

The floating plate includes a first connecting portion and a second connecting portion, the first connecting portion being slidably and rotatably connected to the first auxiliary portion, the second connecting portion being slidably and rotatably connected to the second auxiliary portion.

During the unfolding of the foldable mechanism, the first auxiliary portion slides and rotates relative to the first connecting portion, and the second auxiliary portion slides and rotates relative to the second connecting portion, to drive the floating plate to float relative to the base.

During the folding of the foldable mechanism, the first auxiliary portion slides and rotates relative to the first connecting portion, and the second auxiliary portion slides and rotates relative to the second connecting portion, to drive the floating plate to sink relative to the base.

In an implementation, the foldable mechanism further includes a damping assembly, the damping assembly being mounted on the base and slidably and rotatably connected to the connection assembly. The damping assembly includes a damping member, a first damping swing arm, and a second damping swing arm. The damping member is fixedly connected to the base, a rotating portion of the first damping swing arm is rotatably connected to the damping member, and a sliding portion of the first damping swing arm is slidably and rotatably connected to the first fixed frame. A rotating portion of the second damping swing arm is rotatably connected to the damping member, and a sliding portion of the second damping swing arm is slidably and rotatably connected to the second fixed frame.

When the foldable mechanism is in the folded state, the damping assembly is in the folded state, and the first damping swing arm and the second damping swing arm are folded relative to each other.

When the foldable mechanism is in the flattened state, the damping assembly is in the flattened state, and the first damping swing arm and the second damping swing arm are flattened relative to each other.

When the foldable mechanism is used for the foldable terminal, the user can obviously feel a damping force provided by the damping assembly when the user uses the foldable terminal, for example, when the foldable terminal is in the folded state or the flattened state, and when the foldable terminal switches between the folded state and the unfolded state, and the user can experience a better hand feel, thereby improving user experience.

In an implementation, a support portion of the first damping swing arm is fixedly connected to a side of the rotating portion of the first damping swing arm away from the sliding portion of the first damping swing arm, and a support portion of the second damping swing arm is fixedly connected to a side of the rotating portion of the second damping swing arm away from the sliding portion of the second damping swing arm.

When the foldable mechanism is in the flattened state, both the support portion of the first damping swing arm and the support portion of the second damping swing arm abut against the bottom surface of the floating plate, to cause the top surface of the floating plate to remain flush with the top surface of the first pressing plate and the top surface of the second pressing plate.

In an implementation, a center of rotation of the first rotating portion relative to the base is a first center, and a center of rotation of the first damping swing arm relative to the base is a second center, the first center and the second center being coaxial.

In another implementation, a center of rotation of the first rotating portion relative to the base is a first center, and a center of rotation of the first damping swing arm relative to the base is a second center, the first center and the second center being spaced apart from each other.

In the foldable mechanism shown in this application, the first fixed frame, when rotating relative to the base, drives the first main swing arm to rotate relative to the first fixed frame and slide and slide relative to the base, further drives the first secondary swing arm to slide relative to the first fixed frame and rotate relative to the base, and further drives the first damping swing arm to slide and rotate relative to the first fixed frame and rotate relative to the damping member. Since the first center and the second center are spaced apart from each other, that is, the center of rotation of the first secondary swing arm does not coincide with the center of rotation of the first damping swing arm, an assembly position of the first damping swing arm on the base does not need to match an assembly position of the first secondary swing arm on the base, which improves a degree of freedom of assembly between the first damping swing arm and the base and helps to reduce the size of the foldable mechanism.

According to a third aspect, this application provides a foldable terminal, including a first housing, a second housing, and any one of the above foldable mechanisms, the foldable mechanism being connected to the first housing and the second housing, the first fixed frame being fixedly connected to the first housing.

The foldable terminal shown in this application uses any one of the above foldable mechanisms, and the overall structure of the foldable mechanism is simple, which is conducive to lightweight design of the foldable terminal.

BRIEF DESCRIPTION OF DRAWINGS

To describe the technical solutions in the embodiments of this application more clearly, the accompanying drawings required for the embodiments of this application are described below.

DESCRIPTION OF EMBODIMENTS

The following clearly and completely describes technical solutions in embodiments of the present application with reference to the accompanying drawings in the embodiments of the present application.

Figure 1:
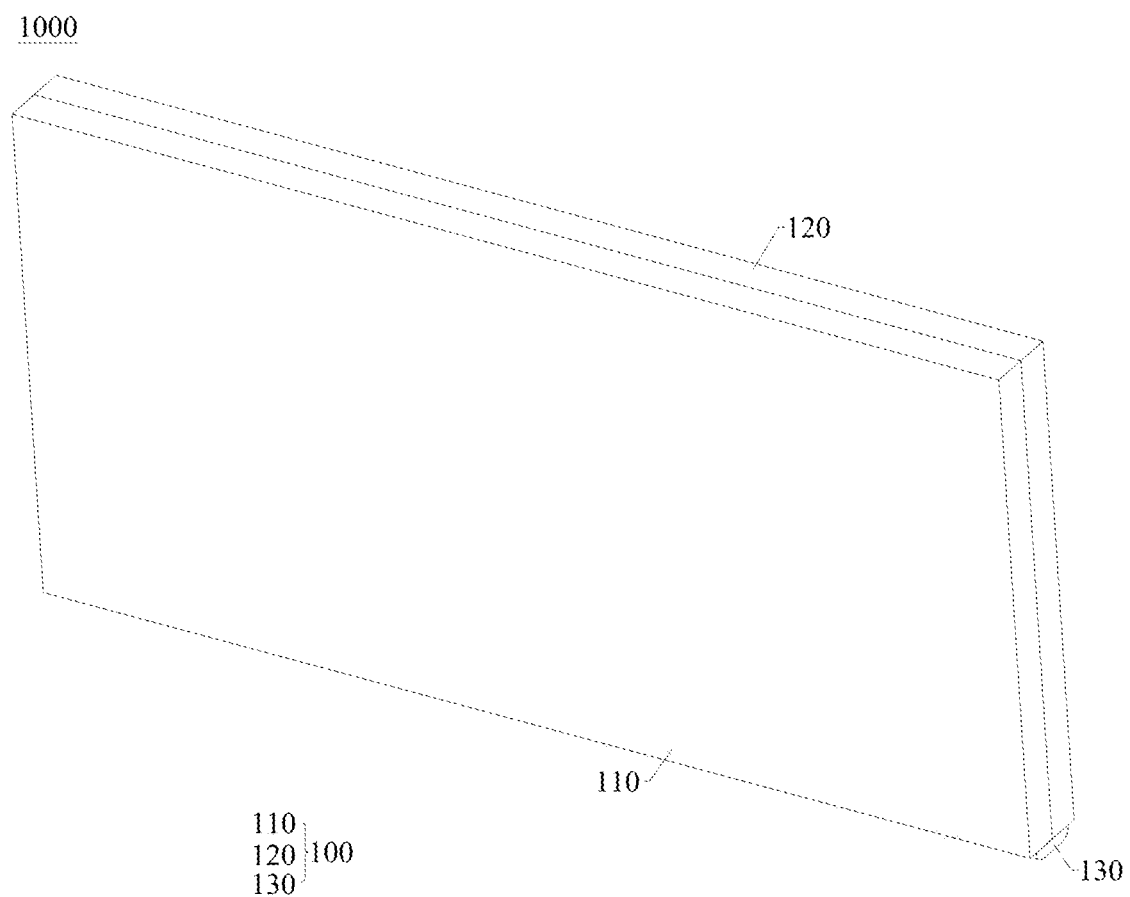
FIG. 1 is a schematic structural diagram of a foldable terminal according to an embodiment of this application in a state.
Figure 2:
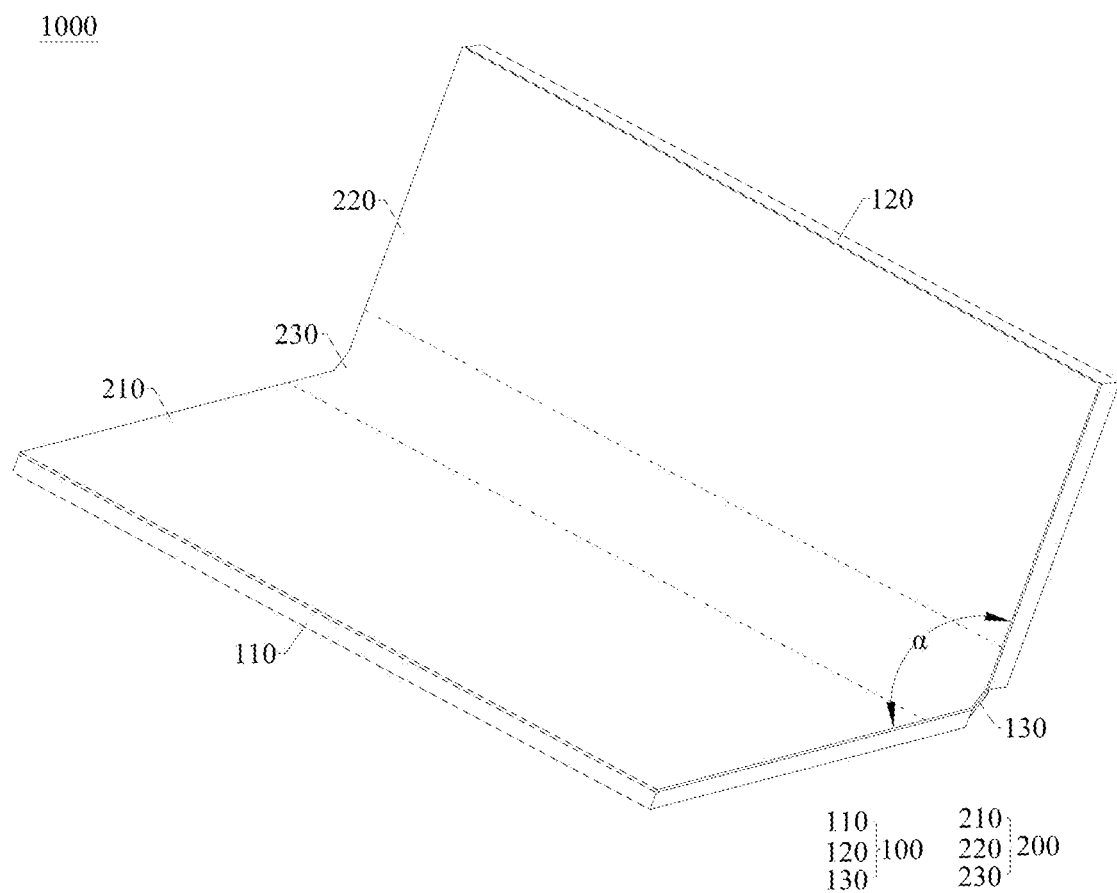
FIG. 2 is a schematic structural diagram of the foldable terminal shown in FIG. 1 in a second state.
Figure 3:
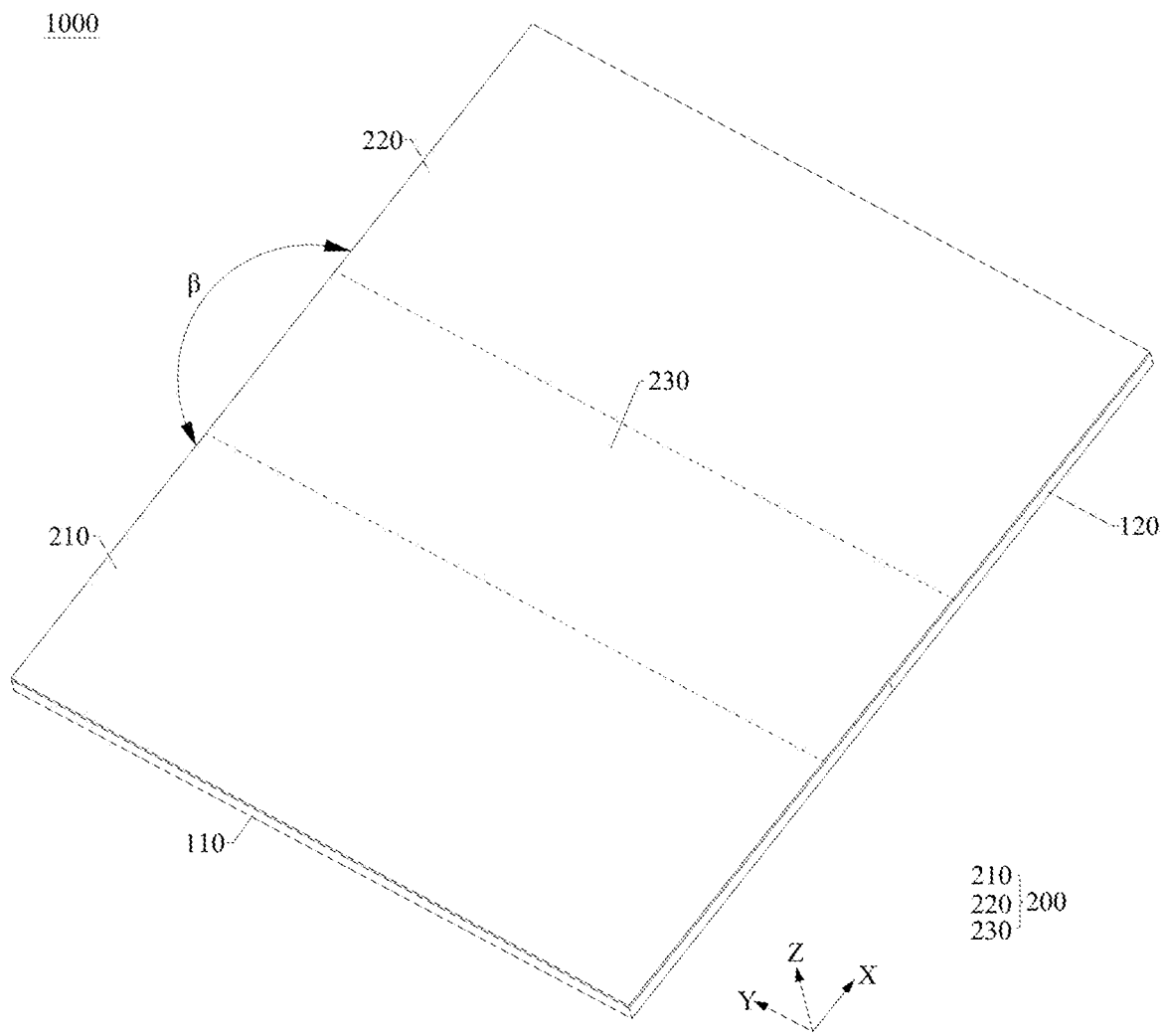
FIG. 3 is a schematic structural diagram of the foldable terminal shown in FIG. 1 in a third state.

Referring to FIG. 1 and FIG. 2, FIG. 1 is a schematic structural diagram of a foldable terminal 1000 according to an embodiment of this application in a state, FIG. 2 is a schematic structural diagram of the foldable terminal 1000 shown in FIG. 1 in a second state, and FIG. 3 is a schematic structural diagram of the foldable terminal 1000 shown in FIG. 1 in a third state.

The foldable terminal 1000 may be a foldable electronic product such as a mobile phone, a tablet computer, a personal computer, a multimedia player, an e-book reader, a notebook computer, a vehicle-mounted device, or a wearable device. In this embodiment, the foldable terminal 1000 is a foldable mobile phone. That is, the foldable terminal 1000 is a mobile phone that can be switched between a folded state and an unfolded state.

For ease of description, a length direction of the foldable terminal 1000 shown in FIG. 3 is defined as an X-axis direction, a length direction of the foldable terminal 1000 is a Y-axis direction, a thickness direction of the foldable terminal 1000 is a Z-axis direction, and the X-axis direction, the Y-axis direction, and the Z-axis direction are perpendicular to each other. Exemplarily, an extension direction of a rotation axis of the foldable terminal 1000 is parallel to the Y-axis direction. That is, the foldable terminal 1000 can be unfolded or folded relative to each other around the Y-axis direction.

It should be noted that qualifiers on a relative position relationship, such as parallel and vertical as referred to in the embodiments of this application, are all aimed at a current technological level, rather than absolute and strict definitions in a mathematical sense, and a small deviation is allowed, such as approximately parallel and approximately vertical. For example, "A is parallel to B" means that A is parallel to B or approximately parallel to B, and an angle between A and B ranges from 0 degrees to 10 degrees. For example, "A is perpendicular to B" means that A is perpendicular to B or approximately perpendicular to B, and an angle between A and B ranges from 80 degrees to 100 degrees.

The foldable terminal 1000 shown in FIG. 1 is in a folded state. The foldable terminal 1000 has a smaller size along the X-axis direction, and the foldable terminal 1000 is easy to carry. Both the foldable terminals 1000 shown in FIG. 2 and FIG. 3 are in an unfolded state. Exemplarily, an unfolding angle α of the foldable terminal 1000 shown in FIG. 2 is 90 degrees. An unfolding angle β of the foldable terminal 1000 shown in FIG. 3 is 180 degrees. In other words, the foldable terminal 1000 shown in FIG. 3 is in a flattened state. In this case, the foldable terminal 1000 has a larger size along the X-axis direction, and the foldable terminal 1000 has a larger display area.

It should be noted that a slight deviation is allowed for all angles illustrated in this embodiment of this application. For example, "an unfolding degree a of the foldable terminal 1000 shown in FIG. 2 is 90 degrees" means that the unfolding angle α may be 90 degrees, or may be about 90 degrees, such as 80 degrees, 85 degrees, 95 degrees, or 100 degrees. Similarly, "an unfolding angle β of the foldable terminal 1000 shown in FIG. 3 is 180 degrees" means that β may be 180 degrees, or may be about 180 degrees, such as 170 degrees, 175 degrees, 185 degrees, or 190 degrees. An angle illustrated below may be understood in the same way.

It should be understood that the foldable terminal 1000 shown in this embodiment of this application is a terminal that may be folded once. In some other embodiments, the foldable terminal 1000 may alternatively be a terminal that may be folded a plurality of times (two or more times). In this case, the foldable terminal 1000 may include a plurality of parts, two adjacent parts may be folded relatively close to each other until the foldable terminal 1000 is in a folded state, or two adjacent parts may be unfolded relatively far from each other until the foldable terminal 1000 is in an unfolded state.

Figure 4:
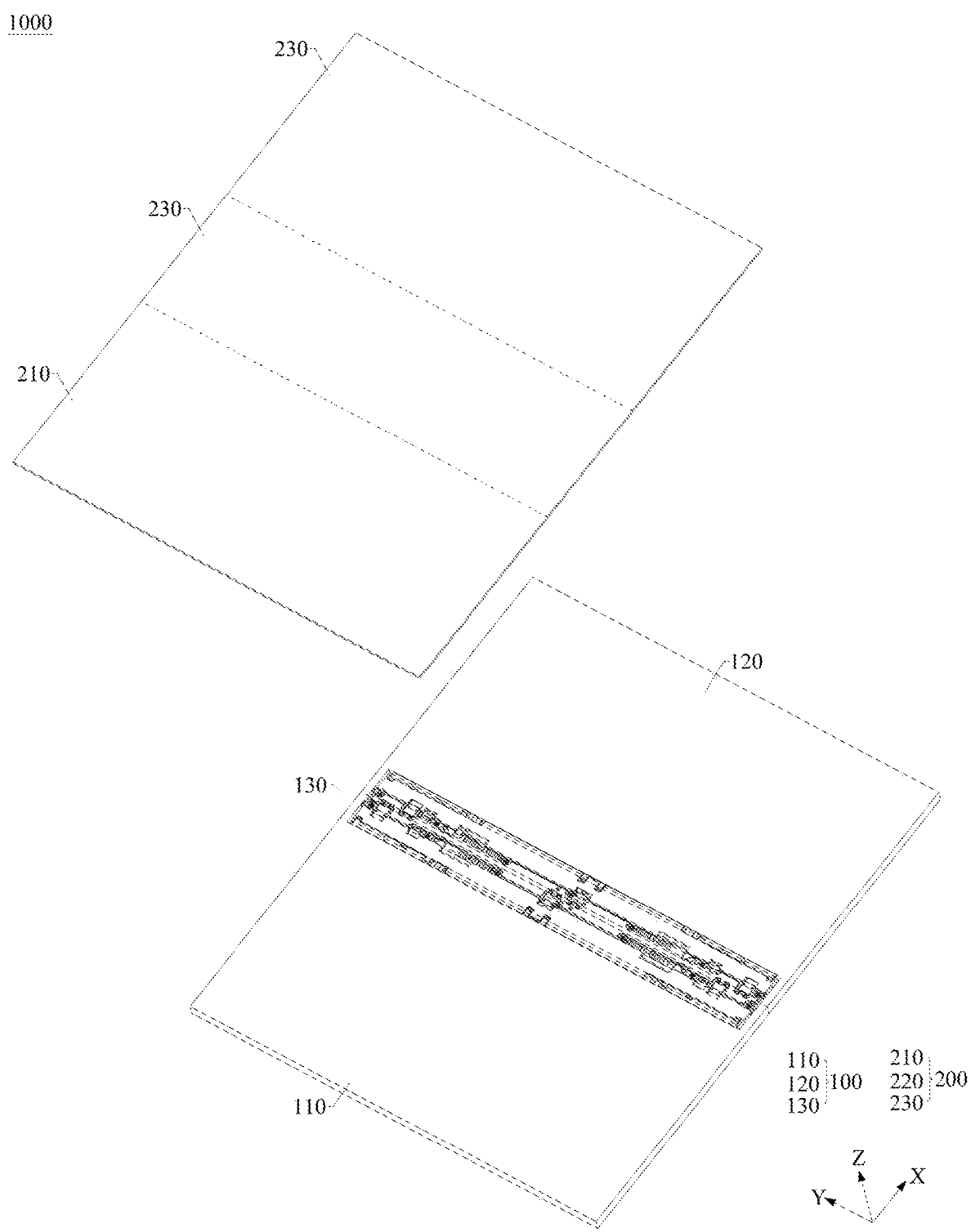
FIG. 4 is a schematic diagram of an exploded structure of the foldable terminal shown in FIG. 3.

Referring to FIG. 4 together, FIG. 4 is a schematic diagram of an exploded structure of the foldable terminal 1000 shown in FIG. 3.

The foldable terminal 1000 includes a foldable apparatus 100 and a display screen 200, and the display screen 200 is mounted on the foldable apparatus 100. The display screen 200 includes a display surface (not marked in the figure) away from the foldable apparatus 100, and the display surface is configured to display information such as a text, an image, or a video. In this embodiment, the display screen 200 includes a first display part 210, a second display part 220, and a foldable part 230, and the foldable part 230 is connected between the first display part 210 and the second display part 220. The foldable part 230 may be bent around the Y-axis direction.

As shown in FIG. 1, when the foldable terminal 1000 is in a folded state, both the foldable apparatus 100 and the display screen 200 are in the folded state, the first display part 210 and the second display part 220 are disposed opposite each other, and the foldable part 230 is bent. In this case, an exposed area of the display screen 200 is relatively small, which can greatly reduce a probability that the display screen 200 is damaged and effectively protect the display screen 200.

As shown in FIG. 2, when the foldable terminal 1000 is in an unfolded state, both the foldable apparatus 100 and the display screen 200 are in the unfolded state, the first display part 210 and the second display part 220 are unfolded relative to each other, and the foldable part 230 is bent. In this case, an angle between the first display part 210 and the second display part 220 is $\alpha$.

As shown in FIG. 3, when the foldable terminal 1000 is in a flattened state, both the foldable apparatus 100 and the display screen 200 are in the flattened state, the first display part 210 and the second display part 220 are flattened relative to each other, and the foldable part 230 is flattened without bending. In this case, angles between the first display part 210, the second display part 220, and the foldable part 230 are all $\beta$, and the display screen 200 has a large display area, so as to implement large-screen display of the foldable terminal 1000 and improve user experience.

It should be understood that the foldable terminal 1000 shown in this embodiment of this application is folded by inward folding, and the display screen 200 is located on an inner side of the foldable apparatus 100 when the foldable terminal 1000 is in the folded state. In some other embodiments, the foldable terminal 1000 may alternatively be folded by outward folding, and the display screen 200 is located on an outer side of the foldable apparatus 100 when the foldable terminal 1000 is in the folded state.

Figure 5:
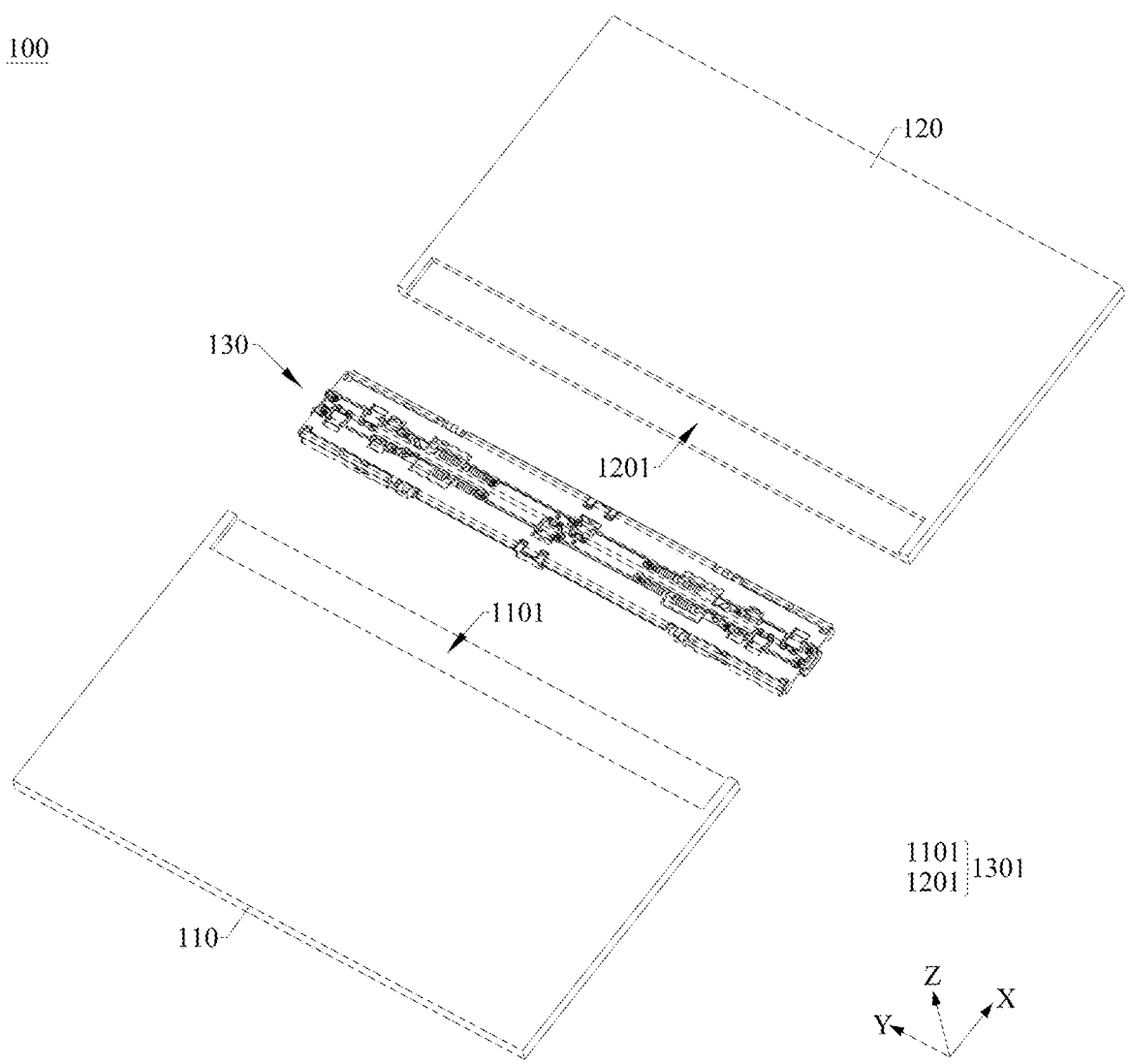
FIG. 5 is a schematic structural diagram of a foldable apparatus in the foldable terminal shown in FIG. 4.

Referring to FIG. 5 together, FIG. 5 is a schematic diagram of an exploded structure of the foldable apparatus 100 in the foldable terminal 1000 shown in FIG. 4.

The foldable apparatus 100 includes a first housing 110, a second housing 120, and a foldable mechanism 130. The foldable mechanism 130 is connected between the first housing 110 and the second housing 120, so as to realize a rotatable connection between the first housing 110 and the second housing 120. Specifically, the first housing 110 carries the first display part 210, and the second housing 120 carries the second display part 220. In other words, the first display part 210 is mounted on the first housing 110, and the second display part 220 is mounted on the second housing 120. The foldable mechanism 130 is disposed opposite the foldable part 230.

The first housing 110 and the second housing 120 may rotate relative to each other by using the foldable mechanism 130, so that the foldable apparatus 100 switches between the folded state and the unfolded state. Specifically, the first housing 110 and the second housing 120 may rotate relative to each other until they are oppositely disposed, so that the foldable apparatus 100 is in the folded state, as shown in FIG. 1. In this case, the foldable mechanism 130 is in the folded state. The first housing 110 and the second housing 120 may alternatively rotate relative to each other until they are unfolded relative to each other, so that the foldable apparatus 100 is in a half unfolded state, as shown in FIG. 2. In this case, the foldable mechanism 130 is in the half unfolded state. Exemplarily, an angle between the first housing 110 and the second housing 120 is a. The first housing 110 and the second housing 120 may alternatively rotate relative to each other until they are flattened relative to each other, so that the foldable terminal 1000 is in a flattened state, as shown in FIG. 3. Exemplarily, an angle between the first housing 110 and the second housing 120 is B. In this case, the foldable mechanism 130 is in the flattened state.

The first housing 110 is provided with a first receiving groove 1101, and the first receiving groove 1101 is located on a side of the first housing 110 facing the second housing 120. An opening of the first receiving groove 1101 is located on a top surface of the first housing 110. The first receiving groove 1101 is recessed from the top surface of the first housing 110 to a bottom surface, and runs through a right side surface of the first housing 110.

The second housing 120 and the first housing 110 have a same structure and are mirror-symmetrical with respect to the foldable mechanism 130. The second housing 120 is provided with a second receiving groove 1201, and the second receiving groove 1201 is located on a side of the second housing 120 facing the first housing 110. An opening of the second receiving groove 1201 is located on a top surface of the second housing 120. The second receiving groove 1201 is recessed in a direction from the top surface of the second housing 120 to a bottom surface, and runs through a side surface of the second housing 120 facing the first housing 110.

When the foldable apparatus 100 is in the flattened state, that is, when the angle between the first housing 110 and the second housing 120 is $\beta$, the first receiving groove 1101 and the second receiving groove 1201 are enclosed to form a receiving space 1301. The foldable mechanism 130 is mounted in the receiving space 1301. Part of the foldable mechanism 130 is mounted in the first receiving groove 1101 of the first housing 110, and part of the foldable mechanism 130 is mounted in the second receiving groove 1201 of the second housing 120.

It should be noted that in the embodiments of this application, orientation words such as "top", "bottom", "left", "right", "front", and "back" that are used when the foldable terminal 1000 is described are mainly described according to a display orientation of the foldable terminal 1000 in FIG. 3, a positive direction toward a Z axis is "top", a negative direction toward the Z axis is "bottom", a positive direction toward an X axis is "right", a negative direction toward the X axis is "left", a positive direction toward a Y axis is "back", and a negative direction toward the Y axis is "front", which does not form a limitation on the orientation of the foldable terminal 1000 in an actual application scenario.

An existing foldable mechanism generally requires a large number of structural members to realize folding and unfolding. For example, there is a need to connect the floating plate to the base through an elastic member such as a spring to realize floating and sinking of the floating plate, and a pressing plate swing arm is also needed to realize relative rotation between the pressing plate and the base. As a result, the foldable mechanism has a complex structure, which is not conducive to lightweight and miniaturized design of the foldable terminal. Next, the structure of the foldable mechanism 130 in the foldable terminal 1000 shown in this embodiment of this application will be described.

Figure 6:
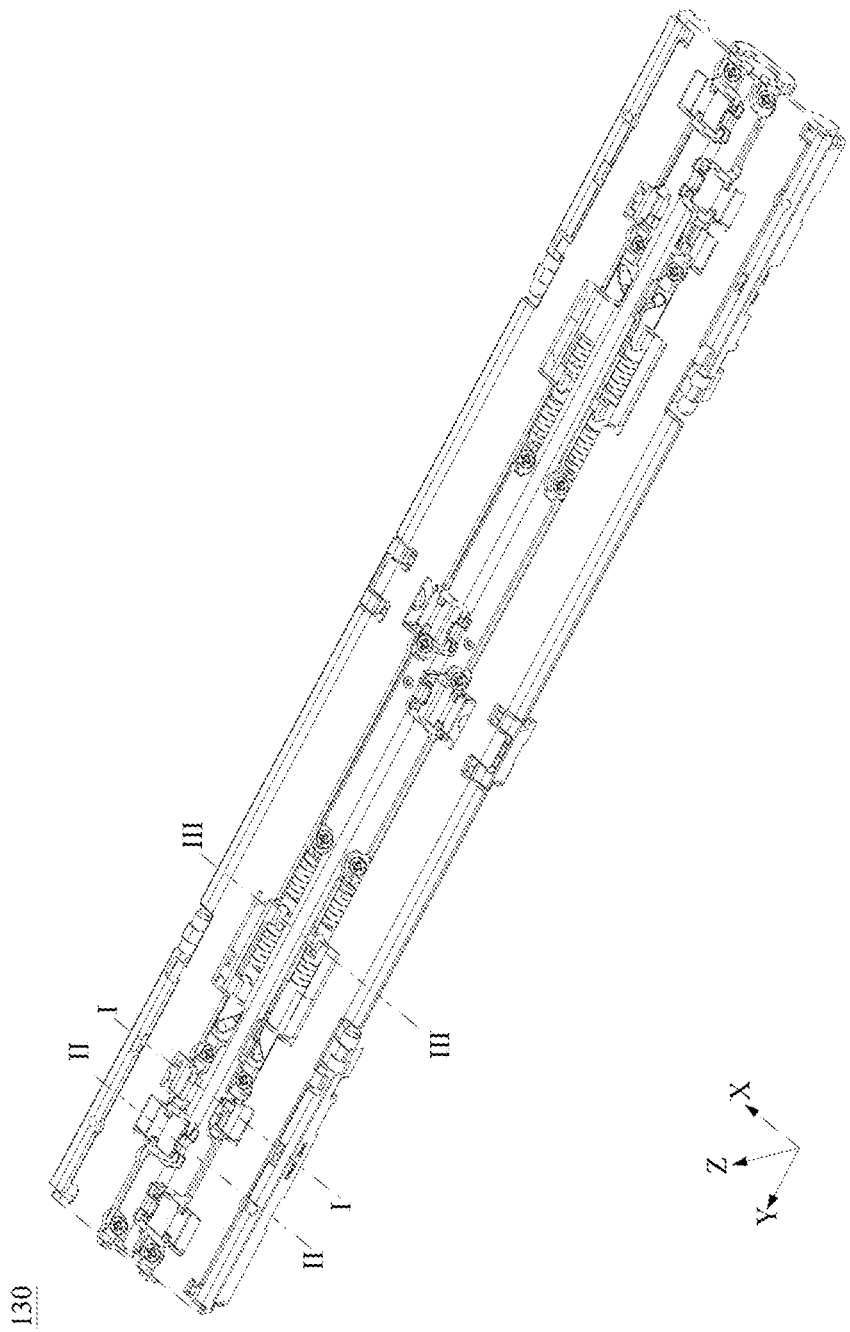
FIG. 6 is a schematic structural diagram of a foldable mechanism in the foldable apparatus shown in FIG. 5.
Figure 7:
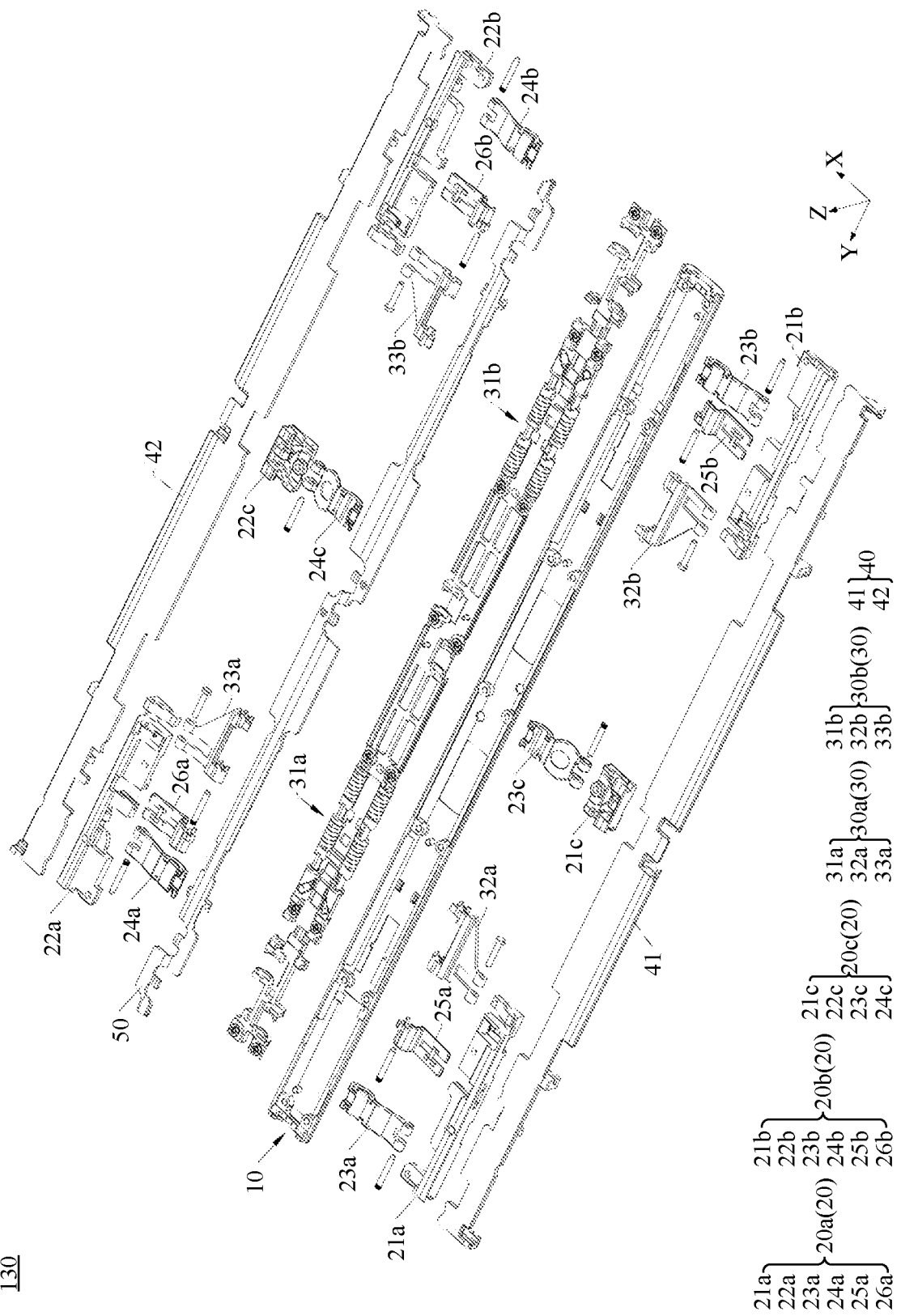
FIG. 7 is a schematic diagram of an exploded structure of the foldable mechanism shown in FIG. 6.

Referring to FIG. 6 and FIG. 7, FIG. 6 is a schematic structural diagram of the foldable mechanism 130 in the foldable terminal 100 shown in FIG. 5. FIG. 7 is a schematic diagram of an exploded structure of the foldable mechanism 130 shown in FIG. 6.

The foldable mechanism 130 includes a base 10, a connection assembly 20, a damping assembly 30, a pressing plate assembly 40, and a floating plate 50. Both the connection assembly 20 and the damping assembly 30 are mounted on the base 10 and may be folded or unfolded relative to the base 10. The pressing plate assembly 40 is slidably and rotatably connected to the connection assembly 20 and may be folded or unfolded relative to the base 10 under the driving of the connection assembly 20. The floating plate 50 is slidably connected to the base 10 and slidably and rotatably connected to the connection assembly 20. Exemplarily, the base 10 extends along the Y-axis direction.

When the foldable mechanism 130 is in a folded state, the connection assembly 20, the damping assembly 30, and the pressing plate assembly 40 are all in the folded state. When the foldable mechanism 130 is in an unfolded state, the connection assembly 20, the damping assembly 30, and the pressing plate assembly 40 are all in the unfolded state. During switching of the foldable mechanism 130 from the folded state to the unfolded state, the connection assembly 20, the damping assembly 30, and the pressing plate assembly 40 all switch from the folded state to the unfolded state, and driven by the connection assembly 20 and the damping assembly 30, the floating plate 50 moves relative to the base 10 along the Z-axis direction, so as to realize floating of the floating plate 50 relative to the base 10. During switching of the foldable mechanism 130 from the unfolded state to the folded state, the connection assembly 20, the damping assembly 30, and the pressing plate assembly 40 all switch from the unfolded state to the folded state, and driven by the connection assembly 20, the floating plate 50 moves relative to the base 10 along the negative direction of the Z axis, so as to realize sinking of the floating plate 50 relative to the base 10.

In this embodiment, there are three connection assemblies 20, and the three connection assemblies 20 are arranged apart from one another along the Y-axis direction. The three connection assemblies 20 are a first connection assembly 20a, a second connection assembly 20b, and a third connection assembly 20c respectively. The third connection assembly 20c is located between the first connection assembly 20a and the second connection assembly 20b. The first connection assembly 20a is located on a front side of the foldable mechanism 130, the second connection assembly 20b is located on a rear side of the foldable mechanism 130, and the third connection assembly 20c is located in a middle portion of the foldable mechanism 130. In some other embodiments, there may be one, two, four, or more connection assemblies 20. A quantity of the connection assembly 20 is not specifically limited in this application.

The first connection assembly 20a includes a first fixed frame 21a, a second fixed frame 22a, a first main swing arm 23a, a second main swing arm 24a, a first secondary swing arm 25a, and a second secondary swing arm 26a. The first fixed frame 21a is located on one side of the base 10, and the second fixed frame 22a is located on the other side of the base 10. The first main swing arm 23a is rotatably connected to the first fixed frame 21a and slidably and rotatably connected to the base 10. The second main swing arm 24a is rotatably connected to the second fixed frame 22a and slidably and rotatably connected to the base 10. The first secondary swing arm 25a is slidably connected to the first fixed frame 21a and rotatably connected to the base 10. The second secondary swing arm 26a is slidably connected to the second fixed frame 22a and rotatably connected to the base 10.

When the first connection assembly 20a switches between the folded state and the unfolded state, a direction in which the first fixed frame 21a, the first main swing arm 23a, and the first secondary swing arm 25a rotate relative to the base 10 is a first direction, and a direction in which the second fixed frame 22a, the second main swing arm 24a, and the second secondary swing arm 26a rotate relative to the base 10 is a second direction. The second direction is opposite to the first direction.

Exemplarily, when the first connection assembly 20a switches from the folded state to the unfolded state, the first fixed frame 21a, the first main swing arm 23a, and the first secondary swing arm 25a rotate counterclockwise relative to the base 10, and the second fixed frame 22a, the second main swing arm 24a, and the second secondary swing arm 26a rotate clockwise relative to the base 10. When the first connection assembly 20a switches from the unfolded state to the folded state, the first main swing arm 23a and the first secondary swing arm 25a rotate clockwise relative to the base 10, and the second main swing arm 24a and the second secondary swing arm 26a rotate counterclockwise relative to the base 10.

It should be noted that the second connection assembly 20b and the first connection assembly 20a may be identical or similar assemblies, symmetrical or partially symmetrical structures, or different structures. In this embodiment, the second connection assembly 20b may be centrally symmetrical with the first connection assembly 20a. Basic structures of various components in the second connection assembly 20b, a connection relationship between the components, and a connection relationship between the components and components outside the assembly may all be obtained with reference to the relevant design of the first connection assembly 20a, and the second connection assembly 20b may be different from the first connection assembly 20a in detailed structure or position arrangement of the components. The second connection assembly 20b includes a first fixed frame 21b, a second fixed frame 22b, a first main swing arm 23b, a second main swing arm 24b, a first secondary swing arm 25b, and a second secondary swing arm 26b.

The third connection assembly 20c includes a first fixed frame 21c, a second fixed frame 22c, a first main swing arm 23c, and a second main swing arm 24c. Basic structures of various components in the third connection assembly 20c, a connection relationship between the components, and a connection relationship between the components and components outside the assembly may be obtained with reference to the relevant design of the first connection assembly 20a. In some other embodiments, the third connection assembly 20c may also include a first secondary swing arm (not marked in the figure) and a second secondary swing arm (not marked in the figure), which is not specifically limited in this application.

It should be noted that the first fixed frame 21a of the first connection assembly 20a, the first fixed frame 21b of the second connection assembly 20b, and the first fixed frame 21c of the third connection assembly 20c may be structural members independent of one another or multiple parts of an integrated structural member. Additionally/alternatively, the second fixed frame 22a of the first connection assembly 20a, the second fixed frame 22b of the second connection assembly 20b, and the second fixed frame 22c of the third connection assembly 20c may be structural members independent of one another or multiple parts of an integrated structural member.

It should be understood that "and/or" as referred to in the embodiments of this application refers to both "and" and "or". For example, A and/or B includes three cases where only A exists, only B exists, and A and B exist at the same time. The following descriptions of "and/or" can be understood in the same way.

The damping assembly 30 is slidably and rotatably connected to the connection assembly 20. In this embodiment, there are two damping assemblies 30, and the two damping assemblies 30 are arranged apart from each other along the Y-axis direction. The two damping assemblies 30 are a first damping assembly 30a and a second damping assembly 30b respectively, and the first damping assembly 30a is slidably and rotatably connected to the first connection assembly 20a. During folding or unfolding of the first connection assembly 20a relative to the base 10, the first damping assembly 30a may provide a damping force. The second damping assembly 30b is slidably and rotatably connected to the second connection assembly 20b. During folding or unfolding of the second connection assembly 20b relative to the base 10, the second damping assembly 30b may provide a damping force. The user can obviously feel the damping forces provided by the first damping assembly 30a and the second damping assembly 30b when the user uses the foldable terminal 1000, for example, when the foldable terminal 1000 is in the folded state or the flattened state, and when the foldable terminal 1000 switches between the folded state and the flattened state, and the user can experience a better hand feel, thereby improving user experience.

In some other embodiments, there may alternatively be three damping assemblies 30, the three damping assemblies 30 are a first damping assembly 30a, a second damping assembly 30b, and a third damping assembly (not marked in the figure) respectively, and the third damping assembly is slidably connected to the third connection assembly 20c. During folding or unfolding of the second connection assembly 20c relative to the base 10, the third damping assembly may provide a damping force. Alternatively, there may be one, four, or more damping assemblies 30. A quantity of the damping assembly 30 is not specifically limited in this application.

In this embodiment, the first damping assembly 30a includes a damping member 31a, a first damping swing arm 32a, and a second damping swing arm 33a. The damping member 31a is mounted on the base 10. The first damping swing arm 32a is rotatably connected to the damping member 31a and slidably and rotatably connected to the first fixed frame 21a. The second damping swing arm 33a is rotatably connected to the damping member 31a and slidably and rotatably connected to the second fixed frame 22a.

It should be noted that the second damping assembly 30b and the first damping assembly 30a may be identical or similar assemblies, symmetrical or partially symmetrical structures, or different structures. In this embodiment, the second damping assembly 30b may be mirror-symmetrical with the first damping assembly 30a. Basic structures of various components in the second damping assembly 30b, a connection relationship between the components, and a connection relationship between the components and components outside the assembly may all be obtained with reference to the relevant design of the first damping assembly 30a, and the second damping assembly 30b may be different from the first damping assembly 30a in detailed structure or position arrangement of the components. The second damping assembly 30b includes a damping member 31b, a first damping swing arm 32b, and a second damping swing arm 33b.

The pressing plate assembly 40 is slidably and rotatably connected to the connection assembly 20. In this embodiment, the pressing plate assembly 40 includes a first pressing plate 41 and a second pressing plate 42. A front side of the first pressing plate 41 is slidably and rotatably connected to the first secondary swing arm 25a and slidably and rotatably connected to the first fixed frame 21a. A rear side of the first pressing plate 41 is slidably and rotatably connected to the first secondary swing arm 25b and slidably and rotatably connected to the first fixed frame 21b. A middle portion of the first pressing plate 41 is slidably and rotatably connected to the first fixed frame 21c. A front side of the second pressing plate 42 is slidably and rotatably connected to the second secondary swing arm 26a and slidably and rotatably connected to the second fixed frame 22a. A rear side of the second pressing plate 42 is slidably and rotatably connected to the second secondary swing arm 26b and slidably and rotatably connected to the second fixed frame 22b. A middle portion of the second pressing plate 42 is slidably and rotatably connected to the second fixed frame 22c.

The floating plate 50 is located between the first pressing plate 41 and the second pressing plate. A front side of the floating plate 50 is slidably and rotatably connected to the first secondary swing arm 25a and the second secondary swing arm 26a. A rear side of the floating plate 50 is slidably and rotatably connected to the first secondary swing arm 25b and the second secondary swing arm 26b. During switching of the foldable mechanism 130 from the folded state to the unfolded state, the first connection assembly 20a, the second connection assembly 20b, and the third connection assembly 20c all switch from the folded state to the unfolded state, and the first secondary swing arm 25a, the second secondary swing arm 26a, the first secondary swing arm 25b, and the second secondary swing arm 26b slide relative to the floating plate 50 and drive the floating plate 50 to move relative to the base 10 along the positive direction of the Z axis, to realize floating of the floating plate 50 relative to the base 10.

During switching of the foldable mechanism 130 from the unfolded state to the folded state, the first connection assembly 20a, the second connection assembly 20b, and the third connection assembly 20c all switch from the unfolded state to the folded state, and the first secondary swing arm 25a, the second secondary swing arm 26a, the first secondary swing arm 25b, and the second secondary swing arm 26b slide relative to the floating plate 50 and drive the floating plate 50 to move relative to the base 10 along the negative direction of the Z axis, to realize sinking of the floating plate 50 relative to the base 10.

Figure 8:
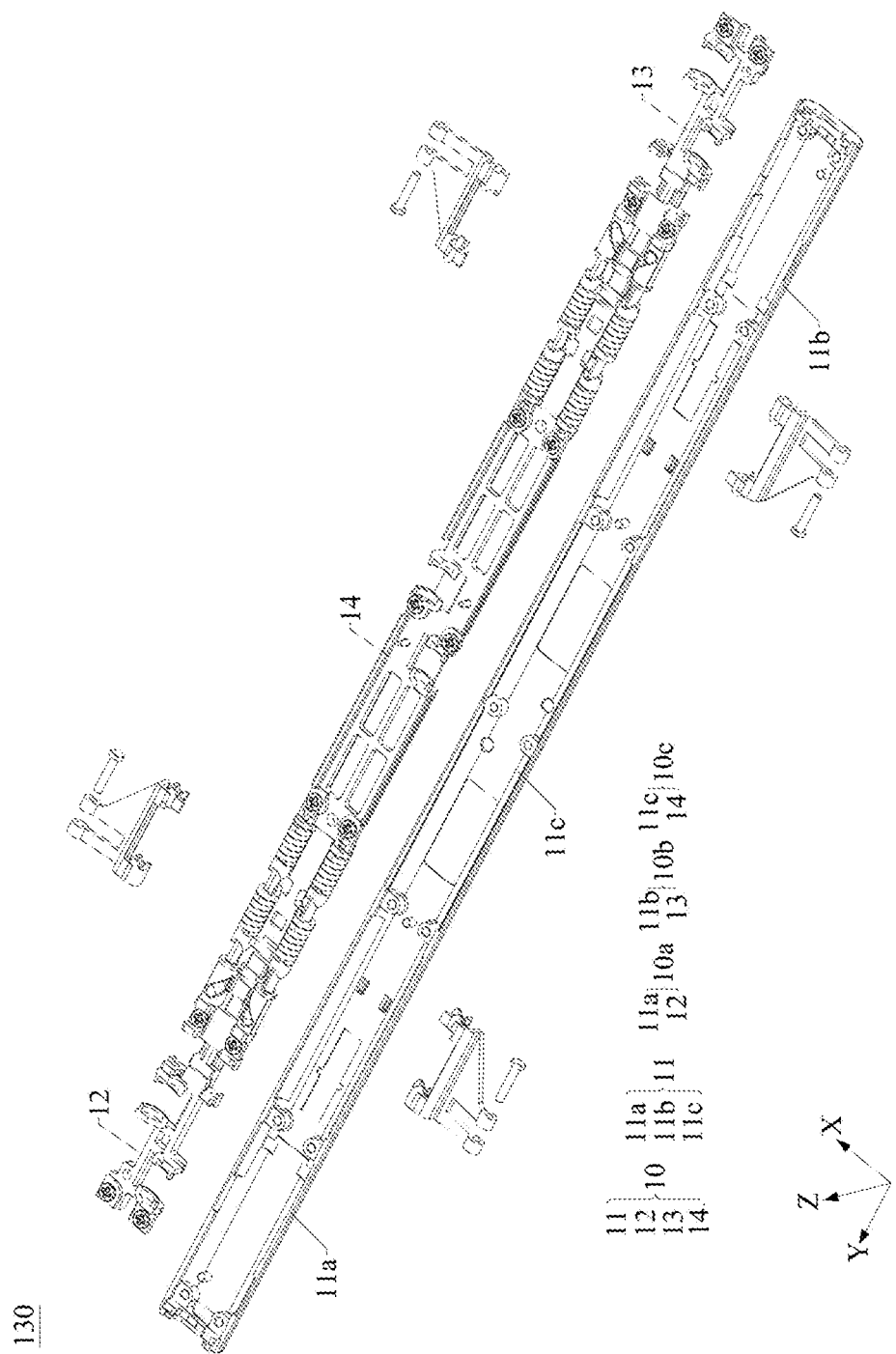
FIG. 8 is a schematic diagram of a partial structure of the foldable mechanism shown in FIG. 7.

Referring to FIG. 7 and FIG. 8, FIG. 8 is a schematic diagram of a partial structure of the foldable mechanism 130 shown in FIG. 7.

The base 10 includes a shaft cover 11, a first bracket 12, a second bracket 13, and a third bracket 14. The first bracket 12, the second bracket 13, and the third bracket 14 are all fixedly connected to the shaft cover 11. Along the Y-axis direction, the third bracket 14 is located between the first bracket 12 and the second bracket 13, and is disposed apart from both the first bracket 12 and the second bracket 13.

In this embodiment, the shaft cover 11 includes a front end portion 11a, a rear end portion 11b, and a middle portion 11c, and the middle portion 11c is connected between the front end portion 11a and the rear end portion 11b. Specifically, along the Y-axis direction, the front end portion 11a, the middle portion 11c, and the rear end portion 11b are arranged in sequence. The front end portion 11a, the rear end portion 11b, and the middle portion 11c are integrally formed. That is, the shaft cover 11 is an integrally formed structural member. In some other embodiments, the front end portion 11a, the rear end portion 11b, and the middle portion 11c may alternatively form an integrated structural member by assembly. That is, the shaft cover 11 is an integrated structural member formed by assembly.

The first bracket 12 is fixedly connected to the front end portion 11a of the shaft cover 11, and forms a front end portion 10a of the base 10 together with the front end portion 11a of the shaft cover 11. The second bracket 13 is fixedly connected to the rear end portion 11b of the shaft cover 11, and forms a rear end portion 10b of the base 10 together with the rear end portion 11b of the shaft cover 11. The third bracket 14 is fixedly connected to the middle portion 11c of the shaft cover 11, and forms a middle portion 10c of the base 10 together with the middle portion 11c of the shaft cover 11. The front end portion 10a of the base 10 fits and is connected to the first connection assembly 20a, the rear end portion 10b of the base 10 fits and is connected to the second connection assembly 20b, and the middle portion 10c of the base 10 fits and is connected to the third connection assembly 20c.

Figure 9:
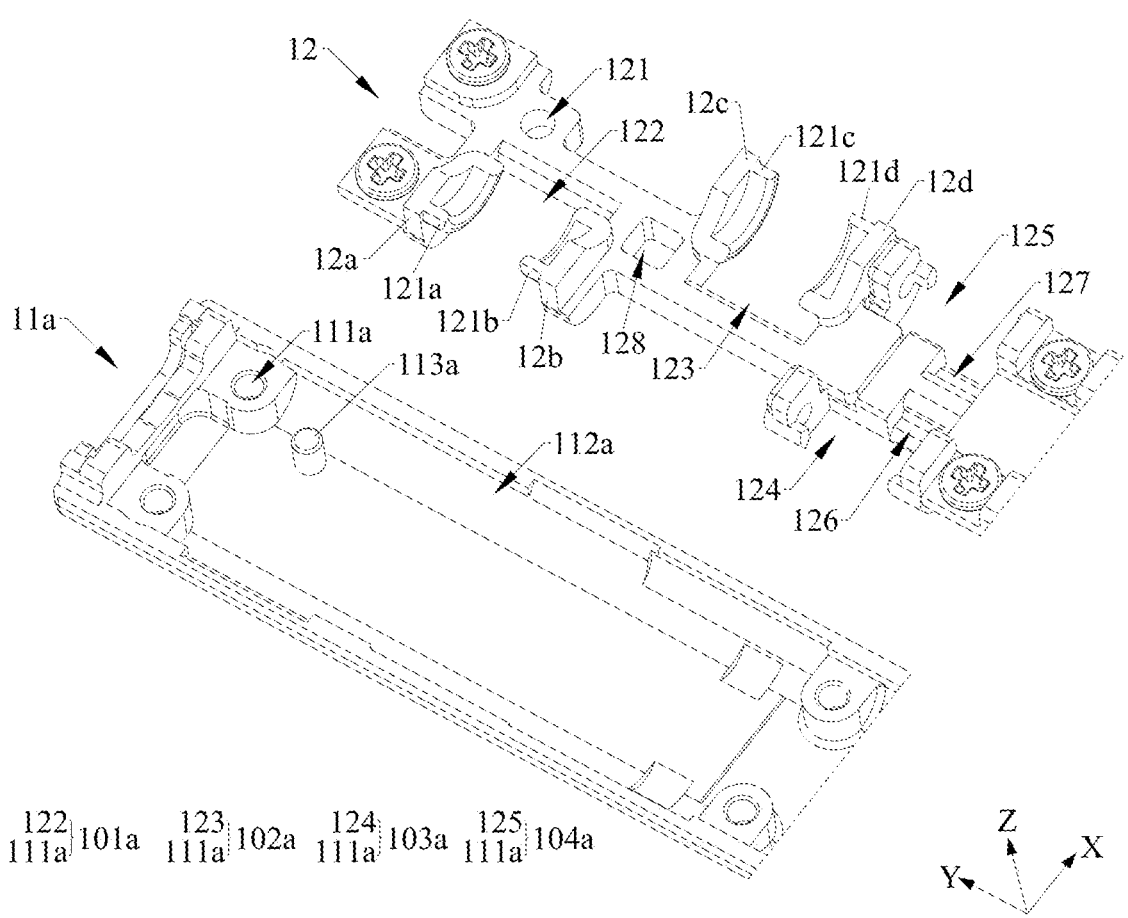
FIG. 9 is a schematic structural diagram of a front end portion of a shaft cover and a first bracket in the structure shown in FIG. 8.

Referring to FIG. 8 and FIG. 9, FIG. 9 is a schematic structural diagram of the front end portion 11a of the shaft cover 11 and the first bracket 12 in the structure shown in FIG. 8. FIG. 9 only shows a structure in which the front end portion 11a of the shaft cover 11 is away from the middle portion 11c.

The front end portion 11a of the shaft cover 11 is provided with a mounting hole 111a and a mounting groove 112a, and openings of the mounting hole 111a and the mounting groove 112a are both located on a top surface (not marked in the figure) of the front end portion 11a. Both the mounting hole 111a and the mounting groove 112a are recessed in a direction from the top surface of the front end portion 11a to a bottom surface (not marked in the figure) (the negative direction of the Z axis shown in the figure). Specifically, the mounting hole 111a is located at an edge of the front end portion 11a, and the mounting groove 112a is located in the middle of the front end portion 11a. Exemplarily, there are four mounting holes 111a, and the four mounting holes 111a are respectively located at four positions of the front end portion 11a and are distributed in a matrix. It should be understood that a shape of the mounting hole 111a is not limited to a circular hole shown in FIG. 10, and may alternatively be a square hole or a special-shaped hole.

In addition, the front end portion 11a of the shaft cover 11 is further provided with a positioning column 113a, and the positioning column 113a is disposed on a groove bottom wall (not marked in the figure) of the mounting groove 112a. The positioning column 113a extends from the groove bottom wall of the mounting groove 112a along the positive direction of the Z axis. Exemplarily, the positioning column 113a is cylindrical. In some other embodiments, the positioning column 113a may alternatively be in a shape of a square column or a special-shaped column.

The first bracket 12 is provided with a positioning hole 121, and an opening of the positioning hole 121 is located on a bottom surface (not marked in the figure) of the first bracket 12. The positioning hole 121 is recessed in a direction from the bottom surface of the first bracket 12 to a top surface (the positive direction of the Z axis shown in the figure), and runs through the top surface of the first bracket 12. That is, the positioning hole 121 runs through the first bracket 12 along a thickness direction of the first support plate 12 (the Z axis direction shown in the figure). The positioning hole 121 matches the positioning column 113a. When the first bracket 12 is assembled with the front end portion 11a, the positioning column 113a may pass through the positioning hole 121, so as to realize positioning between the first bracket 12 and the shaft cover 11, which ensures accuracy of assembly between the first bracket 12 and the shaft cover 11.

The first bracket 12 is further provided with a first notch 122 and a second notch 123. Openings of the first notch 122 and the second notch 123 are both located on the top surface of the first bracket 12. Both the first notch 122 and the second notch 123 are recessed from the top surface of the first bracket 12 to the bottom surface (the Z-axis direction shown in the figure), and run through the top surface of the first bracket 12. Specifically, the first notch 122 is located on a left side of the first bracket 12, and runs through a left side surface (not marked in the figure) of the first bracket 12. The second notch 123 is located on a right side of the first bracket 12, and runs through a right side surface (not marked in the figure) of the first bracket 12.

The first notch 122 and the second notch 123 are arranged apart along the Y-axis direction. The first notch 122 and the second notch 123 are arranged in a partial overlapping manner along the X-axis direction. That is, projections of the first notch 122 and the second notch 123 on an X-Z plane partially overlap. The first notch 122 and the second notch 123 partially reuse a space of the first bracket 12 in the X-axis direction, which helps to reduce a size of the first bracket 12 along the X-axis direction and helps to reduce a size of the foldable mechanism 130 along the X-axis direction, thereby helping to reduce a size of the foldable terminal 1000 along the X-axis direction and being conducive to miniaturized design of the foldable terminal 1000.

In some other embodiments, along the Y-axis direction, the first notch 122 and the second notch 123 may alternatively partially overlap or completely overlap to reduce a size of the first bracket 12 along the Y-axis direction, or along the X-axis direction, the first notch 122 and the second notch 123 may be arranged apart or arranged in a completely overlapping manner.

In addition, the first bracket 12 is further provided with a first boss 12a, a second boss 12b, a third boss 12c, and a fourth boss 12d. The first boss 12a, the second boss 12b, the third boss 12c, and the fourth boss 12d are all disposed on the top surface of the first bracket 12, and all extend from the top surface of the first bracket 12 along the positive direction of the Z axis. The first boss 12a and the second boss 12b are located on the left side of the first bracket 12 and located on two opposite sides of the first notch 122. The third boss 12c and the fourth boss 12d are located on the right side of the first bracket 12 and located on two opposite sides of the second notch 123.

The first boss 12a is provided with a first sliding block 121a, and the first sliding block 121a is disposed on a rear side surface (not marked in the figure) of the first boss 12a. The first sliding block 121a extends from the rear side surface of the first boss 12a along the negative direction of the Y axis, and is located on a top side of the first notch 122. The first sliding block 121a is in a shape of an arc-shaped plate, and is recessed toward the negative direction of the Z axis. An axis center of the first sliding block 121a is parallel to the Y axis. That is, a top surface (not marked in the figure) and a bottom surface (not marked in the figure) of the first sliding block 121a are both arc-shaped surfaces, and both are recessed toward the negative direction of the Z axis.

The second boss 12b is provided with a second sliding block 121b, and the second sliding block 121b is disposed on a front side surface (not marked in the figure) of the second boss 12b. The second sliding block 121b extends from the front side surface of the second boss 12b along the positive direction of the Y axis, and is located on the top side of the first notch 122. The second sliding block 121b and the first sliding block 121a are disposed apart along the Y-axis direction. The second sliding block 121b is in a shape of an arc-shaped plate, and recessed toward the negative direction of the Z axis. The second sliding block 121b is coaxial with the first sliding block 121a. That is, a top surface (not marked in the figure) and a bottom surface (not marked in the figure) of the second sliding block 121b are both arc-shaped surfaces, and both are recessed toward the negative direction of the Z axis. The top surface of the second sliding block 121b is coaxial with the top surface of the first sliding block 121a, and the bottom surface of the second sliding block 121b is coaxial with the bottom surface of the first sliding block 121a.

It should be noted that "coaxial" as referred to in this embodiment of this application means that extension lines of axis centers coincide with each other. For example, "A is coaxial with B" means that an extension line of an axis center of A coincides with an extension line of an axis center of B. The description of "coaxial" in the following may be understood in the same way.

The third boss 12c is provided with a third sliding block 121c, and the third sliding block 121c is disposed on a rear side surface (not marked in the figure) of the third boss 12c. The third sliding block 121c extends from the rear side surface of the third boss 12c along the negative direction of the Y axis, and is located on a top side of the second notch 123. The third sliding block 121c is in a shape of an arc plate, and recessed toward the negative direction of the Z-axis. An axis of the third sliding block 121c is parallel to the Y-axis. That is, a top surface (not marked in the figure) and a bottom surface (not marked in the figure) of the third sliding block 121c are both arc-shaped, and both are recessed toward the negative direction of the Z-axis.

The fourth boss 12d is provided with a fourth sliding block 121d, and the fourth sliding block 121d is disposed on a front side surface (not marked in the figure) of the fourth boss 12d. The fourth sliding block 121d extends from the front side surface of the fourth boss 12d along the positive direction of the Y-axis, and is located on the top side of the second notch 123. The fourth sliding block 121d and the third sliding block 121c are disposed apart along the Y-axis direction. The fourth sliding block 121d is in a shape of an arc-shaped plate, and recessed toward the negative direction of the Z axis. The fourth sliding block 121d is coaxial with the third sliding block 121c. That is, a top surface (not marked in the figure) and a bottom surface (not marked in the figure) of the fourth sliding block 121d are both arc-shaped surfaces, and both are recessed toward the negative direction of the Z axis. The top surface of the fourth sliding block 121d is coaxial with the top surface of the third sliding block 121c, and the bottom surface of the fourth sliding block 121d is coaxial with the bottom surface of the third sliding block 121c.

The first bracket 12 is further provided with a third notch 124 and a fourth notch 125. Openings of the third notch 124 and the fourth notch 125 are both located on the top surface of the first bracket 12. Both the third notch 124 and the fourth notch 125 are recessed from the top surface of the first bracket 12 to the bottom surface, and run through the top surface of the first bracket 12. Specifically, the third notch 124 is located on the left side of the first bracket 12, and runs through the left side surface of the first bracket 12. The fourth notch 125 is located on the right side of the first bracket 12, and runs through the right side surface of the first bracket 12. The third notch 124 is located on a rear side of the first notch 122, and is arranged apart from the first notch 122. The fourth notch 125 is located on a rear side of the second notch 123, and is arranged apart from the second notch 123.

The third notch 124 and the fourth notch 125 are disposed apart and oppositely along the X-axis direction. The third notch 124 and the fourth notch 125 are arranged in a completely overlapping manner along the Y-axis direction. That is, projections of the third notch 124 and the fourth notch 125 on a Y-Z plane completely overlap. The third notch 124 and the fourth notch 125 reuse a space of the first bracket 12 in the Y-axis direction, which helps to reduce a size of the first bracket 12 along the Y-axis direction and helps to reduce a size of the foldable mechanism 130 along the Y-axis direction, thereby helping to reduce a size of the foldable terminal 1000 along the Y-axis direction and being conducive to the miniaturized design of the foldable terminal 1000.

In some other embodiments, along the X-axis direction, the third notch 124 and the fourth notch 125 may alternatively partially overlap or completely overlap to reduce a size of the first bracket 12 along the X-axis direction, or along the Y-axis direction, the third notch 124 and the fourth notch 125 may be arranged apart or arranged in a partially overlapping manner.

The third notch 124 includes a groove bottom wall (not marked in the figure) and two groove side walls (not marked in the figure). Along the Y-axis direction, the two groove side walls are disposed apart and oppositely, and are connected to two opposite sides of the groove bottom wall. A structure of the fourth notch 125 is substantially the same as that of the third notch 124. Details are not described herein again.

In addition, the first bracket 12 is further provided with two first rotating shaft holes (not marked in the figure) and two second rotating shaft holes (not marked in the figure). Openings of the two first rotating shaft holes are located in the two groove side walls of the third notch 124 respectively, and openings of the two second rotating shaft holes are located in the two groove side walls of the fourth notch 125 respectively. The first rotating shaft holes are recessed from the groove side walls of the third notch 124 along the Y-axis direction, and the second rotating shaft holes are recessed from the groove side walls of the fourth notch 125 along the Y-axis direction. Exemplarily, both the first rotating shaft holes and the second rotating shaft holes are circular holes. The two first rotating shaft holes are coaxial, and the two second rotating shaft holes are coaxial.

The first bracket 12 is further provided with two first limiting blocks (not marked in the figure) and two second limiting blocks (not marked in the figure). The two first limiting blocks are disposed on the two groove side walls of the third notch 124 respectively. The two first limiting blocks both extend from the two groove side walls of the third notch 124 along the Y-axis direction, and are oppositely disposed. Specifically, the two first limiting blocks are both located at positions of the two groove side walls of the third notch 124 away from the groove bottom wall. Right side surfaces of the two first limiting blocks are flush with hole walls of the two first rotating shaft holes respectively.

The two second limiting blocks are disposed on the two groove side walls of the fourth notch 125 respectively. The two second limiting blocks both extend from the two groove side walls of the fourth notch 125 along the Y-axis direction, and are oppositely disposed. Specifically, the two second limiting blocks are both located at positions of the two groove side walls of the fourth notch 125 away from the groove bottom walls. Right side surfaces of the two second limiting blocks are flush with hole walls of the two second rotating shaft holes respectively.

In addition, the first bracket 12 is further provided with a first avoidance notch 126, a second avoidance notch 127, and a limiting hole 128. An opening of the first avoidance notch 126 is located in the groove bottom wall of the third notch 124. The first avoidance hole 126 is recessed from the groove bottom wall of the third notch 124 along the positive direction of the X axis, and runs through the top surface of the first bracket 12. An opening of the second avoidance notch 127 is located in the groove bottom wall of the fourth notch 125. The second avoidance hole 127 is recessed from the groove bottom wall of the fourth notch 125 along the negative direction of the X axis, and runs through the top surface of the first bracket 12. The first avoidance hole 126 is mirror-symmetrical with the second avoidance hole 127. In some other embodiments, alternatively, the first avoidance hole 126 may not be mirror-symmetrical with the second avoidance hole 127.

An opening of the limiting hole 128 is located on the top surface of the first bracket 12. The limiting hole 128 is recessed from the top surface of the first bracket 12 to the bottom surface, and run through the bottom surface of the first bracket 12. Specifically, along the Y-axis direction, the limiting hole 128 is located between the first notch 122 and the second notch 123, and the first notch 122 and the second notch 123 are disposed apart. The limiting hole 128 is located between the second boss 12b and the third boss 12c, and the second boss 12b and the third boss 12c are disposed apart. Exemplarily, the limiting hole 128 is a square hole. In some other embodiments, the limiting hole 128 may alternatively be a circular hole or a special-shaped hole.

In this embodiment, the positioning column 113a of the front end portion 11a is mounted in the positioning hole 121 of the first bracket 12, and the first bracket 12 may be fixedly connected to the front end portion 11a by using a fastener (such as a bolt, a pin, or a screw). The first bracket 12 is located in the mounting groove 112a, and is located at a position of the mounting groove 112a away from the middle portion 11c. Specifically, the fastener passes through the first bracket 12 and is fixedly connected to the front end portion 11a, so as to realize the fixed connection between the first bracket 12 and the front end portion 11a. Exemplarily, four fasteners all pass through the first bracket 12, and are respectively fixedly connected to four mounting holes 111a of the front end portion 11a. In some other embodiments, the first bracket 12 may alternatively be fixedly connected to the front end portion 11a of the shaft cover 11 in a manner such as bonding or welding.

The first notch 122 and part of the mounting groove 112a jointly form a first sliding groove 101a, the second notch 123 and part of the mounting groove 112a jointly form a second sliding groove 102a, the third notch 124 and part of the mounting groove 112a jointly form a first rotating groove 103a, and the fourth notch 125 and part of the mounting groove 112a jointly form a second rotating groove 104a.

Figure 10:
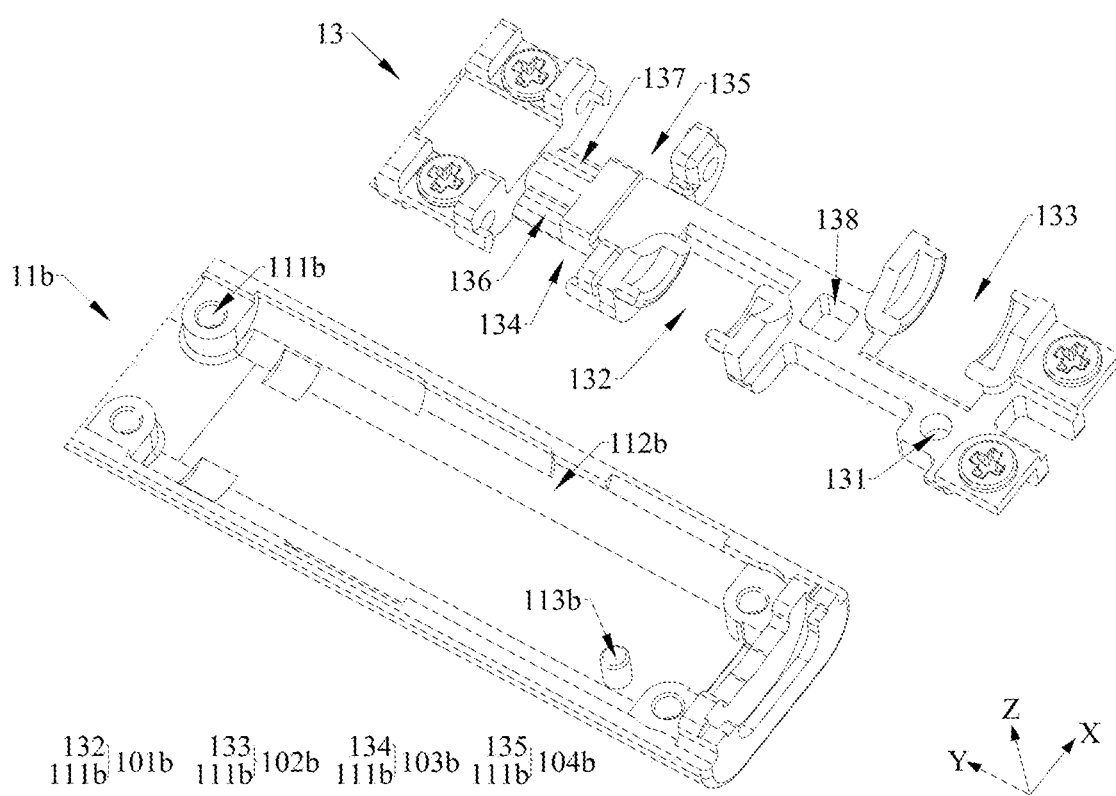
FIG. 10 is a schematic structural diagram of a rear end portion of the shaft cover and a second bracket in the structure shown in FIG. 8.

Referring to FIG. 8 and FIG. 10, FIG. 10 is a schematic structural diagram of the rear end portion 11b of the shaft cover 11 and the second bracket 13 in the structure shown in FIG. 8. FIG. 10 only shows a structure in which the rear end portion 11b of the shaft cover 11 is away from the middle portion 11c.

In this embodiment, the rear end portion 11b of the shaft cover 11 is centrally symmetrical with the front end portion 11a of the shaft cover 11, which can not only improve symmetry of the shaft cover 11, but also simplify an overall structure of the shaft cover 11 and reduce machining costs of the shaft cover 11. It may be understood that structural design of the rear end portion 11b of the shaft cover 11 may be obtained with reference to the relevant solution of the front end portion 11a of the shaft cover 11 (as shown in FIG. 9), and at the same time, it is allowed that the rear end portion 11b of the shaft cover 11 is slightly different from the front end portion 11a of the shaft cover 11 in detailed structure or position arrangement of the components. The rear end portion 11b of the shaft cover 11 is provided with a mounting hole 111b, a mounting groove 112b, and a positioning column 113b.

In some other embodiments, alternatively, the rear end portion 11b of the shaft cover 11 and the front end portion 11a of the shaft cover 11 may be mirror-symmetrical, or the rear end portion 11b of the shaft cover 11 and the front end portion 11a of the shaft cover 11 may be partially symmetrical, or the rear end portion 11b of the shaft cover 11 and the front end portion 11a of the shaft cover 11 may be identical or similar or different structures.

In this embodiment, the second bracket 13 is centrally symmetrical with the first bracket 12, which can not only improve symmetry of the base 10, but also simplify an overall structure of the base 10 and reduce machining costs of the base 10. It may be understood that basic design of structures of components of the second bracket 13, design of a position relationship between the components, and design of a connection relationship between the second bracket 13 and the rear end portion 11b of the shaft cover 11 may all be obtained with reference to the relevant solution of the first bracket 12 (as shown in FIG. 9), and at the same time, it is allowed that the second bracket 13 is slightly different from the first bracket 12 in detailed structure or position arrangement of the components.

The second bracket 13 is provided with a positioning hole 131, a first notch 132, a second notch 133, a third notch 134, a fourth notch 135, a first avoidance notch 136, a second avoidance notch 137, and a limiting hole 138. The first notch 132 and part of the mounting groove 112b jointly form a first sliding groove 101b, the second notch 133 and part of the mounting groove 112b jointly form a second sliding groove 102b, the third notch 134 and part of the mounting groove 112b jointly form a first rotating groove 103b, and the fourth notch 135 and part of the mounting groove 112b jointly form a second rotating groove 104b.

In some other embodiments, alternatively, the second bracket 13 and the first bracket 12 may be mirror-symmetrical, or the second bracket 13 and the first bracket 12 may be partially symmetrical, or the second bracket 13 and the first bracket 12 may be identical or similar or different structures.

Figure 11:
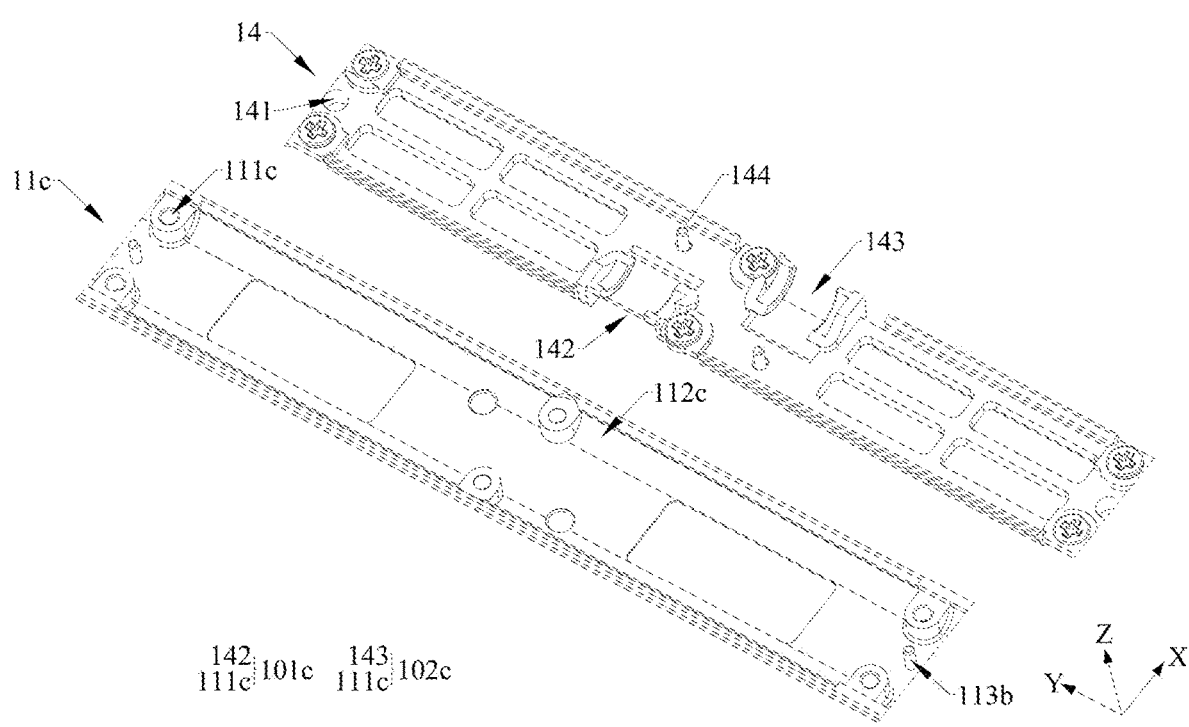
FIG. 11 is a schematic structural diagram of a middle portion of the shaft cover and a third bracket in the structure shown in FIG. 8.

Referring to FIG. 8 and FIG. 11, FIG. 11 is a schematic structural diagram of the middle portion 11c of the shaft cover 11 and the third bracket 14 in the structure shown in FIG. 8.

In this embodiment, the middle portion 11c of the shaft cover 11 is provided with a mounting hole 111c, a mounting groove 112c, and a positioning column 113c. It should be noted that structures of the mounting hole 111c, the mounting groove 112c, and the positioning column 113c are roughly the same as the structures of the mounting hole 111a, the mounting groove 112a, and the positioning post 113a of the front end portion 11a (as shown in FIG. 9) respectively. Details are not described herein again. The mounting groove 112c of the middle portion 11c may be communicated with the mounting groove 112a of the front end portion 11a and the mounting groove 112b of the rear end portion 11b (as shown in FIG. 10).

Exemplarily, there are six mounting holes 111c. Four mounting holes 111c are respectively located at four corners of the middle portion 11c, and two mounting holes 111c are located at middle positions of the middle portion 11c. There are two positioning columns 113c. One positioning column 113c is located at a position of the middle portion 11c near the front end portion 11a and located between two mounting holes 111c, and the other positioning column 113c is located at a position of the middle portion 11c near the rear end portion 11b and located between two mounting holes 111c. It should be noted that quantities of the mounting hole 111c and the positioning column 113c are not limited thereto. In some other embodiments, the quantity of the mounting hole 111c and/or the positioning column 113c may alternatively be one, two, three, five, or more.

The third bracket 14 is provided with a positioning hole 141, a first notch 142, and a second notch 143. It should be noted that structures of the positioning hole 141, the first notch 142, and the second notch 143 are roughly the same as the structures of the positioning hole 121, the first notch 122, and the second notch 123 of the first bracket 12 (as shown in FIG. 9). Details are not described herein again. The first notch 142 and part of the mounting groove 112c jointly form a first sliding groove 101c, and the second notch 143 and part of the mounting groove 112 jointly form a second sliding groove 102c.

Exemplarily, there are two positioning holes 141, one positioning hole 141 is located at a position of the third bracket 14 facing the first bracket 12 (as shown in FIG. 9), and the other positioning hole 141 is located at a position of the third bracket 14 facing the second bracket 13 (as shown in FIG. 10). When the third bracket 14 is assembled with the middle portion 11c, the two positioning columns 113c can pass through the two positioning holes 141 respectively, so as to realize positioning between the third bracket 14 and the middle portion 11c, which ensures accuracy of the assembly between the third bracket 14 and the middle portion 11c.

In addition, the third bracket 14 is further provided with a limiting column 144, and the limiting column 144 is disposed on a top surface of the third bracket 14. The limiting column 144 extends from the top surface of the third bracket 14 along the positive direction of the Z axis. It should be understood that, the shape of the limiting column 144 is not limited to a cylindrical shape as shown in FIG. 11, which may alternatively be a square column or other special shapes.

Exemplarily, there are two limiting columns 144. One limiting column 144 is located on a right side of the first notch 142 and is disposed apart from the first notch 142, and the other limiting column 144 is located on a left side of the second notch 143 and is disposed apart from the second notch 143. In some other embodiments, there may be one, three, or more limiting columns 144. A quantity of the limiting column 144 is not specifically limited in this application.

Figure 12:
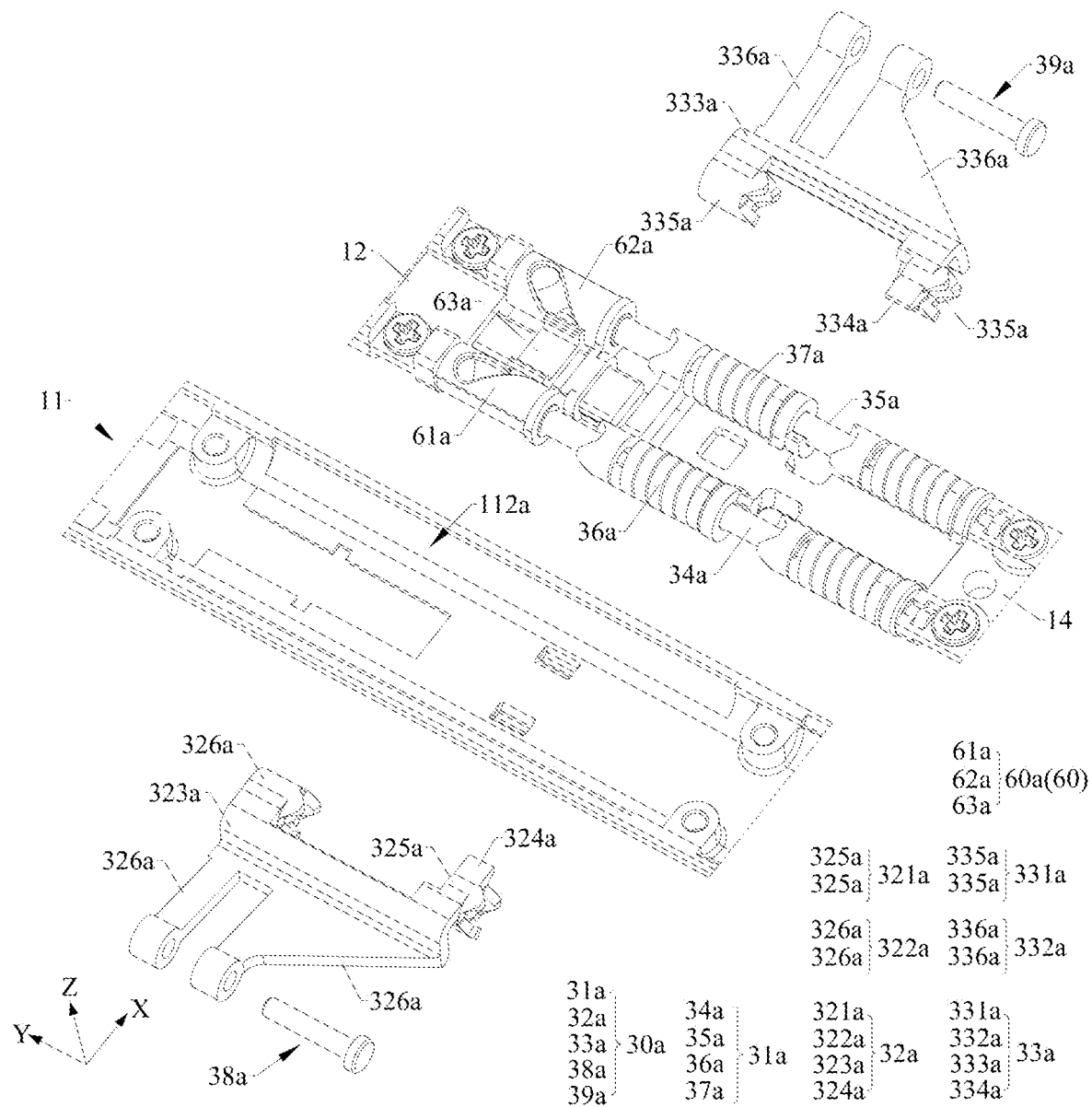
FIG. 12 is a schematic structural diagram of a base and a first damping assembly in the structure shown in FIG. 8.

Referring to FIG. 8 and FIG. 12, FIG. 12 is a schematic structural diagram of the base 10 and the first damping assembly 30a in the structure shown in FIG. 8. FIG. 12 only shows a partial structure of the shaft cover 11, the first bracket 12, and the third bracket 14 in the base 10.

In this embodiment, the damping member 31a of the first damping assembly 30a is mounted in the mounting groove 112a of the front end portion 11a (as shown in FIG. 9) and located at a position of the mounting groove 112a facing the middle portion 11c (as shown in FIG. 11). Specifically, one end of the damping member 31a is mounted on the first bracket 12, and the other end is mounted on the third bracket 14. In some other embodiments, the damping member 31a of the first damping assembly 30a may alternatively be located at a position of the mounting groove 112a away from the middle portion 11c, which is not specifically limited in this application.

The damping member 31a includes a first damping shaft 34a, a second damping shaft 35a, a first damping body 36a, and a second damping body 37a. Both the first damping shaft 34a and the second damping shaft 35a are mounted in the mounting groove 112a of the front end portion 11a, and are arranged in parallel and apart along the X-axis direction. Specifically, the first damping shaft 34a is mounted on a left side of a first portion 10a, and the second damping shaft 35a is mounted on a right side of the first portion 10a. One end of the first damping shaft 34a is mounted on the first bracket 12, and the other end is mounted on the third bracket 14. One end of the second damping shaft 35a is mounted on the first bracket 12, and the other end is mounted on the third bracket 14. Exemplarily, both the first damping shaft 34a and the second damping shaft 35a are circular shafts. In some other embodiments, the first damping shaft 34a and the second damping shaft 35a may alternatively be flat shafts or other special-shaped shafts.

The first damping body 36a sleeves the first damping shaft 34a, and is mounted in the mounting groove 112a of the front end portion 11a. In this embodiment, a front end surface of the first damping body 36a is a hinged surface, the front end surface of the first damping body 36a includes a plurality of peaks and a plurality of valleys, and the plurality of peaks and the plurality of valleys are alternately arranged. The first damping body 36a includes a spring. Exemplarily, there are two first damping bodies 36a. Both the two first damping bodies 36a sleeve the first damping shaft 34a, and are arranged apart along the Y-axis direction.

When relative rotation occurs between the first damping body 36a and the first damping shaft 34a, the spring of the first damping body 36a deforms to generate a damping force. When the user folds or unfolds the foldable terminal 1000, the user can feel a damping force generated by the rotation of the first damping body 36a relative to the first damping shaft 34a, and the user can experience a better hand feel, thereby improving the user experience.

The second damping body 37a sleeves the second damping shaft 35a, and is mounted in the mounting groove 112a of the front end portion 11a. In this embodiment, a front end surface of the second damping body 37a is a hinged surface, the front end surface of the second damping body 37a includes a plurality of peaks and a plurality of valleys, and the plurality of peaks and the plurality of valleys are alternately arranged. The second damping body 37a includes a spring. Exemplarily, there are two second damping bodies 37a. Both the two second damping bodies 37a sleeve the second damping shaft 35a, and are arranged apart along the Y-axis direction. Each second damping body 37a is arranged apart from and opposite the first damping body 36a along the X-axis direction.

When relative rotation occurs between the second damping body 37a and the second damping shaft 35a, the spring of the second damping body 37a deforms to generate a damping force. When the user folds or unfolds the foldable terminal 1000, the user can feel a damping force generated by the rotation of the second damping body 37a relative to the second damping shaft 35a, and the user can experience a better hand feel, thereby improving the user experience.

In some other embodiments, there may be one, three, or more first damping bodies 36a, and/or there may be one, three, or more second damping bodies 37a. Quantities of the first damping body 36a and the second damping body 37a are not specifically limited in this embodiment of this application.

The first damping swing arm 32a sleeves the first damping shaft 34a, and is hinged to both the two first damping bodies 36a. In this embodiment, the first damping swing arm 32a includes a rotating portion 321a, a sliding portion 322a, a connecting portion 323a, and a support portion 324a. The connecting portion 323a is connected between the rotating portion 321a and the sliding portion 322a. The support portion 324a is connected to an end of the rotating portion 321a away from the connecting portion 323a. The rotating portion 321a, the sliding portion 322a, the connecting portion 323a, and the support portion 324a may be integrally formed.

The rotating portion 321a includes two sub-rotating portions 325a, and the two sub-rotating portions 325a are arranged apart along the Y-axis direction. A rear end surface of each sub-rotating portion 325a is a hinged surface, the rear end surface of the sub-rotating portion 325a includes a plurality of peaks and a plurality of valleys, and the plurality of peaks and the plurality of valleys are alternately arranged. Exemplarily, the sub-rotating portion 325a is roughly cylindrical.

Specifically, the two sub-rotating portions 325a both sleeve the first damping shaft 34a, and are respectively hinged to the two first damping bodies 36a The hinged surface of each sub-rotating portion 325a is hinged to the hinged surface of each first damping body 36a. The first damping swing arm 32a, when rotating relative to the base 10, drives the first damping shaft 34a to rotate relative to the base 10. In this embodiment, a center of rotation of the first damping swing arm 32a relative to the damping member 31a is a second center. That is, a center of rotation of the first damping swing arm 32a relative to the base 10 is the second center. The second center is an axis center of the first damping shaft 34a.

The sliding portion 322a includes two sub-sliding portions 326a, and the two sub-sliding portions 326a are arranged apart along the Y-axis direction. An end of each sub-sliding portion 326a away from the connecting portion 323a is provided with a pin hole (not marked in the figure), and the pin hole runs through the sub-sliding portion 326a along the Y-axis direction.

In this embodiment, there is one support portion 324a, and the support portion 324a is fixedly connected to an end of one sub-rotating portion 325a away from the connecting portion 323a. In some other embodiments, there may alternatively be two support portions 324a, and the two support portions 324a are respectively fixedly connected to ends of the two sub-rotating portions 325a away from the connecting portion 323a.

The second damping swing arm 33a sleeves the second damping shaft 35a, and is hinged to both the two second damping bodies 37a. In this embodiment, a structure of the second damping swing arm 33a is the same as that of the first damping swing arm 32a. The second damping swing arm 33a includes a rotating portion 331a, a sliding portion 332a, a connecting portion 333a, and a support portion 334a. Specifically, the two sub-rotating portions 335a of the rotating portion 331a both sleeve the second damping shaft 35a, and are respectively hinged to the two second damping bodies 37a. The second damping swing arm 33a, when rotating relative to the base 10, drives the second damping shaft 35a to rotate relative to the base 10. A center of rotation of the second damping swing arm 33a relative to the damping member 31a is a fourth center. That is, a center of rotation of the second damping swing arm 33a relative to the base 10 is the fourth center. The fourth center is an axis center of the second damping shaft 35a.

When the first damping assembly 30a enters the flattened state from the folded state, that is, when the foldable mechanism 130 (as shown in FIG. 6) enters the flattened state from the folded state, namely, when the foldable terminal 1000 (as shown in FIG. 3) enters the flattened state from the folded state, in the first damping swing arm 32a, the peaks on the rear end surface of the sub-rotating portion 325a may enter the valleys on the front end surface of the first damping body 36a, and at the same time, the peaks on the front end surface of the first damping body 36a may also enter the valleys on the rear end surface of the sub-rotating portion 325a. In the second damping swing arm 33a, the peaks on the rear end surface of the sub-rotating portion 335a may enter the valleys on the front end surface of the second damping body 37a, and the peaks on the front end surface of the second damping body 37a may also enter the valleys on the rear end surface of the sub-rotating portion 335a. In this case, a damping force generated by rotation of the first damping swing arm 32a relative to the first damping shaft 34a is relatively small, and a damping force generated by rotation of the second damping swing arm 33a relative to the second damping shaft 35a is relatively small, so that the user can experience a hand feel of the foldable terminal 1000 being flattened in place.

In addition, the first damping assembly 30a further includes a first pin shaft 38a and a second pin shaft 39a, the sliding portion 322a of the first damping swing arm 32a sleeves the first pin shaft 38a, and the sliding portion 332a of the second damping swing arm 33a sleeves the second pin shaft 39a. The first pin shaft 38a fits the pin holes of the two sub-sliding portions 326a of the sliding portion 322a, and the second pin shaft 39a fits the pin holes of the two sub-sliding portions 336a of the sliding portion 332a. Specifically, the first pin shaft 38a is mounted in the pin holes of the two sub-sliding portions 326a, and the second pin shaft 39a is mounted in the pin holes of the two sub-sliding portions 336a.

Figure 13:
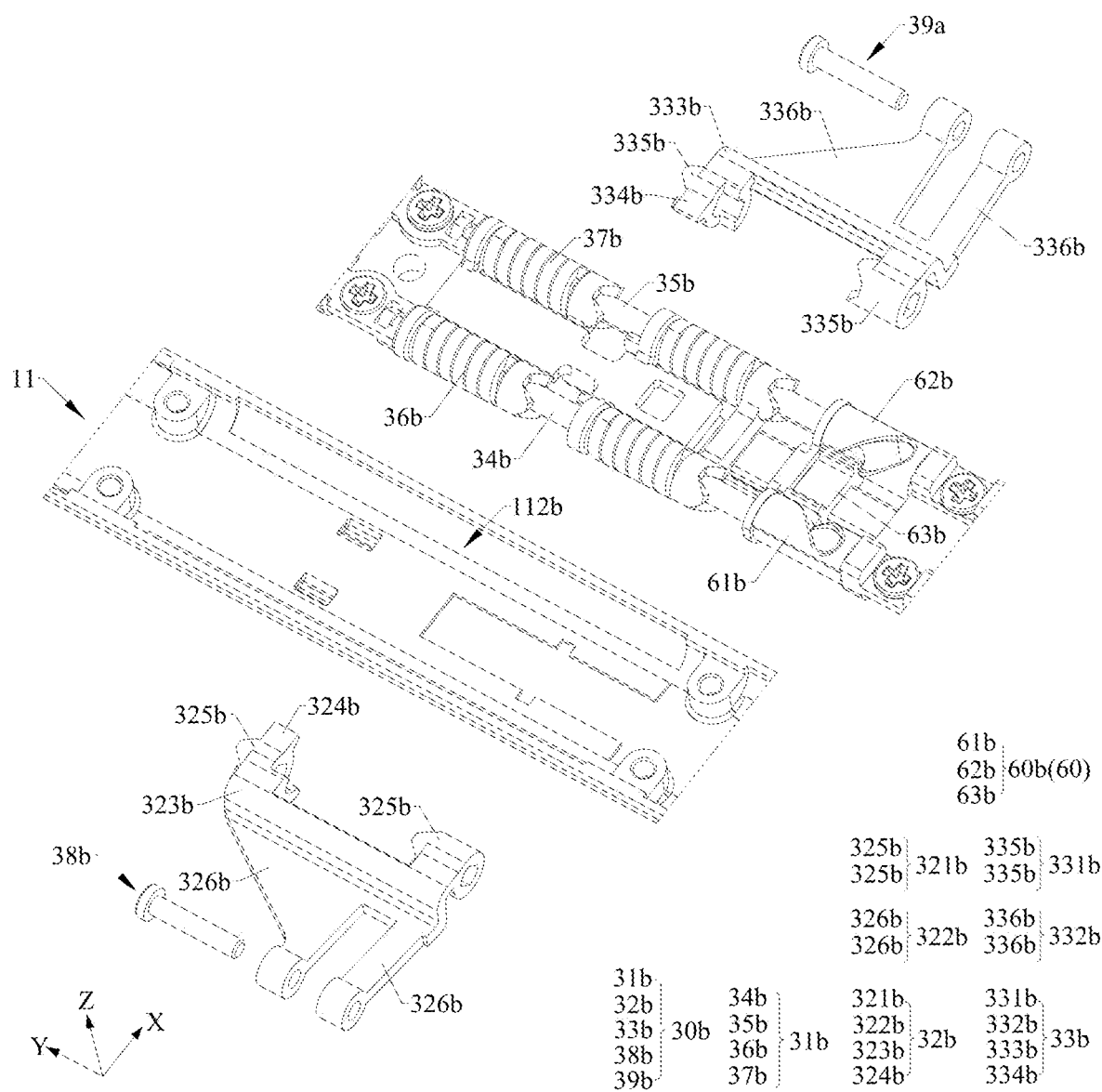
FIG. 13 is a schematic structural diagram of the base and a second damping assembly in the structure shown in FIG. 8.
Figure 18:
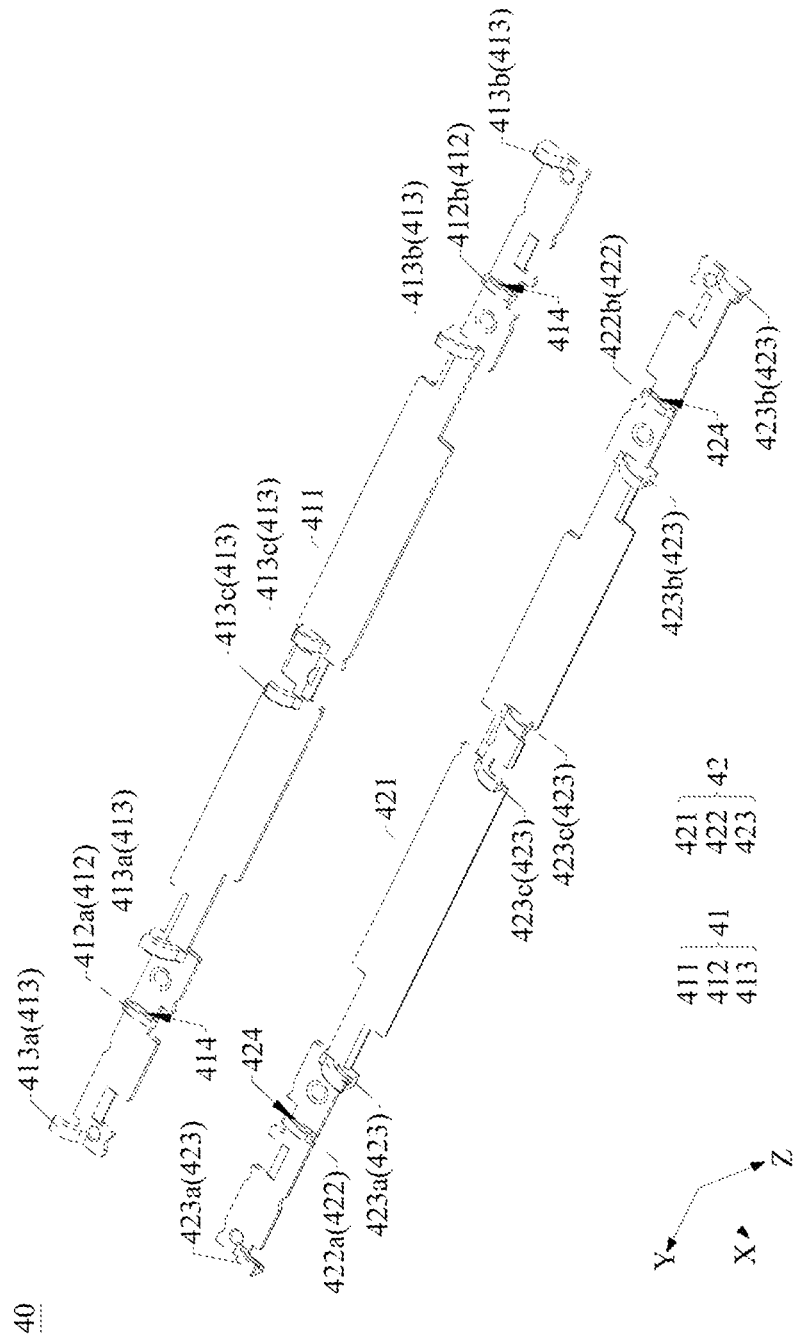
FIG. 18 is a schematic structural diagram of the pressing plate assembly shown in FIG. 17 at another angle.

Referring to FIG. 8 and FIG. 13, FIG. 13 is a schematic structural diagram of the base 10 and the second damping assembly 30b in the structure shown in FIG. 8. FIG. 18 only shows a partial structure of the shaft cover 11, the second bracket 13, and the third bracket 14 in the base 10.

The damping member 31b of the second damping assembly 30b is mounted in the mounting groove 112b of the rear end portion 11b (as shown in FIG. 10) and located at a position of the mounting groove 112b facing the middle portion 11c. Specifically, one end of the damping member 31b is mounted on the second bracket 13, and the other end is mounted on the third bracket 14. In some other embodiments, the damping member 31b of the second damping assembly 30b may alternatively be located at a position of the mounting groove 112b away from the middle portion 11c.

The damping member 31b includes a first damping shaft 34b, a second damping shaft 35b, a first damping body 36b, and a second damping body 37b. In this embodiment, structures of various components in the damping member 31b and a cooperation relationship between the components may be obtained with reference to the relevant description of the damping member 31a of the first damping assembly 30a (as shown in FIG. 11). Details are not described herein again. Rear end surfaces of the first damping body 36b and the second damping body 37b are both hinged surfaces.

In this embodiment, both the first damping shaft 34b and the second damping shaft 35b are circular shafts. An axis center of the first damping shaft 34b and an axis center of the second damping shaft 35b are both parallel to the Y-axis direction. Exemplarily, the first damping shaft 34b is coaxial with the first damping shaft 34a, and the second damping shaft 35b is coaxial with the second damping shaft 35a. That is, the axis center of the first damping shaft 34b coincides with the axis center of the first damping shaft 34a, and the axis center of the second damping shaft 35b coincides with the axis center of the second damping shaft 35a.

The first damping swing arm 32b sleeves the first damping shaft 34b and is hinged to both the two first damping bodies 36b. The second damping swing arm 33b sleeves the second damping shaft 35b and is hinged to both the two second damping bodies 37b. The first damping swing arm 32b includes a rotating portion 321b, a sliding portion 322b, a connecting portion 323b, and a support portion 324b, and the second damping swing arm 33b includes a rotating portion 331b, a sliding portion 332b, a connecting portion 333b, and a support portion 334b. Front end surfaces of two sub-rotating portions 325b of the rotating portion 321b and front end surfaces of two sub-rotating portions 335b of the rotating portion 331b are all hinged surfaces.

In this embodiment, a structure of the first damping swing arm 32b, a cooperation relationship between the first damping swing arm 32b and the first damping shaft 34b, a structure of the second damping swing arm 33b, and a cooperation relationship between the second damping swing arm 33b and the second damping shaft 35b may all be obtained with reference to the relevant description of the first damping assembly 30a above. Details are not described herein again. A center of rotation of the first damping swing arm 32b relative to the base 10 is the axis center of the first damping shaft 34b, and a center of rotation of the second damping swing arm 33b relative to the base 10 is the axis center of the second damping shaft 35b.

In addition, the second damping assembly 30b further includes a first pin shaft 38b and a second pin shaft 39b, both the two sub-sliding portions 326b of the first damping swing arm 32b sleeve the first pin shaft 38b, and both the two sub-sliding portions 336b of the second damping swing arm 33b sleeve the second pin shaft 39. A cooperation relationship between the first pin shaft 38b and the sliding portion 322b and a cooperation relationship between the second pin shaft 39b and the sliding portion 332b may both be obtained with reference to the relevant description of the first damping assembly 30a above. Details are not described herein again.

Referring to FIG. 12 together, in this embodiment, the foldable mechanism 130 further includes a synchronization assembly 60, and the synchronization assembly 60 is mounted on the base 10. There are two synchronization assemblies 60, and the two synchronization assemblies 60 are arranged apart from each other along the Y-axis. The two synchronization assemblies 60 are a first synchronization assembly 60a and a second synchronization assembly 60b respectively. The first synchronization assembly 60a is mounted on the damping member 31a of the first damping assembly 30a to realize synchronous rotation between the first damping swing arm 32a and the second damping swing arm 33a. The second synchronization assembly 60b is mounted on the damping member 31b of the second damping assembly 30b to realize synchronous rotation between the first damping swing arm 32b and the second damping swing arm 33b.

In this embodiment, the first synchronization assembly 60a includes a first synchronous shaft sleeve 61a, a second synchronous bushing 62a and a synchronous sliding block 63a, and the synchronous sliding block 63a is slidably connected between the two first synchronous shaft sleeves 61a and the second synchronous shaft sleeve 62a. Both the first synchronous shaft sleeve 61a and the second synchronous shaft sleeve 62a are provided with spiral grooves (not marked in the figure), and the synchronous sliding block 63a is slidably connected to the spiral groove of the first synchronous shaft sleeve 61a and the spiral groove of the second synchronous shaft sleeve 62a. Specifically, the first synchronous shaft sleeve 61a sleeves the first damping shaft 34a and is located between the first bracket 12 and the first damping body 36a, and the second synchronous shaft sleeve 62a sleeves the second damping shaft 35a and is located between the first bracket 12 and the second damping body 37a. Along the X-axis direction, the first synchronous shaft sleeve 61a and the second synchronous shaft sleeve 62a are disposed apart, and the spiral groove of the first synchronous shaft sleeve 61a and the spiral groove of the second synchronous shaft sleeve 62a are disposed oppositely. The synchronous sliding block 63a is located between the first damping shaft 34a and the second damping shaft 35a. Two ends of the synchronous sliding block 63a are slidably connected to the spiral groove of the first synchronous shaft sleeve 61a and the spiral groove of the second synchronous shaft sleeve 62a respectively.

When the first damping swing arm 32a drives the first damping shaft 34a to rotate relative to the base 10, the first damping shaft 34a drives the first synchronous shaft sleeve 61a to rotate relative to the base 10, and the first synchronous shaft sleeve 61a drives the synchronous sliding block 63a to slide relative to the first synchronous shaft sleeve 61a in the spiral groove of the first synchronous shaft sleeve 61a and then drives the synchronous sliding block 63a to slide relative to the second synchronous shaft sleeve 62a in the spiral groove of the second synchronous shaft sleeve 62a, so that the synchronous sliding block 63a drives the second synchronous shaft sleeve 62a to rotate relative to the base 10. The second synchronous shaft sleeve 62a drives the second damping shaft 35a to rotate relative to the base 10, and the second damping shaft 35a drives the second damping swing arm 33a to rotate relative to the base 10, thereby realizing synchronous transmission between the first damping swing arm 32a and the second damping swing arms 33a.

Similarly, when the second damping swing arm 33a drives the second damping shaft 35a to rotate relative to the base 10, the first synchronization assembly 60a may drive the first damping swing arm 32a to rotate relative to the base 10, thereby realizing synchronous transmission between the first damping swing arm 32a and the second damping swing arms 33a.

It should be noted that the second synchronization assembly 60b and the first synchronization assembly 60a may be identical or similar assemblies, symmetrical or partially symmetrical structures, or different structures. In this embodiment, the second synchronization assembly 60b may be mirror-symmetrical with the first synchronization assembly 60a. Basic structures of various components in the second synchronization assembly 60b, a connection relationship between the components, and a connection relationship between the components and components outside the assembly may be obtained with reference to the relevant design of the first synchronization assembly 60a, and the second synchronization assembly 60b may be different from the first synchronization assembly 60a in detailed structure or position arrangement of the components.

The second synchronization assembly 60b includes a first synchronous shaft sleeve 61b, a second synchronous shaft sleeve 62b, and a synchronous sliding block 63b. The first synchronous shaft sleeve 61b sleeves the first damping shaft 34b and is located between the second bracket 13 and the first damping body 36b, and the second synchronous shaft sleeve 62b sleeves the second damping shaft 35b and is located between the second bracket 13 and the second damping body 37b. Structures of various components of the second synchronization assembly 60b and a connection relationship between the components and the second damping assembly 30b may be obtained with the relevant description of the first synchronization assembly 60a.

According to the synchronization assembly 60 of the foldable mechanism 130 shown in this embodiment, synchronous rotation is realized by using the first synchronous shaft sleeve, the second synchronous shaft sleeve, and the synchronous sliding block, which, compared with a synchronization assembly that realizes synchronization by using gears, not only reduces a quantity of components of the synchronization assembly, simplifies the structure of the foldable mechanism 130, and realizes the lightweight design of the foldable terminal 1000, but also reduces a size occupied by the foldable mechanism 130 in the X-axis direction, thereby helping to realize the miniaturized design of the foldable terminal 1000.

In some other embodiments, the synchronization assembly 60 may alternatively include a plurality of gears, and adjacent gears mesh with each other to realize synchronous rotation of the foldable mechanism 130. A specific structure of the synchronization assembly 60 is not specifically limited in this application.

Figure 14:
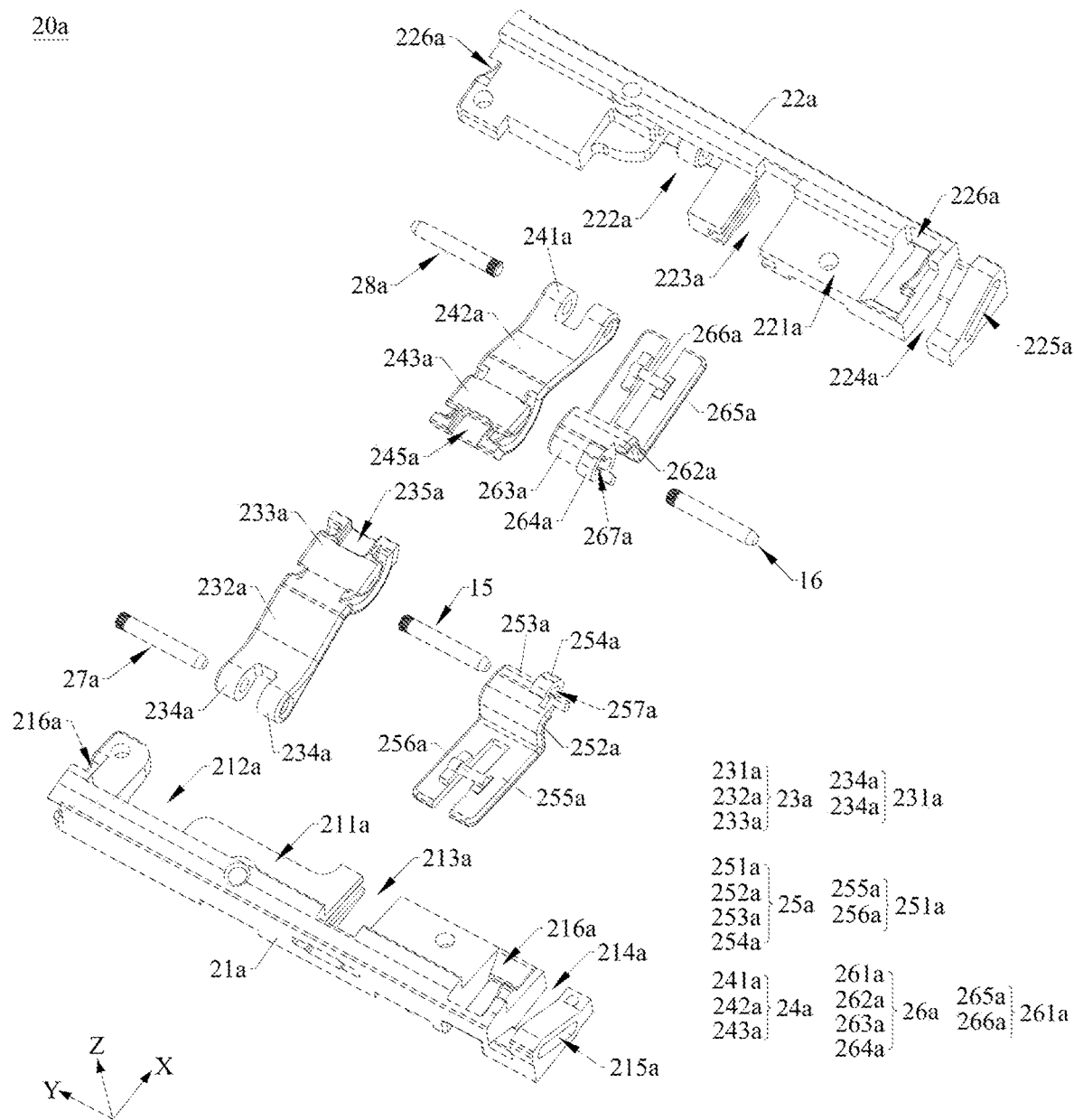
FIG. 14 is a schematic structural diagram of a first connection assembly in the foldable mechanism shown in FIG. 7.

Referring to FIG. 14, FIG. 14 is a schematic structural diagram of the first connection assembly 20a in the foldable mechanism 130 shown in FIG. 7.

The first fixed frame 21a is provided with a receiving notch 211a, a mounting notch 212a, a first sliding hole 213a, a first avoidance groove 214a, a second sliding hole 215a, and a first guiding groove 216a. An opening of the receiving notch 211a is located on a top surface of the first fixed frame 21a. The receiving notch 211a is recessed in a direction from the top surface of the first fixed frame 21a to a bottom surface (i.e., the negative direction of the Z axis shown in the figure), and runs through a front end surface, a rear end surface, and a right side surface of the first fixed frame 21a. In some other embodiments, alternatively, the receiving notch 211a may not run through the front end surface of the first fixed frame 21a, and/or the receiving notch 211a may not run through the rear end surface of the first fixed frame 21a, and/or the receiving notch 211a may not run through the right side surface of the first fixed frame 21a.

An opening of the mounting notch 212a is located on the right side surface of the first fixed frame 21a. The mounting notch 212a is recessed in a direction from the right side surface of the first fixed frame 21a to a left side surface (the negative direction of the X axis shown in the figure), and runs through the bottom surface of the first fixed frame 21a and a groove bottom wall of the receiving notch 211a. In some other embodiments, alternatively, the mounting notch 212a may not run through the bottom surface of the first fixed frame 21a, and/or the mounting notch 212a may not run through the groove bottom wall of the receiving notch 211a.

The mounting notch 212a includes two groove side walls oppositely disposed and a groove bottom wall connected between the two groove side walls. Mounting holes (not shown in the figure) are concavely disposed in both the two groove side walls of the mounting notch 212a. One mounting hole is recessed from one groove side wall of the mounting notch 212a along the positive direction of the Y axis, and the other mounting hole is recessed from the other groove side wall of the mounting notch 212a along the negative direction of the Y axis. The two mounting holes are circular holes, and axis centers of the two mounting holes are both parallel to the Y-axis direction. Exemplarily, the two mounting holes are coaxial.

The groove bottom wall of the mounting notch 212a is convexly provided with a mounting boss (not shown in the figure), and the mounting boss is disposed apart from both the two groove side walls of the mounting notch 212a. The mounting boss is provided with a through hole (not shown in the figure). The through hole runs through the mounting boss along the Y-axis direction. The through hole is a circular hole, and an axis center of the through hole is parallel to the Y-axis direction. Exemplarily, the through hole is coaxial with the two mounting holes. In some other embodiments, alternatively, the groove bottom wall of the mounting notch 212a may not be convexly provided with the mounting boss.

In addition, the first connection assembly 20a further includes a first pin shaft 27a, and the first pin shaft 27a is mounted in the through hole. Two ends of the first pin shaft 27a are respectively mounted in the two mounting holes and respectively fixedly connected to hole walls of the two mounting holes. The first pin shaft 27a is a circular shaft, and an axis center of the first pin shaft 27a is parallel to the Y-axis direction. Exemplarily, the first pin shaft 27a is coaxial with the through hole and the two mounting holes.

The first sliding hole 213a is located on a side of the mounting notch 212a facing the negative direction of the Y axis, and is disposed apart from the mounting notch 212a. An opening of the first sliding hole 213a is located on the right side surface of the first fixed frame 21a. The first sliding hole 213a is recessed in a direction from the right side surface of the first fixed frame 21a to the left side surface, and runs through the left side surface of the first fixed frame 21a, the bottom surface of the first fixed frame 21a, and the groove bottom wall of the receiving notch 211a. It should be understood that the first sliding hole 213a is not limited to the square hole as shown, which may alternatively be a circular hole, a special-shaped hole, or the like.

In some other embodiments, alternatively, the first sliding hole 213a may not run through the left side surface of the first fixed frame 21a, and/or the first sliding hole 213a may not run through the bottom surface of the first fixed frame 21a, and/or the first sliding hole 213a may not run through the groove bottom wall of the receiving notch 211a.

The first avoidance groove 214a is located on a side of the first sliding hole 213a away from the mounting notch 212a, and is disposed apart from the first sliding hole 213a. An opening of the first avoidance groove 214a is located on the right side surface of the first fixed frame 21a. The first avoidance groove 214a is recessed in a direction from the right side surface of the first fixed frame 21a to the left side surface, and runs through the left side surface and the top surface of the first fixed frame 21a and the groove bottom wall of the receiving notch 211a.

In some other embodiments, alternatively, the first avoidance groove 214a may not run through the left side surface of the first fixed frame 21a, and/or the first avoidance groove 214*a* may not run through the top surface of the first fixed frame 21*a*, and/or the first avoidance groove 214*a* may not run through the groove bottom wall of the receiving notch 211*a*.

The second sliding hole 215*a* is located on a side of the first avoidance groove 214*a* away from the first sliding hole 213*a*. An opening of the second sliding hole 215*a* is located on the rear end surface of the first fixed frame 21*a*. The second sliding hole 215*a* is recessed in a direction from the front end surface of the first fixed frame 21*a* to the rear end surface (the positive direction of the Y axis shown in the figure), and runs through the groove side wall of the first avoidance groove 214*a* to be communicated with the first avoidance groove 214*a*. The second sliding hole 215*a* is a strip-shaped hole, and an angle between an extension direction of the second sliding hole 215*a* and the X-axis direction is an acute angle.

An opening of the first guiding groove 216*a* is located in the groove bottom wall of the receiving notch 211*a*. The first guiding groove 216*a* is recessed in a direction from the groove bottom wall of the receiving notch 211*a* to the bottom surface of the first fixed frame 21*a* (the negative direction of the Z axis shown in the figure), and runs through the left side surface of the first fixed frame 21*a*. The first guiding groove 216*a* is an arc-shaped groove. A groove bottom wall of the first guiding groove 216*a* is an arc-shaped surface. In some other embodiments, alternatively, the first guiding groove 216*a* may not run through the left side surface.

In this embodiment, there are two first guiding grooves 216*a*. One first guiding groove 216*a* is located on a side of the mounting notch 212*a* away from the first sliding hole 213*a*, is disposed apart from the mounting notch 212*a*, and further runs through the front end surface of the first fixed frame 21*a*. The other first guiding groove 216*a* is located between the first sliding hole 213*a* and the first avoidance groove 214*a*, is disposed apart from both the first sliding hole 213*a* and the first avoidance groove 214*a*, and further runs through the top surface of the first fixed frame 21*a*. In some other embodiments, alternatively, the first guiding groove 216*a* may not run through the front end surface of the first fixed frame 21*a*, and/or the first guiding groove 216*a* may not run through the top surface of the first fixed frame 21*a*, or there may be one, three, or more first guiding grooves 216*a*.

In this embodiment, the first main swing arm 23*a* includes a rotating portion 231*a*, a connecting portion 232*a*, and a sliding portion 233*a*. The connecting portion 232*a* is connected between the rotating portion 231*a* and the sliding portion 233*a*. The rotating portion 231*a*, the connecting portion 232*a*, and the sliding portion 233*a* may be integrally formed.

Referring to FIG. 9 together, a structure of the rotating portion 231*a* matches that of the mounting notch 212*a*. The rotating portion 231*a* includes two sub-rotating portions 234*a*, and the two sub-rotating portions 234*a* are arranged apart along the Y-axis direction. The two sub-rotating portions 234*a* may sleeve the first pin shaft 27*a*, and may rotate relative to the first pin shaft 27*a* to realize a rotatable connection between the rotating portion 231*a* and the first pin shaft 27*a*, thereby realizing a rotatable connection between the rotating portion 231*a* of the first main swing arm 23*a* and the first fixed frame 21*a*.

The connecting portion 232*a* is in a shape of a surface plate. A structure of the sliding portion 233*a* matches that of the first sliding groove 101*a*. A bottom surface of the sliding portion 233*a* is an arc-shaped surface. The sliding portion 233*a* is provided with a first slide groove (not marked in the figure) and a second slide groove (not marked in the figure). An opening of the first slide groove is located on a front end surface of the sliding portion 233*a*. The first slide groove is recessed in a direction from the front end surface of the sliding portion 233*a* to a rear end surface (the negative direction of the Y axis shown in the figure). Exemplarily, the first slide groove further runs through a top surface of the sliding portion 233*a*. The first slide groove is an arc-shaped groove fitting the first sliding block 121*a*, and an axis center of the first slide groove is parallel to the Y-axis direction.

An opening of the second slide groove is located on the rear end surface of the sliding portion 233*a*. The second slide groove is recessed in a direction from the rear end surface of the sliding portion 233*a* to the front end surface (the positive direction of the Y axis shown in the figure). Exemplarily, the second slide groove further runs through the top surface of the sliding portion 233*a*. The second slide groove is an arc-shaped groove fitting the second sliding block 121*b*, and the second slide groove is coaxial with the first slide groove.

The first sliding block 121*a* may slide and rotate in the first slide groove, and the second sliding block 121*b* may slide and rotate in the second slide groove, so that the sliding portion 233*a* can slide and rotate in the first sliding groove 101*a* to realize a slidable and rotatable connection between the sliding portion 233*a* of the first main swing arm 23*a* and the base 10. In this case, the first slide groove is coaxial with the first sliding block 121*a*, and the second slide groove is coaxial with the second sliding block 121*b*.

In addition, the sliding portion 233*a* is further provided with a first support groove 235*a*, and an opening of the first support groove 235*a* is located on the top surface of the sliding portion 233*a*. A sliding groove 237*a* is recessed in a direction from the top surface of the sliding portion 233*a* to the bottom surface (the negative direction of the Z axis shown in the figure), and runs through the right side surface of the sliding portion 233*a*. The sliding groove 237*a* is square. In some other embodiments, the sliding groove 237*a* may alternatively be circular or in other special shapes.

In this embodiment, the first secondary swing arm 25*a* includes a first sliding portion 251*a*, a first transition portion 252*a*, a first rotating portion 253*a*, and a first auxiliary portion 254*a*, the first transition portion 252*a* is fixedly connected between the first rotating portion 253*a* and the first sliding portion 251*a*, and the first auxiliary portion 254*a* is fixedly connected to an end of the first rotating portion 253*a* away from the first transition portion 252*a*. The first sliding portion 251*a*, the first transition portion 252*a*, the first rotating portion 253*a*, and the first auxiliary portion 254*a* may be integrally formed.

The first sliding portion 251*a* is in a shape of a surface plate. A structure of the first sliding portion 251*a* matches that of the first sliding hole 213*a*. The first sliding portion 251*a* may be mounted in the first sliding hole 213*a*, and may slide relative to the first fixed frame 21*a* in the first sliding hole 213*a*, to realize a slidable connection between the first sliding portion 251*a* and the first fixed frame 21*a*.

In this embodiment, the first sliding portion 251*a* includes a sliding body 255*a* and a first pin shaft 256*a*. The sliding body 255*a* is fixedly connected to an end of the first transition portion 252*a* away from the rotating portion 251. The first pin shaft 256*a* is fixedly connected to the sliding body 255*a*, and is disposed apart from the first transition portion 252*a*. The sliding body 255*a* is provided with an avoidance notch (not marked in the figure), and an opening of the avoidance notch is located on a top surface of the sliding body 255*a*. The avoidance notch is recessed in a direction from the top surface of the sliding body 255a to a bottom surface, and runs through a left side surface of the sliding body 255a. The avoidance notch is in a shape of a long strip, and an extension direction of the avoidance notch is parallel to the X-axis direction.

The first pin shaft 256a is fixedly connected to the top surface of the sliding body 255a, and is located on a top side of the avoidance notch. Exemplarily, the first sliding portion 251a further includes two fixed portions (not marked in the figure). Along the Y-axis direction, the two fixed portions are both fixedly connected to the top surface of the sliding body 255a, and are respectively located on two opposite sides of the avoidance notch. Two ends of the first pin shaft 256a are respectively fixedly connected to the two fixed portions to realize the fixed connection between the first pin shaft 256a and the sliding body 255a. The first pin shaft 256a is a circular shaft, and an axis center of the first pin shaft 256a is parallel to the Y-axis direction. It should be noted that the two fixed portions may be fixedly connected to the top surface of the sliding body 255a in a manner such as welding, or the two fixed portions may be integrally formed with the sliding body 255a.

A structure of the first rotating portion 253a matches that of the first rotating groove 103a. The first rotating portion 253a is provided with a pin hole (not marked in the figure). An opening of the pin hole is located on a front end surface of the first rotating portion 253a. The pin hole is recessed in a direction from the front end surface of the first rotating portion 253a to a rear end surface (the positive direction of the Y axis shown in the figure), and runs through the rear end surface of the first rotating portion 253a. That is, the pin hole runs through the first rotating portion 253a along the Y-axis direction. Exemplarily, the pin hole is a circular hole.

A structure of the first auxiliary portion 254a matches that of the first avoidance notch 126. The first auxiliary portion 254a is provided with a first auxiliary groove 257a, and an opening of the first auxiliary groove 257a is located on a rear end surface of the first auxiliary portion 254a. The first auxiliary groove 257a is recessed in a direction from the rear end surface of the first auxiliary portion 254a to a front end surface (the negative direction of the Y axis shown in the figure), and runs through the front end surface of the first auxiliary portion 254a. That is, the first auxiliary groove 257a runs through the first auxiliary portion 254a along the Y-axis direction. Exemplarily, the first auxiliary groove 257a further runs through a hole wall of the pin hole of the first rotating portion 253a to be communicated with the pin hole of the first rotating portion 253a. In some other embodiments, alternatively, the first auxiliary groove 257a may not run through the hole wall of the pin hole of the first rotating portion 253a. In this case, the first auxiliary groove 257a is not communicated with the pin hole of the first rotating portion 253a.

In this embodiment, the first auxiliary groove 257a is a strip-shaped hole, and an angle between an extension direction of the first auxiliary groove 257a and the Y-axis direction is an acute angle. The first auxiliary groove 257a has a flattened position (not marked in the figure) and a folded position (not marked in the figure). The folded position is located on a top side of the flattened position (i.e., a side facing the positive direction of the Z axis shown in the figure). The flattened position is located on a top side of the first auxiliary groove 257a, and the folded position is located on a bottom side of the first auxiliary groove 257a. Exemplarily, the extension direction of the first auxiliary groove 257a is linear. In some other embodiments, the extension direction of the first auxiliary groove 257a may alternatively be arc-shaped, which is not specifically limited in this application.

In addition, the first connection assembly 20a further includes a first rotating shaft 15, and the first rotating shaft 15 is mounted in the first rotating groove 103a. Specifically, two ends of the first rotating shaft 15 are respectively mounted in the two first rotating shaft holes of the first bracket 12 and respectively fixedly connected to the hole walls of the first rotating shaft holes. The first rotating shaft 15 is a circular shaft. Exemplarily, the first rotating shaft 15 is coaxial with the two first rotating shaft holes. That is, an axis center of the first rotating shaft 15 coincides with axis centers of both the two first rotating shaft holes.

The first rotating portion 253a sleeves the first rotating shaft 15. That is, the first rotating shaft 15 is mounted in the pin hole of the first rotating portion 253a. The first rotating portion 253a may rotate relative to the first rotating shaft 15, so that the first rotating portion 253a can rotate in the first rotating groove 103a to realize a rotatable connection between the first rotating portion 253a and the base 10. A center of rotation of the first rotating portion 253a of the first secondary swing arm 25a relative to the base 10 is a first center. That is, a center of rotation of the first secondary swing arm 25a relative to the base 10 is the first center. That is, the first center is the axis center of the first rotating shaft 15.

In this embodiment, the first center and the second center are spaced apart from each other. Specifically, the first center is located on an outer side of the second center. That is, the second center is located on an inner side of the first center. That is, the second center is located on a side of the first center near the base 10. In some other embodiments, alternatively, the second center may be located on an outer side, a top side, or a bottom side of the first center, or the second center may be coaxial with the first center.

In the foldable mechanism 130 shown in this application, the first fixed frame 21a, when rotating relative to the base 10, drives the first main swing arm 23a to rotate relative to the first fixed frame 21a and slide and slide relative to the base 10, further drives the first secondary swing arm 25a to slide relative to the first fixed frame 21a and rotate relative to the base 10, and further drives the first damping swing arm 32a to slide and rotate relative to the first fixed frame 21a and rotate relative to the damping member 31a. Since the first center and the second center are spaced apart from each other, that is, the center of rotation of the first secondary swing arm 25a does not coincide with the center of rotation of the first damping swing arm 32a, an assembly position of the first damping swing arm 32a on the base 10 does not need to match an assembly position of the first secondary swing arm 25a on the base 10, which improves a degree of freedom of assembly between the first damping swing arm 32a and the base 10 and helps to reduce the size of the foldable mechanism 130.

In addition, the first auxiliary portion 254a is located in the first avoidance notch 126, and is spaced apart from a groove all of the first avoidance notch 126. That is, the first avoidance notch 126 may avoid the first auxiliary portion 254a to prevent interference between the first auxiliary portion 254a and the base 10 when the first secondary swing arm 25a rotates relative to the base 10, which ensures smooth rotation of the first secondary swing arm 25a relative to the base 10.

The second fixed frame 22a is provided with a receiving notch 221a, a mounting notch 222a, a first sliding hole 223a, a second avoidance groove 224a, a second sliding hole 225a, and a second guiding groove 226a. In this embodiment, structures of the receiving notch 221a, the mounting notch 222a, the first sliding hole 223a, the second avoidance groove 224a, the second sliding hole 225a, and the second guiding groove 226a may be obtained respectively with reference to the relevant description of the receiving notch 211a, the mounting notch 212a, the first sliding hole 213a, the first avoidance groove 214a, the second sliding hole 215a, and the first guiding groove 216a in the first fixed frame 21a. Details are not described herein again. The receiving notch 221a further runs through a left side surface of the second fixed frame 22a. Openings of the mounting notch 222a and the first sliding hole 223a are both located on the left side surface of the second fixed frame 22a.

In addition, the first connection assembly 20a further includes a second pin shaft 28a. A structure of the second pin shaft 28a and a cooperation relationship between the second pin shaft 28a and the second fixed frame 22a may be obtained with reference to the relevant description of the structure of the first pin shaft 27a and the cooperation relationship between the first pin shaft 27a and the first fixed frame 21a above. Details are not described herein again.

The second main swing arm 24a includes a rotating portion 241a, a connecting portion 242a, and a sliding portion 243a. In this embodiment, a structure of the second main swing arm 24a and cooperation relationships between the second main swing arm 24a and the second fixed frame 22a as well as the base 10 may be obtained with reference to the relevant description of the structure of the first main swing arm 23a and the cooperation relationships between the first main swing arm 23a and the first fixed frame 21a as well as the base 10.

Referring to FIG. 9 together, a structure of the rotating portion 241a matches that of the mounting notch 222a. Two sub-rotating portions (not marked in the figure) of the rotating portion 241a may sleeve the second pin shaft 28a and may rotate relative to the second pin shaft 28a to realize a rotatable connection between the rotating portion 241a and the second pin shaft 28a, thereby realizing a rotatable connection between the second main swing arm 24a and the second fixed frame 22a.

A structure of the sliding portion 243a matches that of the second sliding groove 102a. The sliding portion 243a is provided with a third slide groove (not marked in the figure), a fourth slide groove (not marked in the figure), and a second support groove 245a. The third sliding block 121c may slide and rotate in the third slide groove, and the fourth sliding block 121d may slide and rotate in the fourth slide groove, so that the sliding portion 243a can slide and rotate in the second sliding groove 102a to realize a slidable and rotatable connection between the second main swing arm 24a and the base 10. In this case, the third slide groove is coaxial with the third sliding block 121c, and the fourth slide groove is coaxial with the fourth sliding block 121d.

The second secondary swing arm 26a includes a second sliding portion 261a, a second transition portion 262a, a second rotating portion 263a, and a second auxiliary portion 264a. In this embodiment, a structure of the second secondary swing arm 26a and cooperation relationships between the second secondary swing arm 26a and the second fixed frame 22a as well as the base 10 may be obtained with reference to the relevant description of the structure of the first secondary swing arm 25a and the cooperation relationships between the first secondary swing arm 25a and the first fixed frame 21a as well as the base 10.

A structure of the second sliding portion 261a matches that of the first sliding hole 223a. The second sliding portion 261a includes a sliding body 265a and a second pin shaft 266a, and the second pin shaft 266a is fixedly connected to the sliding body 265a. The second sliding portion 261a may be mounted in the first sliding hole 223a, and may slide relative to the second fixed frame 22a in the first sliding hole 223a, to realize a slidable connection between the second secondary swing arm 26a and the second fixed frame 22a.

A structure of the second rotating portion 263a matches that of the second rotating groove 104a, and a structure of the second auxiliary portion 264a matches that of the second avoidance notch 127. The second auxiliary portion 264a is provided with a second auxiliary groove 267a. In addition, the first connection assembly 20a further includes a second rotating shaft 16, and the second rotating shaft 16 is mounted in the second rotating groove 104a. Specifically, two ends of the second rotating shaft 16 are respectively mounted in the two second rotating shaft holes of the first bracket 12 and respectively fixedly connected to the hole walls of the second rotating shaft holes. A structure of the second rotating shaft 16 and a cooperation relationship between the second rotating shaft 16 and the base 10 may be obtained with reference to the relevant description of the structure of the first rotating shaft 15 and the cooperation relationship between the first rotating shaft 15 and the base 10.

The second rotating portion 263a may sleeve the second rotating shaft 16 and may rotate relative to the second rotating shaft 16, so that the second rotating portion 263a can rotate in the second rotating groove 104a to realize a rotatable connection between the second secondary swing arm 26a and the base 10. A center of rotation of the second rotating portion 263a of the second secondary swing arm 26a relative to the base 10 is a third center. That is, a center of rotation of the second secondary swing arm 26a relative to the base 10 is the third center. That is, the third center is an axis center of the first rotating shaft 16.

In this embodiment, the third center and the fourth center are spaced apart from each other. Specifically, the third center is located on an outer side of the fourth center. That is, the fourth center is located on an inner side of the third center. That is, the fourth center is located on a side of the third center near the base 10. In some other embodiments, alternatively, the fourth center may be located on an outer side, a top side, or a bottom side of the third center, or the fourth center may be coaxial with the third center.

In the foldable mechanism 130 shown in this application, the second fixed frame 22a, when rotating relative to the base 10, drives the second main swing arm 24a to rotate relative to the second fixed frame 22a and slide and slide relative to the base 10, further drives the second secondary swing arm 26a to slide relative to the second fixed frame 22a and rotate relative to the base 10, and further drives the second damping swing arm 33a to slide and rotate relative to the second fixed frame 22a and rotate relative to the damping member 31a. Since the third center and the fourth center are spaced apart from each other, that is, the center of rotation of the second secondary swing arm 26a does not coincide with the center of rotation of the second damping swing arm 33a, an assembly position of the second damping swing arm 33a on the base 10 does not need to match an assembly position of the second secondary swing arm 26a on the base 10, which improves a degree of freedom of assembly between the second damping swing arm 33a and the base 10 and helps to reduce the size of the foldable mechanism 130.

In addition, the second auxiliary portion 264a may be at least partially located in the second avoidance notch 127, and is spaced apart from a groove all of the second avoidance notch 127. That is, the second avoidance notch 127 may avoid the second auxiliary portion 264a to prevent interference between the second auxiliary portion 264a and the base 10 when the second secondary swing arm 26a rotates relative to the base 10, which ensures smooth rotation of the second secondary swing arm 26a relative to the base 10.

Referring to FIG. 12 together, one sub-sliding portion 326a of the first damping swing arm 32a is located in the first avoidance groove 214a, the other sub-sliding portion 326a is located on a rear side of the first fixed frame 21a, and the second sliding hole 215a is located between the two sub-sliding portions 326a and is communicated with the pin holes of the two sub-sliding portions 326a. The first pin shaft 38a is further mounted in the second sliding hole 215a and may slide and rotate relative to the first fixed frame 21a in the second sliding hole 215a to drive the sliding portion 322a to slide and rotate relative to the first fixed frame 21a, so as to realize a slidable and rotatable connection between the first damping swing arm 32a and the first fixed frame 21a.

In some other embodiments, the first pin shaft 38a may further slide relative to the first fixed frame 21a in the second sliding hole 215a to drive the sliding portion 322a to slide relative to the first fixed frame 21a, and the sliding portion 322a may further rotate relative to the first pin shaft 38a to realize relative rotation between the sliding portion 322a and the first fixed frame 21a, so as to realize the slidable and rotatable connection between the first damping swing arm 32a and the first fixed frame 21a.

One sub-sliding portion 336a of the second damping swing arm 33a is located in the second avoidance groove 224a, the other sub-sliding portion 336a is located on a rear side of the second fixed frame 22a, and the second sliding hole 225a is located between the two sub-sliding portions 336a and is communicated with the pin holes of the two sub-sliding portions 326a. The second pin shaft 39a is further mounted in the second sliding hole 225a and may slide and rotate relative to the second fixed frame 22a in the second sliding hole 225a to drive the sliding portion 332a to slide and rotate relative to the second fixed frame 22a, so as to realize a slidable and rotatable connection between the second damping swing arm 33a and the second fixed frame 22a.

In some other embodiments, the second pin shaft 39a may further slide relative to the second fixed frame 22a in the second sliding hole 225a to drive the sliding portion 332a to slide relative to the second fixed frame 22a, and the sliding portion 332a may further rotate relative to the second pin shaft 39a to realize relative rotation between the sliding portion 332a and the second fixed frame 22a, so as to realize the slidable and rotatable connection between the second damping swing arm 33a and the second fixed frame 22a.

When the first fixed frame 21a rotates relative to the base 10, the first fixed frame 21a drives the first main swing arm 23a to rotate relative to the first fixed frame 21a and slide and rotate relative to the base 10, further drives the first secondary swing arm 25a to slide relative to the first fixed frame 21a and rotate relative to the base 10, and further drives the first damping swing arm 32a to slide and rotate relative to the first fixed frame 21a and rotate relative to the base 10. In this case, the first synchronization assembly 60a can drive the second damping swing arm 33a to rotate relative to the base 10, drive the second damping swing arm 34 to slide and rotate relative to the second fixed frame 22a, and then drive the second fixed frame 21 to rotate relative to the base 10, so as to realize synchronous rotation of the first fixed frame 21a and the second fixed frame 22a relative to the base 10.

Similarly, when the second fixed frame 22a rotates relative to the base 10, the second fixed frame 22a drives the second main swing arm 24a to rotate relative to the second fixed frame 22a and slide and rotate relative to the base 10, further drives the second secondary swing arm 26a to slide relative to the second fixed frame 22a and rotate relative to the base 10, and further drives the second damping swing arm 32 to slide and rotate relative to the second fixed frame 22a and rotate relative to the base 10. In this case, the first synchronization assembly 60a can drive the first damping swing arm 32a to rotate relative to the base 10, drive the first damping swing arm 32a to slide and rotate relative to the first fixed frame 21a, and then drive the first fixed frame 21a to rotate relative to the base 10, so as to realize synchronous rotation of the first fixed frame 21a and the second fixed frame 22a relative to the base 10.

Figure 15:
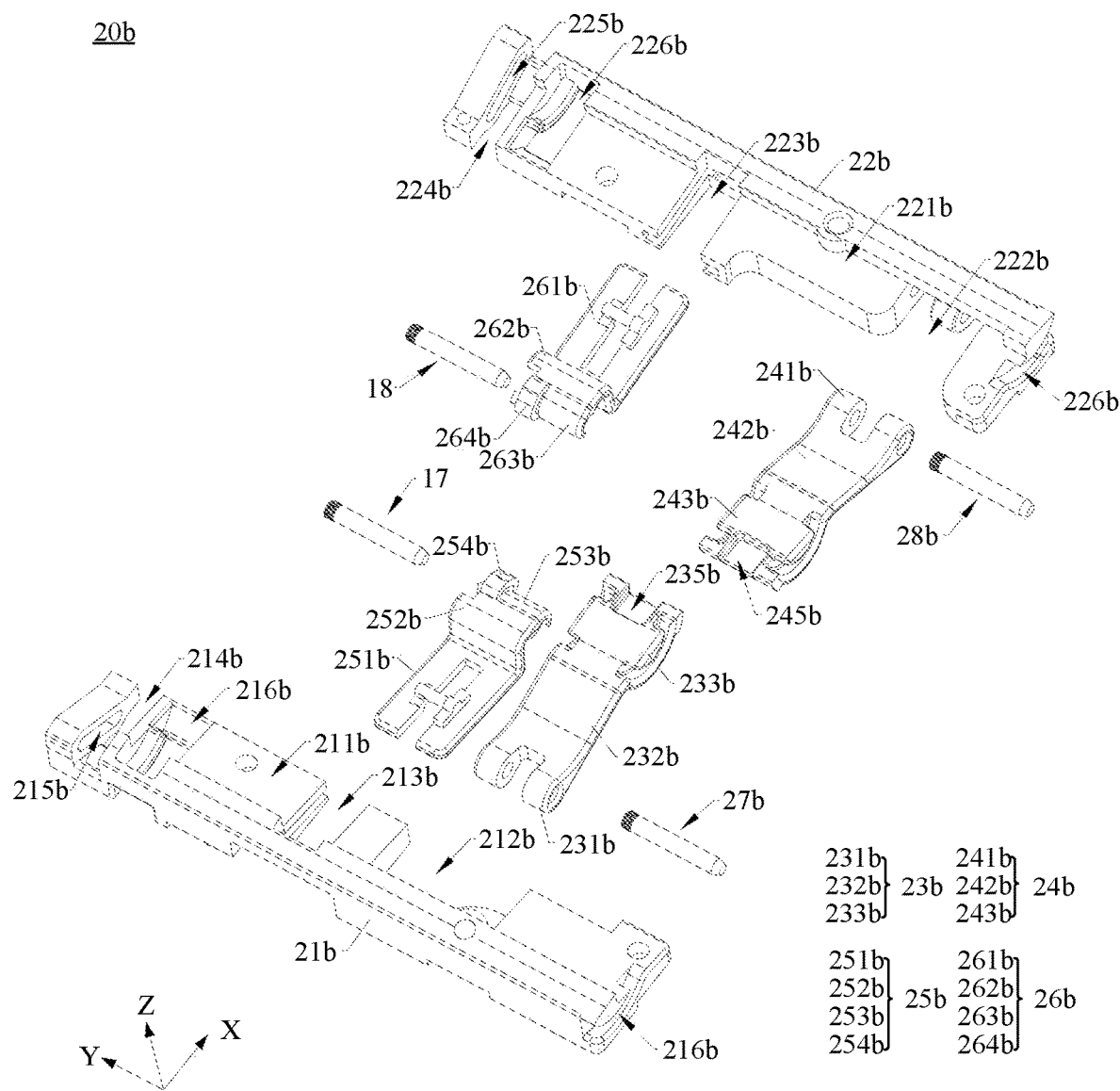
FIG. 15 is a schematic structural diagram of a second connection assembly in the foldable mechanism shown in FIG. 7.

Referring to FIG. 15, FIG. 15 is a schematic structural diagram of the second connection assembly 20b in the foldable mechanism 130 shown in FIG. 7.

The first fixed frame 21b is provided with a receiving notch 211b, a mounting notch 212b, a first sliding hole 213b, a first avoidance groove 214b, a second sliding hole 215b, and a first guiding groove 216b. In this embodiment, structures of the receiving notch 211b, the mounting notch 212b, the first sliding hole 213b, the first avoidance groove 214b, the second sliding hole 215b, and the first guiding groove 216b may be obtained with reference to the relevant description of the first fixed frame 21a in the first connection assembly 20a above. Details are not described herein again. The first sliding hole 213b is located on a side of the mounting notch 212b facing the positive direction of the Y axis, an opening of the second sliding hole 215b is located on a front end surface of the first fixed frame 21b, and one first guiding groove 216b further runs through a rear end surface of the first fixed frame 21b.

The first main swing arm 23b includes a rotating portion 231b, a connecting portion 232b, and a sliding portion 233b. In this embodiment, a structure of the first main swing arm 23b and cooperation relationships between the first main swing arm 23b and the first fixed frame 21b as well as the base 10 may be obtained with reference to the relevant description of the structure of the first main swing arm 23a in the first connection assembly 20a and the cooperation relationships between the first main swing arm 23a and the first fixed frame 21a as well as the base 10 above.

Referring to FIG. 10 together, a structure of the rotating portion 231b matches that of the mounting notch 212b. Two sub-rotating portions (not marked in the figure) of the rotating portion 231b may sleeve a first pin shaft 27b and may rotate relative to the first pin shaft 27b to realize a rotatable connection between the rotating portion 231b and the first pin shaft 27b, thereby realizing a rotatable connection between the first main swing arm 23b and the first fixed frame 21b.

A structure of the sliding portion 233b matches that of the first sliding groove 101b. The sliding portion 233b is provided with a first slide groove (not marked in the figure), a second slide groove (not marked in the figure), and a first support groove 235b. A first sliding block 131a may slide and rotate in the first slide groove, and a second sliding block 131b may slide and rotate in the second slide groove, so that the sliding portion 233b can slide and rotate in the first sliding groove 101b to realize a slidable and rotatable connection between the first main swing arm 23b and the base 10. In this case, the first slide groove is coaxial with the first sliding block 131a, and the second slide groove is coaxial with the second sliding block 131b.

The first secondary swing arm 25b includes a first sliding portion 251b, a first transition portion 252b, a first rotating portion 253b, and a first auxiliary portion 254b. In this embodiment, a structure of the first secondary swing arm 25b and cooperation relationships between the first secondary swing arm 25b and the first fixed frame 21b as well as the base 10 may be obtained with reference to the relevant description of the structure of the first secondary swing arm 25a in the first connection assembly 20a and the cooperation relationships between the first secondary swing arm 25a and the first fixed frame 21a as well as the base 10 above.

A structure of the first sliding portion 251b matches that of the first sliding hole 213b. The first sliding portion 251b may be mounted in the first sliding hole 213b, and may slide relative to the first fixed frame 21b in the first sliding hole 213b, to realize a slidable connection between the first secondary swing arm 25b and the first fixed frame 21b. A structure of the first rotating portion 253b matches that of the first rotating groove 103b, and a structure of the first auxiliary portion 254b matches that of the first avoidance notch 136. The first rotating portion 253b sleeves a third rotating shaft 17 and may rotate relative to the third rotating shaft 17, so that the first rotating portion 253b can rotate in the first rotating groove 103b to realize a rotatable connection between the first secondary swing arm 25b and the base 10. In addition, the first auxiliary portion 254b is located in the first avoidance notch 136, and is spaced apart from a groove all of the first avoidance notch 136.

The second fixed frame 22b is provided with a receiving notch 221b, a mounting notch 222b, a first sliding hole 223b, a second avoidance groove 224b, a second sliding hole 225b, and a second guiding groove 226b. In this embodiment, structures of the receiving notch 221b, the mounting notch 222b, the first sliding hole 223b, the second avoidance groove 224b, the second sliding hole 225b, and the second guiding groove 226b may all be obtained with reference to the relevant description of the second fixed frame 22a in the first connection assembly 20a above. Details are not described herein again. The first sliding hole 223b is located on a side of the mounting notch 212b facing the positive direction of the Y axis, an opening of the second sliding hole 225b is located on a front end surface of the second fixed frame 22b, and one second guiding groove 226b further runs through a rear end surface of the second fixed frame 22b.

The second main swing arm 24b includes a rotating portion 241b, a connecting portion 242b, and a sliding portion 243b. In this embodiment, a structure of the second main swing arm 24b and cooperation relationships between the second main swing arm 24b and the second fixed frame 22b as well as the base 10 may be obtained with reference to the relevant description of the structure of the second main swing arm 24a in the first connection assembly 20a and the cooperation relationships between the second main swing arm 24a and the second fixed frame 22a as well as the base 10 above.

A structure of the rotating portion 241b matches that of the mounting notch 222b. Two sub-rotating portions of the rotating portion 241b may sleeve a second pin shaft 28b, and may rotate relative to the second pin shaft 28b, so as to realize a rotatable connection between the rotating portion 241b and the second pin shaft 28b, thereby realizing a rotatable connection between the second main swing arm 24b and the second fixed frame 22b. A structure of the sliding portion 243b matches that of the second sliding groove 102b. The sliding portion 243b is provided with a first slide groove (not marked in the figure), a second slide groove (not marked in the figure), and a second support groove 245b. A third sliding block 131c may slide and rotate in the third slide groove, and a fourth sliding block 131d may slide and rotate in the fourth slide groove, so that the sliding portion 243b can slide and rotate in the second sliding groove 102b to realize a slidable and rotatable connection between the second main swing arm 24b and the base 10. In this case, the third slide groove is coaxial with the third sliding block 131c, and the fourth slide groove is coaxial with the fourth sliding block 131d.

The second secondary swing arm 26b includes a second sliding portion 261b, a second transition portion 262b, a second rotating portion 263b, and a second auxiliary portion 264b. In this embodiment, a structure of the second secondary swing arm 26b and cooperation relationships between the second secondary swing arm 26b and the second fixed frame 22b as well as the base 10 may be obtained with reference to the relevant description of the structure of the second secondary swing arm 26a in the first connection assembly 20a and the cooperation relationships between the second secondary swing arm 26a and the second fixed frame 22a as well as the base 10.

A structure of the second sliding portion 261b matches that of the first sliding hole 223b. The second sliding portion 261b may be mounted in the first sliding hole 223b, and may slide relative to the second fixed frame 22b in the first sliding hole 223, to realize a slidable connection between the second secondary swing arm 26b and the second fixed frame 22b. A structure of the second rotating portion 263b matches that of the second rotating groove 104b, and a structure of the second auxiliary portion 264b matches that of the second avoidance notch 137. The second rotating portion 263b may sleeve a fourth rotating shaft 18 and may rotate relative to the fourth rotating shaft 18, so that the second rotating portion 263b can rotate in the second rotating groove 104b to realize a rotatable connection between the second secondary swing arm 26b and the base 10. In addition, the second auxiliary portion 264b is located in the second avoidance notch 137, and is spaced apart from a groove all of the second avoidance notch 137.

Referring to FIG. 13 together, a cooperation relationship between the second damping assembly 30b and the second connection assembly 20b may be obtained with reference to the relevant description of the cooperation relationship between the first damping assembly 30a and the first connection assembly 20a above. Details are not described herein again. The second sliding hole 215b of the first fixed frame 21b is located between the two sub-sliding portions 326b of the first damping swing arm 32b and communicated with pin holes of the two sub-sliding portions 326b. The first pin shaft 38b is further mounted in the second sliding hole 215b and may slide and rotate relative to the first fixed frame 21b in the second sliding hole 215b to drive the sliding portion 322b to slide and rotate relative to the first fixed frame 21b, so as to realize a slidable and rotatable connection between the first damping swing arm 32b and the first fixed frame 21b.

The second sliding hole 225b of the second damping swing arm 33b is located between the two sub-sliding portions 336b and communicated with the pin holes of the two sub-sliding portions 326b. The second pin shaft 39b is further mounted in the second sliding hole 225b and may slide and rotate relative to the second fixed frame 22b in the second sliding hole 225b to drive the sliding portion 332b to slide and rotate relative to the second fixed frame 22b, so as to realize a slidable and rotatable connection between the second damping swing arm 33b and the second fixed frame 22b.

Figure 16:
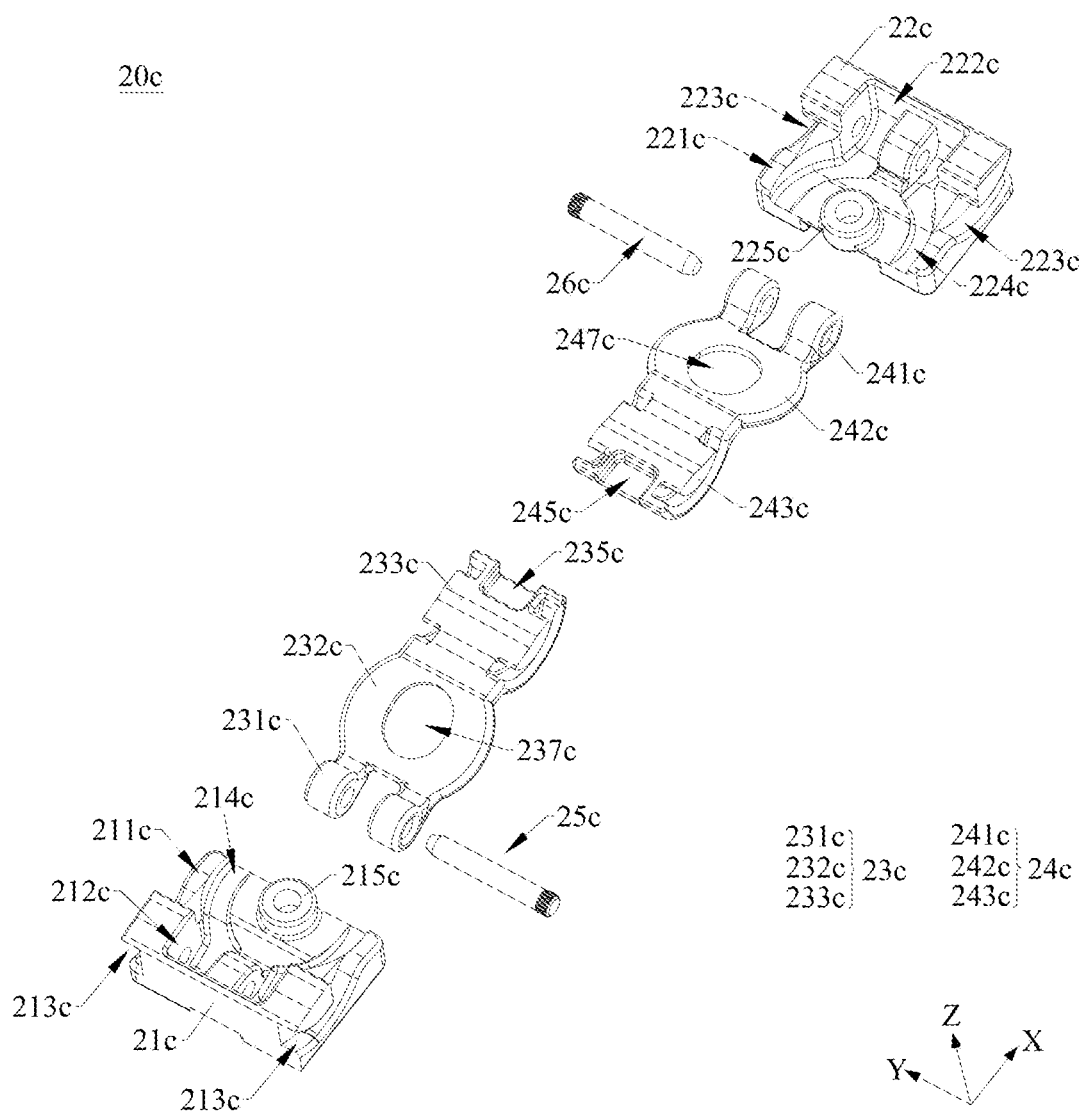
FIG. 16 is a schematic structural diagram of a third connection assembly in the foldable mechanism shown in FIG. 7.

Referring to FIG. 16, FIG. 16 is a schematic structural diagram of the third connection assembly 20c in the foldable mechanism 130 shown in FIG. 7.

Figure 20:
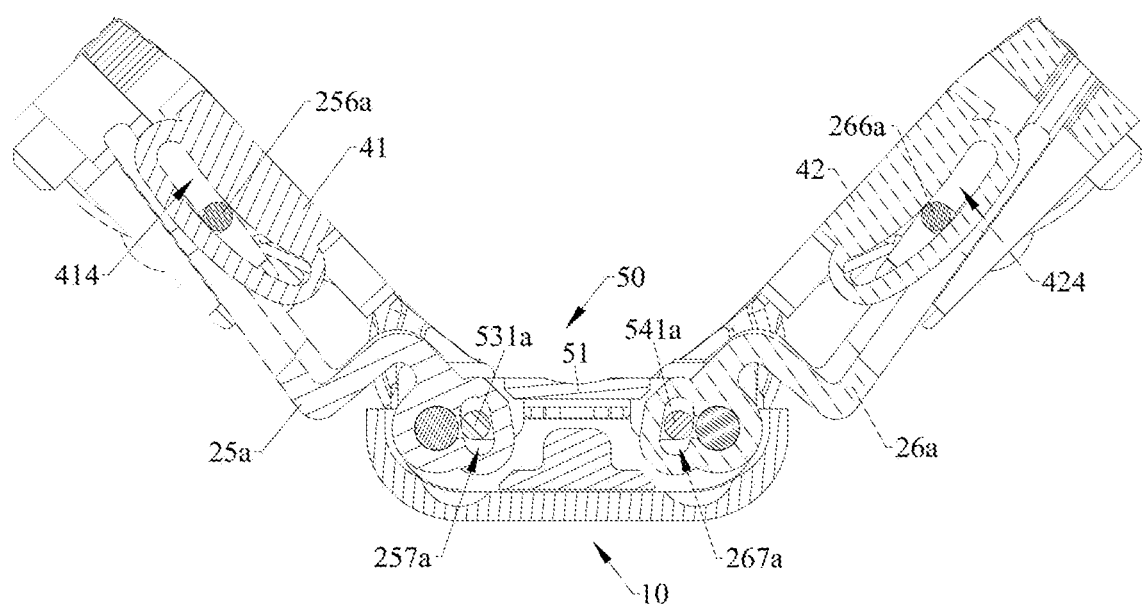
FIG. 20 is a schematic structural diagram of the foldable mechanism shown in FIG. 19 in an unfolded state.

The first fixed frame 21c is provided with a receiving notch 211c, a mounting notch 212c, and a first guiding groove 213c. In this embodiment, structures of the receiving notch 211c, the mounting notch 212c, and the first guiding groove 213c may be obtained with reference to the relevant description of the first fixed frame 21a (as shown in FIG. 20) in the first connection assembly 20a above. Details are not described herein again. The mounting notch 212c is located in the middle of the first fixed frame 21c. Along the Y-axis direction, two first guiding grooves 213c are respectively located on two opposite sides of the mounting notch 212c and both disposed apart from the mounting notch 212c. One first guiding groove 213c further runs through a front end surface of the first fixed frame 21c, and one first guiding groove 213c further runs through a rear end surface of the first fixed frame 21c.

In addition, the first fixed frame 21c is further provided with a limiting groove 214c, and an opening of the limiting groove 214c is located in a groove bottom wall of the receiving notch 211c. The limiting groove 214c is recessed in a direction from the groove bottom wall of the receiving notch 211c to a bottom surface of the first fixed frame 21c (the negative direction of the Z axis shown in the figure), and runs through a right side surface of the first fixed frame 21c. The mounting notch 212c further runs through a groove side wall of the limiting groove 214c to be communicated with the limiting groove 214c. It should be understood that a shape of the limiting groove 214c should not be limited to an ellipse shown in FIG. 24, which may alternatively be a circle, a square, or other special shapes.

Figure 24:
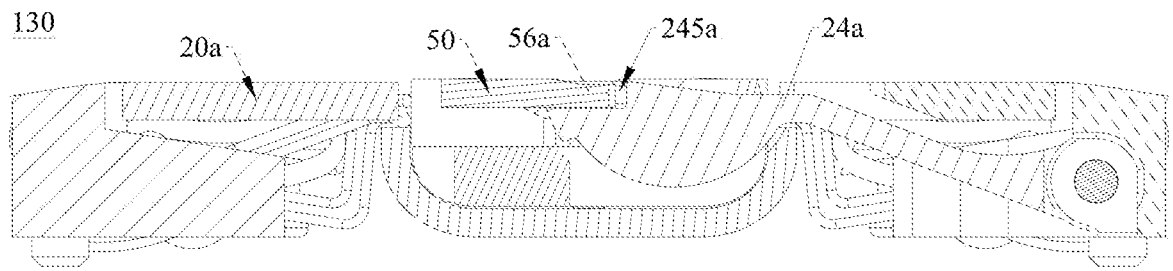
FIG. 24 is a schematic diagram of a cross-sectional structure of the foldable mechanism shown in FIG. 6 sectioned along II-II.

In addition, the first fixed frame 21c is further provided with a limiting column 215c, and the limiting column 215c is disposed on a groove bottom wall of the limiting groove 214c. Specifically, the limiting column 215c is disposed in the middle of the groove bottom wall of the limiting groove 214c. The limiting column 215c extends from the groove bottom wall of the limiting groove 214c to a top surface of the first fixed frame 21c (the positive direction of the Z axis shown in the figure). It should be understood that the shape of the limiting column 215c is not limited to a cylindrical shape as shown in FIG. 24, which may alternatively be a square column or other special shapes.

The first main swing arm 23c includes a rotating portion 231c, a connecting portion 232c, and a sliding portion 233c. In this embodiment, a structure of the first main swing arm 23c and cooperation relationships between the first main swing arm 23c and the first fixed frame 21c as well as the base 10 may be obtained with reference to the relevant description of the structure of the first main swing arm 23a in the first connection assembly 20a and the cooperation relationships between the first main swing arm 23a and the first fixed frame 21a as well as the base 10 above.

Referring to FIG. 11 together, a structure of the rotating portion 231c matches that of the mounting notch 212c. Two sub-rotating portions (not marked in the figure) of the rotating portion 231c may sleeve a first pin shaft 25c and may rotate relative to the first pin shaft 25c to realize a rotatable connection between the rotating portion 231c and the first pin shaft 25c, thereby realizing a rotatable connection between the first main swing arm 23c and the first fixed frame 21c.

A structure of the sliding portion 233c matches that of the first sliding groove 101c. The sliding portion 233c is provided with a first slide groove (not marked in the figure), a second slide groove (not marked in the figure), and a first support groove 235c. A first sliding block 141a may slide and rotate in the first slide groove, and a second sliding block 141b may slide and rotate in the second slide groove, so that the sliding portion 233c can slide and rotate in the first sliding groove 101c to realize a slidable and rotatable connection between the first main swing arm 23c and the base 10. In this case, the first slide groove is coaxial with the first sliding block 141a, and the second slide groove is coaxial with the second sliding block 141b.

In addition, a structure of the connecting portion 232c matches that of the limiting groove 214c. The connecting portion 232c is provided with a limiting hole 237c, and an opening of the limiting hole 237c is located on a top surface of the connecting portion 232c. The limiting hole 237c is recessed in a direction from a top surface of the connecting portion 232a to a bottom surface (the negative direction of the Z axis shown in the figure), and runs through the bottom surface of the connecting portion 232a. That is, the limiting hole 237c runs through the connecting portion 232a along a thickness direction of the connecting portion 232a.

A structure of the limiting hole 237c matches that of the limiting column 215c. When the third connection assembly 20c is in the flattened state, the limiting column 215 may be mounted in the limiting hole 237c, which improves accuracy of assembly between the first main swing arm 23c and the first fixed frame 21c, and the limiting groove 214c can receive part of the connecting portion 232c to support the connecting portion 232c, which ensures strength of use of the first main swing arm 23c and helps to prolong a service life of the first main swing arm 23c.

The second fixed frame 22c is provided with a receiving notch 221c, a mounting notch 222c, a second guiding groove 223c, and a limiting groove 224c. In this embodiment, structures of the receiving notch 221c, the mounting notch 222c, the second guiding groove 223c, and the limiting groove 224c may all be obtained with reference to the relevant description of the first fixed frame 21c. Details are not described herein again. The limiting groove 224c further runs through a left side surface of the second fixed frame 22c. In addition, the second fixed frame 22c is further provided with a limiting column 225c, and the limiting column 225c is disposed on a groove bottom wall of the limiting groove 224c.

The second main swing arm 24c includes a rotating portion 241c, a connecting portion 242c, and a sliding portion 243c. In this embodiment, a structure of the second main swing arm 24c and cooperation relationships between the second main swing arm 24c and the second fixed frame 22c as well as the base 10 may be obtained with reference to the relevant description of the structure of the first main swing arm 23c and the cooperation relationships between the first main swing arm 23c and the first fixed frame 21c as well as the base 10.

A structure of the rotating portion 241c matches that of the mounting notch 222c. Two sub-rotating portions (not marked in the figure) of the rotating portion 241c may sleeve a second pin shaft 26c and may rotate relative to the second pin shaft 26c to realize a rotatable connection between the rotating portion 241c and the second pin shaft 27c, thereby realizing a rotatable connection between the second main swing arm 24c and the second fixed frame 22c.

A structure of the sliding portion 243c matches that of the second sliding groove 102c. The sliding portion 243c is provided with a third slide groove (not marked in the figure), a fourth slide groove (not marked in the figure), and a second support groove 245c. A third sliding block 141c may slide and rotate in the third slide groove, and a fourth sliding block 141d may slide and rotate in the fourth slide groove, so that the sliding portion 243c can slide and rotate in the second sliding groove 102c to realize a slidable and rotatable connection between the second main swing arm 24c and the base 10. In this case, the third slide groove is coaxial with the third sliding block 141c, and the fourth slide groove is coaxial with the fourth sliding block 141d.

A structure of the connecting portion 242c matches that of the limiting groove 224c, and a structure of the limiting hole 247c matches that of the limiting column 225c. When the third connection assembly 20c is in the flattened state, the limiting column 225c may be mounted in the limiting hole 247c, which improves accuracy of assembly between the second main swing arm 24c and the second fixed frame 22c, and the limiting groove 224c can receive part of the connecting portion 242c to support the connecting portion 242c, which ensures strength of use of the second main swing arm 24c and helps to prolong a service life of the second main swing arm 24c.

Figure 17:
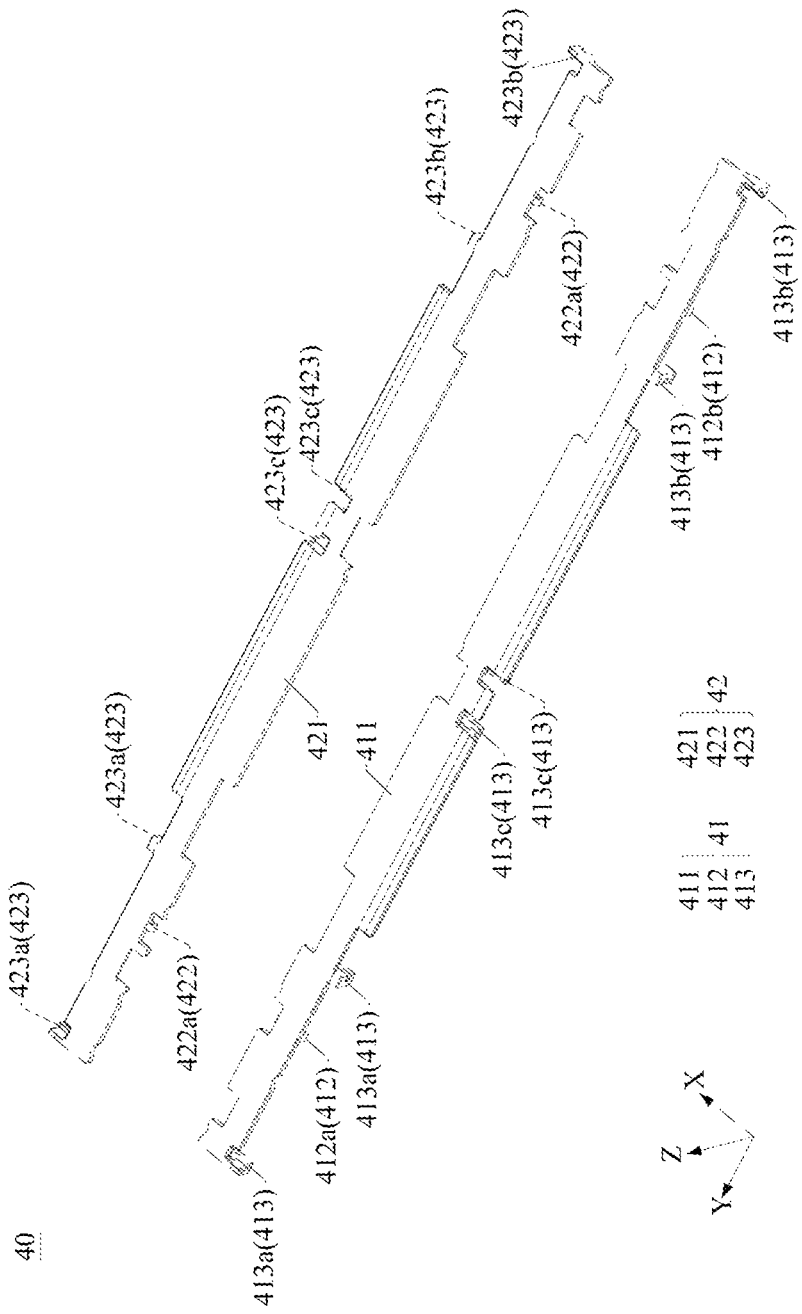
FIG. 17 is a schematic structural diagram of a pressing plate assembly in the foldable mechanism shown in FIG. 7.

Referring to FIG. 17 and FIG. 18, FIG. 17 is a schematic structural diagram of the pressing plate assembly 40 in the foldable mechanism 130 shown in FIG. 7, and FIG. 18 is a schematic structural diagram of the pressing plate assembly 40 shown in FIG. 17 at another angle.

The first pressing plate 41 includes a first support portion 411 and a first function portion 412. The first support portion 411 is roughly in a shape of a long plate. The first support portion 411 extends along the Y-axis direction. The first function portion 412 is fixedly connected to the first support portion 411. Exemplarily, the first support portion 411 and the first function portion 412 may be integrally formed, so as to improve structural strength of the first pressing plate 41 and ensure structural stability of the first pressing plate 41. In some other embodiments, the first pressing plate 41 may alternatively be an integrated structural member formed by assembly. For example, the first function portion 412 may be fixedly connected to the first support portion 411 in a manner such as welding or bonding.

The first function portion 412 is fixedly connected to a bottom surface of the first support portion 411. The first function portion 412 is provided with a first function groove 414, and an opening of the first function groove 414 is located on a front end surface of the first function portion 412. The first function groove 414 is recessed in a direction from the front end surface of the first function portion 412 to a rear end surface (the negative direction of the Y axis shown in the figure), and runs through the rear end surface of the first function portion 412. That is, the first function groove 414 runs through the first function portion 412 along the Y-axis direction.

The first function groove 414 is a strip-shaped hole. The first function groove 414 has a flattened position (not shown in the figure) and a folded position (not shown in the figure). The folded position is located on an inner side of the flattened position (a side facing the positive direction of the X axis shown in the figure). The folded position of the first function groove 414 is located on an inner side of the first function groove 414, and the flattened position of the first function groove 414 is located on an outer side of the first function groove. Exemplarily, an extension direction of the first function groove 414 is arc-shaped. In some other embodiments, the extension direction of the first function groove 414 may alternatively be linear, which is not specifically limited in this application.

Referring to FIG. 14, FIG. 15, and FIG. 16 together, in this embodiment, there are two first function portions 412, and the two first function portions 412 are arranged apart in sequence along the Y-axis direction. The two first function portions 412 are a first front function portion 412a and a first rear function portion 412b respectively. The first front function portion 412a is fixedly connected to a front side of the first support portion 411, and the first rear function portion 412b is fixedly connected to a rear side of the first support portion 411. A structure of the first function groove 414 of the first front function portion 412a matches that of the first pin shaft 256a of the first sliding portion 251a, and a structure of the first function groove 414 of the first rear function portion 412b matches that of the first pin shaft 256b of the first secondary swing arm 25b.

The front side of the first support portion 411 may be received in the receiving notch 211a of the first fixed frame 21a, the rear side of the first support portion 411 may be received in the receiving notch 211b of the first fixed frame 21b, and a middle portion of the first support portion 411 may be received in the receiving notch 211c of the first fixed frame 21c. The first pin shaft 256a of the first sliding portion 251a is mounted in the first function groove 414 of the first front function portion 412a and may slide and rotate relative to the first front function portion 412a in the first function groove 414 to realize a slidable and rotatable connection between the first sliding portion 251a and the first front function portion 412a, thereby realizing a slidable and rotatable connection between the first secondary swing arm 25a and the first pressing plate 41. The first pin shaft 256b of the first sliding portion 251b is mounted in the first function groove 414 of the first rear function portion 412b and may slide and rotate relative to the first rear function portion 412b in the first function groove 414 to realize a slidable and rotatable connection between the first sliding portion 251b and the first rear function portion 412b, thereby realizing a slidable and rotatable connection between the first secondary swing arm 25b and the first pressing plate 41.

In some other embodiments, alternatively, the first sliding portion (e.g., the first sliding portion 251a and/or the first sliding portion 251b) may be provided with a first function groove, the first function portion (e.g., the first front function portion 412a and/or the first rear function portion 412b) includes a first pin shaft, and the first pin shaft is mounted in the first function groove and may slide and rotate relative to the first sliding portion in the first function groove, so as to realize a slidable and rotatable connection between the first function portion and the first sliding portion. The first function groove has a folded position and a flattened position, and the folded position of the first function groove is located on an outer side of the flattened position of the first function groove. In this case, the folded position of the first function groove is located on an outer side of the first function groove, and the flattened position of the first function groove is located on an inner side of the first function groove.

The second pressing plate 42 includes a second support portion 421 and a second function portion 422. In this embodiment, a structure of the second pressing plate 42, a cooperation relationship between the second pressing plate 42 and the second fixed frame (e.g., the second fixed frame 22a, the second fixed frame 22b, and the second fixed frame 22c), and a cooperation relationship between the second pressing plate 42 and the second secondary swing arm (e.g., the second secondary swing arm 26a and the second secondary swing arm 26b) may be obtained with reference to the relevant description of the first pressing plate 41. Details are not described herein again. The second function groove 424 of the second function portion 422 has a flattened position and a folded position. The folded position is located on an inner side of the flattened position (a side along the negative direction of the X axis shown in the figure).

In this embodiment, a front side of the second support portion 421 may be received in the receiving notch 221a of the second fixed frame 22a, a rear side of the second support portion 421 may be received in the receiving notch 221b of the second fixed frame 22b, and a middle portion of the second support portion 421 may be received in the receiving notch 221c of the second fixed frame 22c. The second pin shaft 266a of the second sliding portion 261a may be mounted in the second function groove 424 of a second front function portion 422a and may slide and rotate relative to the second front function portion 422a in the second function groove 424 of the second front function portion 422a to realize a slidable and rotatable connection between the second sliding portion 261a and the second front function portion 422a, thereby realizing a slidable and rotatable connection between the second secondary swing arm 26a and the second pressing plate 42. A second pin shaft 266b of the second sliding portion 261b may be mounted in the second function groove 424 of a second rear function portion 422b and may slide and rotate relative to the second front function portion 422a in the second function groove 424 of the second rear function portion 422b to realize a slidable and rotatable connection between the second sliding portion 261b and the second rear function portion 422b, thereby realizing a slidable and rotatable connection between the second secondary swing arm 26b and the second pressing plate 42.

In some other embodiments, alternatively, the second sliding portion (e.g., the second sliding portion 261a and/or the second sliding portion 261b) may be provided with a second function groove, the second function portion (e.g., the second front function portion 422a and/or the second rear function portion 422b) includes a second pin shaft, the second pin shaft is mounted in the second function groove and may slide and rotate relative to the second sliding portion in the second function groove, so as to realize a slidable and rotatable connection between the second function portion and the second sliding portion. The second function groove has a folded position and a flattened position, and the folded position of the second function groove is located on an outer side of the flattened position of the second function groove. In this case, the folded position of the second function groove is located on an outer side of the second function groove, and the flattened position of the second function groove is located on an inner side of the second function groove.

It should be noted that cooperation relationships between the pressing plate assembly 40 and the first connection assembly 20a as well as the second connection assembly 20b are substantially the same. To avoid repetition, in the following, the cooperation relationship between the pressing plate assembly 40 and the first connection assembly 20a is taken as an example for description.

During the folding or unfolding of the foldable mechanism 130, the first fixed frame 21a rotates relative to the base 10, and the first fixed frame 21a drives the first secondary swing arm 25a to slide relative to the first fixed frame 21a, thereby driving the first pin shaft 256a of the first sliding portion 251a to slide and rotate relative to the first front function portion 412a in the first function groove 414 of the first front function portion 412a, so as to realize relative sliding and rotation between the first secondary swing arm 25a and the first pressing plate 41 and then drive the first pressing plate 41 to rotate relative to the base 10.

Similarly, during the folding or unfolding of the foldable mechanism 130, the second fixed frame 22a rotates relative to the base 10, and the second fixed frame 22a drives the second secondary swing arm 26a to slide relative to the second fixed frame 22a, thereby driving the second pin shaft 266a of the second sliding portion 261a to slide and rotate relative to the second front function portion 422a in the second function groove 424 of the second front function portion 422a, so as to realize relative sliding and rotation between the second secondary swing arm 26a and the second pressing plate 42 and then drive the second pressing plate 42 to rotate relative to the base 10.

Therefore, the first fixed frame 21a and the second fixed frame 22a, when rotating relative to the base 10, can respectively drive the first pressing plate 41 and the second pressing plate 42 to rotate relative to the base 10, thereby driving relative rotation between the first pressing plate 41 and the second pressing plate 42 and then realizing mutual switching of the pressing plate assembly 40 between the folded state and the flattened state.

Figure 19:
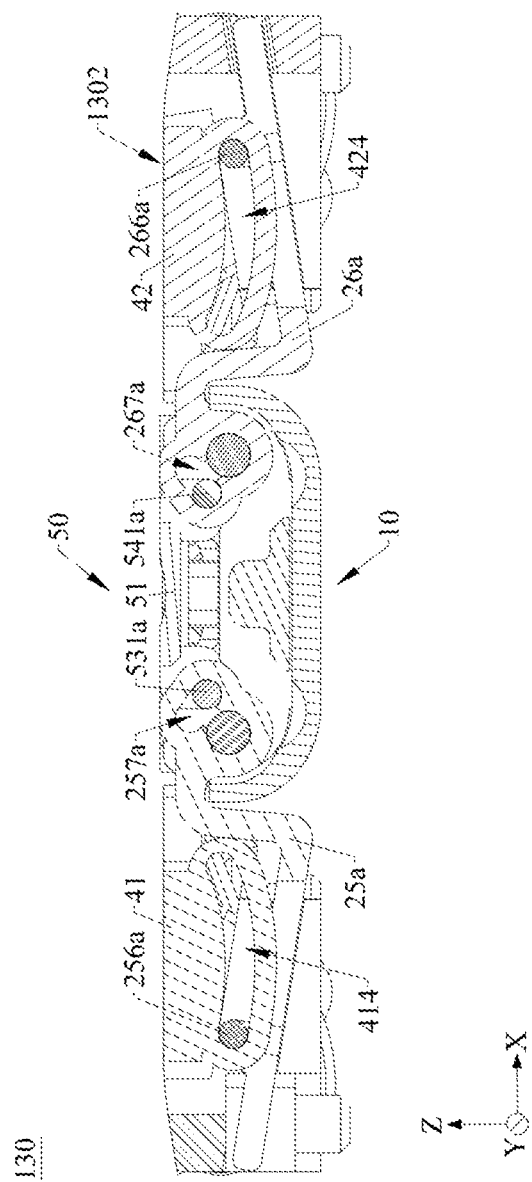
FIG. 19 is a schematic diagram of a cross-sectional structure of the foldable mechanism shown in FIG. 6 sectioned along I-I.
Figure 21:
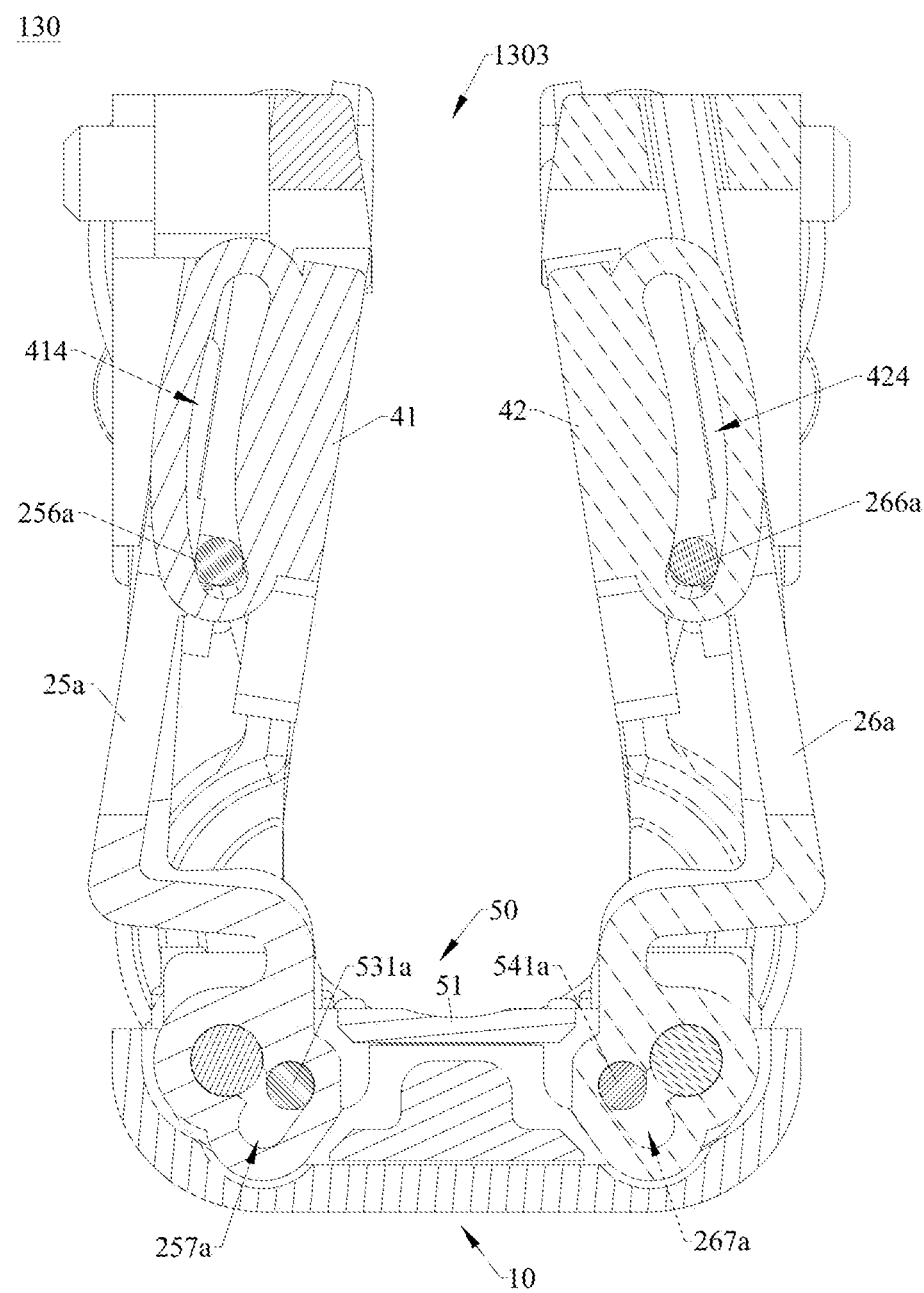
FIG. 21 is a schematic structural diagram of the foldable mechanism shown in FIG. 19 in a folded state.

Referring to FIG. 19, FIG. 20, and FIG. 21, FIG. 19 is a schematic diagram of a cross-sectional structure of the foldable mechanism 130 shown in FIG. 6 sectioned along I-I, FIG. 20 is a schematic structural diagram of the foldable mechanism 130 shown in FIG. 19 in the unfolded state, and FIG. 21 is a schematic structural diagram of the foldable mechanism 130 shown in FIG. 19 in the folded state. The state of the foldable mechanism 130 shown in FIG. 20 may be the state of the foldable mechanism 130 in the foldable terminal 1000 shown in FIG. 2. It should be understood that "sectioned along I-I" refers to being sectioned along a plane where an I-I line is located, and the following related description may be understood in the same way.

As shown in FIG. 19, when the foldable mechanism 130 is in the flattened state, both the first connection assembly 20a and the pressing plate assembly 40 are in the flattened state, and the first pressing plate 41 and the second pressing plate 42 are located on two opposite sides of the base 10 and flattened relative to each other. A top surface of the first pressing plate 41 (i.e., a top surface of the first support portion 411) is flush with a top surface of the second pressing plate 42 (i.e., a top surface of the second support portion 421). The first pin shaft 256a of the first sliding portion 251a is located at the flattened position of the first function groove 414 of the first front function portion 412a, and the second pin shaft 266a of the second sliding portion 261a is located at the flattened position of the second function groove 424 of the second pressing plate 42. The first fixed frame 21a and the second fixed frame 22a are located on the two opposite sides of the base 10 and flattened relative to each other, the first main swing arm 23a and the second main swing arm 24a are flattened relative to each other, and the first secondary swing arm 25a and the second secondary swing arm 26a are flattened relative to each other.

As shown in FIG. 20, during the folding of the foldable mechanism 130, for example, when the foldable mechanism 130 switches from the flattened state to the folded state, the first connection assembly 20a switches from the flattened state to the folded state, the first sliding portion 251a slides and rotates relative to the first front function portion 412a, and the second sliding portion 261a slides and rotates relative to the second front function portion 422a, so as to drive the first pressing plate 41 and the second pressing plate 42 to rotate relative to the base 10 to cause the pressing plate assembly 40 to switch from the flattened state to the folded state. The first pin shaft 256a of the first sliding portion 251a slides from the flattened position to the folded position in the first function groove 414 of the first front function portion 412a, and the second pin shaft 266a of the second sliding portion 261a slides from the flattened position to the folded position in the second function groove 424 of the second front function portion 422a.

As shown in FIG. 21, when the foldable mechanism 130 is in the folded state, both the first connection assembly 20a and the pressing plate assembly 40 are in the folded state, the first pin shaft 256a of the first sliding portion 251a is located at the folded position of the first function groove 414 of the first front function portion 412a, and the second pin shaft 266a of the second sliding portion 261a is located at the folded position of the second function groove 424 of the second front function portion 422a. The first fixed frame 21a and the second fixed frame 22a are folded relative to each other, the first main swing arm 23a and the second main swing arm 24a are folded relative to each other, the first secondary swing arm 25a and the second secondary swing arm 26a are folded relative to each other, and the first pressing plate 41 and the second pressing plate 42 are folded relative to each other.

It may be understood that, during the unfolding of the foldable mechanism 130, for example, when the foldable mechanism 130 switches from the folded state to the flattened state, the first connection assembly 20a switches from the folded state to the flattened state, the first sliding portion 251a slides and rotates relative to the first front function portion 412a, and the second sliding portion 261a slides and rotates relative to the second front function portion 422a, so as to drive the first pressing plate 41 and the second pressing plate 42 to rotate relative to the base 10 to cause the pressing plate assembly 40 to switch from the folded state to the flattened state. The first pin shaft 256a of the first sliding portion 251a slides from the folded position to the flattened position in the first function groove 414 of the first front function portion 412a, and the second pin shaft 266a of the second sliding portion 261a slides from the folded position to the flattened position in the second function groove 424 of the second front function portion 422a, to cause the pressing plate assembly 40 to switch from the folded state to the flattened state.

In the foldable mechanism 130 shown in this embodiment, the slidable and rotatable connection between the first pressing plate 41, the second pressing plate 42 and the connection assembly 20 (e.g., the first connection assembly 20a and the second connection assembly 20b) by using the first sliding portion of the first secondary swing arm (e.g., the first sliding portion 251a of the first secondary swing arm 25a and the first sliding portion 251b of the first secondary swing arm 25b) to cooperate with the first function portion 412 (e.g., the first front function portion 412a and the first rear function portion 412b) of the first pressing plate 41 and the second sliding portion of the second secondary swing arm (e.g., the second sliding portion 261a of the second secondary swing arm 26a and the second sliding portion 261b of the second secondary swing arm 26b) to cooperate with the second function portion 422 (e.g., the second front function portion 422a and the second rear function portion 422b) of the second pressing plate 42.

Therefore, the first pressing plate 41 and the second pressing plate 42 can realize relative rotation with the base 10 by using the connection assembly 20 (e.g., the first connection assembly 20a and the second connection assembly 20b). In other words, the first secondary swing arm (e.g., the first secondary swing arm 25a and the first secondary swing arm 25b) and the second secondary swing arm (e.g., the second secondary swing arm 26a and the second secondary swing arm 26b) of the connection assembly 20 can also function as pressing plate swing arms at the same time. That is, in the foldable mechanism 130 shown in this application, the pressing plate swing arm is omitted, which simplifies an overall structure of the foldable mechanism 130 and is conducive to the lightweight design of the foldable terminal 1000.

Referring to FIG. 17 and FIG. 18, the first pressing plate 41 further includes a first guide sliding block 413, and the first guide sliding block 413 is fixedly connected to the first support portion 411 and is disposed apart from the first function portion 412. Exemplarily, the first guide sliding block 413 is integrally formed with the first support portion 411, so as to improve structural strength of the first pressing plate 41 and ensure structural stability of the first pressing plate 41. In some other embodiments, the first guide sliding block 413 may alternatively be fixedly connected to the first support portion 411 in a manner such as welding or bonding.

The first guide sliding block 413 is fixedly connected to a bottom surface of the first pressing plate 41. The first guide sliding block 413 extends from the bottom surface of the first pressing plate 41 in a direction away from the top surface (the negative direction of the Z axis shown in the figure). A structure of the first guide sliding block 413 matches that of the first guiding groove (e.g., the first guiding groove 216a, the first guiding groove 216b, or the first guiding groove 213c). A bottom surface of the first guide sliding block 413 is an arc-shaped surface.

In this embodiment, there are six first guide sliding blocks 413, and the six first guide sliding blocks 413 are sequentially arranged apart along the Y-axis direction. The six first guide sliding blocks 413 are respectively two first front guide sliding blocks 413a, two first rear guide sliding blocks 413b, and two first middle guide sliding blocks 413c. The two first front guide sliding blocks 413a are fixedly connected to the front side of the first support portion 411 and located on two opposite sides of the first front function portion 412a. The two first rear guide sliding blocks 413b are fixedly connected to the rear side of the first support portion 411 and located on two opposite sides of the first rear function portion 412b. The two first middle guide sliding blocks 413c are fixedly connected to the middle portion of the first pressing plate 41. In some other embodiments, there may be five or less, or seven or more first guide sliding blocks 413. A quantity of the first guide sliding blocks 413 is not specifically limited in this application.

Referring to FIG. 14, FIG. 15, and FIG. 16 together, the two first front guide sliding blocks 413a may be respectively mounted in the two first guiding grooves 216a and may slide and rotate in the first guiding grooves 216a, so as to realize a slidable and rotatable connection between the first pressing plate 41 and the first fixed frame 21a to improve stability of assembly between the first pressing plate 41 and the first connection assembly 20a. The two first rear front guide sliding blocks 413b may be respectively mounted in two first guiding grooves 216b and may slide and rotate in the first guiding grooves 216b, so as to realize a slidable and rotatable connection between the first pressing plate 41 and the first fixed frame 21b to improve stability of assembly between the first pressing plate 41 and the second connection assembly 20b. The two first middle front guide sliding blocks 413c may be mounted in one first guiding groove 213c and may slide and rotate in the first guiding groove 213c, so as to realize sliding and rotation between the first pressing plate 41 and the first fixed frame 21c to ensure stability of assembly between the first pressing plate 41 and the third connection assembly 20c.

The second pressing plate 42 further includes a second guide sliding block 423, and the second guide sliding block 423 is fixedly connected to the second support portion 421. In this embodiment, a structure of the second guide sliding block 423, an assembly relationship between the second guide sliding block 423 and the second support portion 421, and a cooperation relationship between the second guide sliding block 423 and the second fixed frame (e.g., the second fixed frame 22a, the second fixed frame 22b, and the second fixed frame 22c) may be obtained with reference to the relevant description of the first guide sliding block 413. Details are not described herein again.

Two first front guide sliding blocks 423a may be respectively mounted in two second guiding grooves 226a and may slide and rotate in the second guiding grooves 226a, so as to realize a slidable and rotatable connection between the second pressing plate 42 and the second fixed frame 22a. Two first rear guide sliding blocks 423b may be respectively mounted in two second guiding grooves 226b and may slide and rotate in the second guiding grooves 226b, so as to realize a slidable and rotatable connection between the second pressing plate 42 and the second fixed frame 22b. Two first middle guide sliding blocks 423c may be respectively mounted in two second guiding grooves 223c and may slide and rotate in the second guiding grooves 223c, so as to realize a slidable and rotatable connection between the second pressing plate 42 and the second fixed frame 22c.

In some other embodiments, the pressing plate assembly 40 may alternatively include a first pressing plate 41, a second pressing plate 42, and a pressing plate swing arm. A cooperation relationship between the first pressing plate 41 and the connection assembly 20 may be obtained with reference to the relevant description of the first pressing plate 41 above. The second pressing plate 42 is slidably and rotatably connected to the second fixed frame (e.g., the second fixed frame 22a, the second fixed frame 22b, and the second fixed frame 22c). A sliding portion of the pressing plate swing arm is slidably connected to the second pressing plate 42 to cause the pressing plate swing arm to be slidably connected to the second pressing plate 42. A rotating portion of the pressing plate swing arm is rotatably connected to the base 10 to cause the pressing plate swing arm to be rotatably connected to the base 10.

Alternatively, the pressing plate assembly 40 may include a first pressing plate 41, a second pressing plate 42, a first pressing plate swing arm, and a second pressing plate swing arm. The first pressing plate 41 is slidably and rotatably connected to the first fixed frame (e.g., the first fixed frame 21a, the first fixed frame 21b, and the first fixed frame 21c), and the second pressing plate 42 is slidably and rotatably connected to the second fixed frame. A sliding portion of the first pressing plate swing arm is slidably connected to the first pressing plate 41 to cause the first pressing plate swing arm to be slidably connected to the first pressing plate 41. A rotating portion of the first pressing plate swing arm is rotatably connected to the base 10 to cause the first pressing plate swing arm to be rotatably connected to the base 10. A sliding portion of the second pressing plate swing arm is slidably connected to the second pressing plate 42 to cause the second pressing plate swing arm to be slidably connected to the second pressing plate 42. A rotating portion of the second pressing plate swing arm is rotatably connected to the base 10 to cause the second pressing plate swing arm to be rotatably connected to the base 10.

Figure 22:
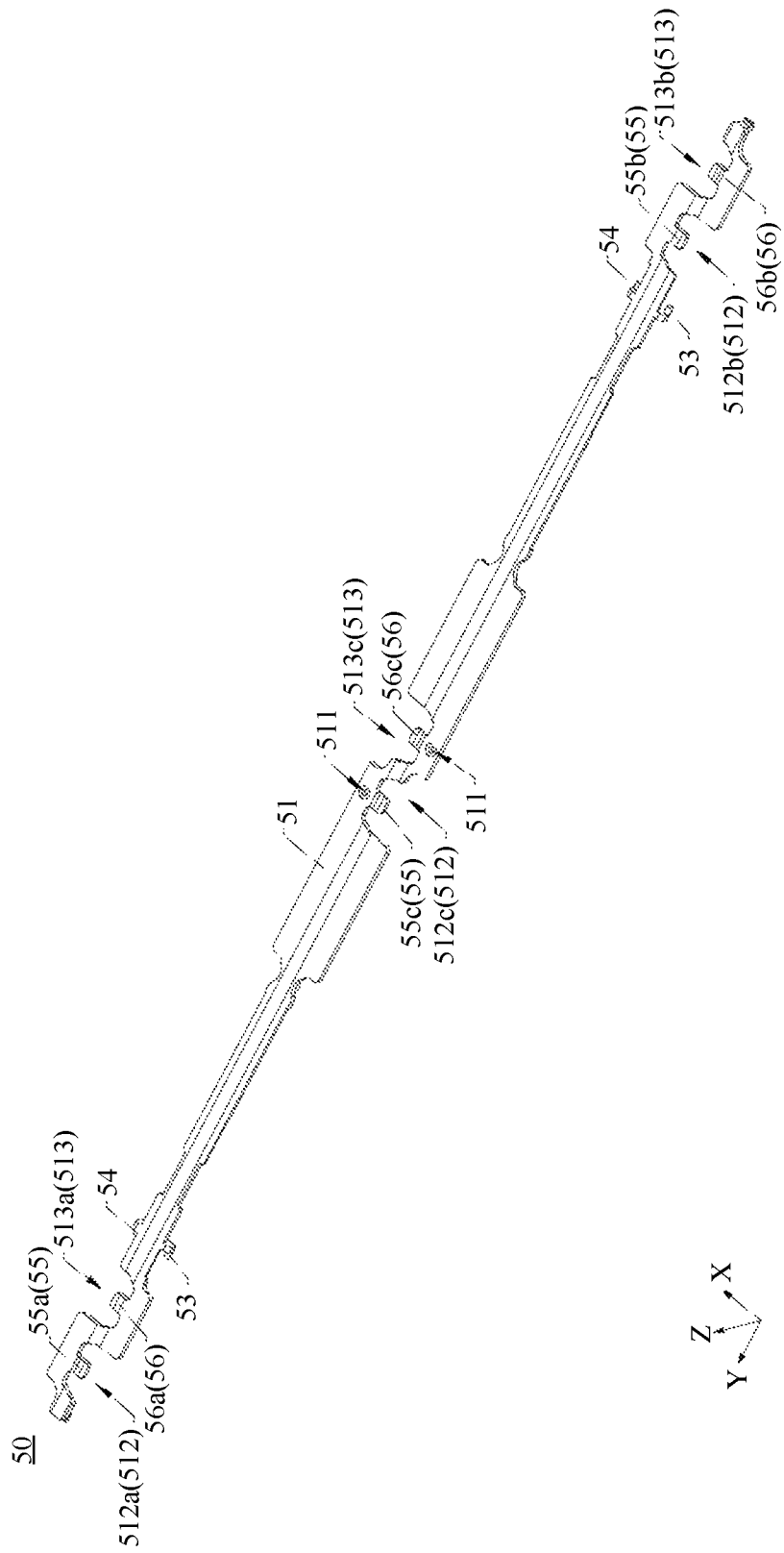
FIG. 22 is a schematic structural diagram of a floating plate in the foldable mechanism shown in FIG. 7.
Figure 23:
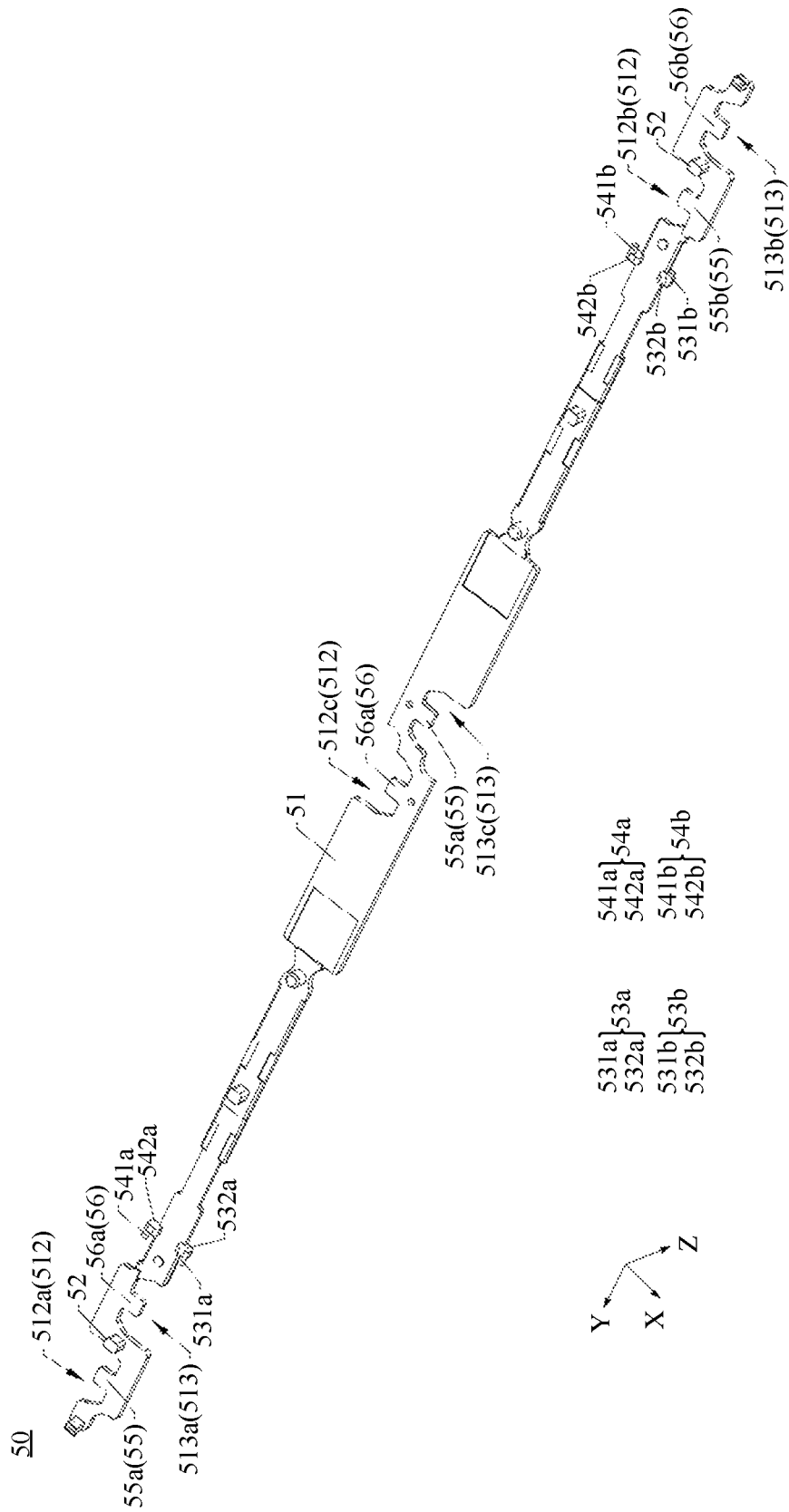
FIG. 23 is a schematic structural diagram of the floating plate shown in FIG. 22 at another angle.

Referring to FIG. 22 and FIG. 23, FIG. 22 is a schematic structural diagram of the floating plate 50 in the foldable mechanism 130 shown in FIG. 7, and FIG. 23 is a schematic structural diagram of the floating plate 50 shown in FIG. 22 at another angle.

The floating plate 50 includes a main body portion 51, a limiting portion 52, a first connecting portion 53, and a second connecting portion 54. The limiting portion 52, the first connecting portion 53, and the second connecting portion 54 are all fixedly connected to the main body portion 51. Exemplarily, the main body portion 51, the limiting portion 52, the first connecting portion 53, and the second connecting portion 54 may be integrally formed, so as to improve structural strength of the floating plate 50 and ensure structural stability of the floating plate 50. In some other embodiments, the floating plate 50 may alternatively be an integrated structural member formed by assembly. For example, the limiting portion 52, the first connecting portion 53, and the second connecting portion 54 may be fixedly connected to the main body portion 51 in a manner such as welding or bonding.

Referring to FIG. 9, FIG. 10, and FIG. 11 together, the main body portion 51 extends along the Y-axis direction. The main body portion 51 is provided with a limiting hole 511, and an opening of the limiting hole 511 is located on a bottom surface of the main body portion 51. The limiting hole 511 is recessed in a direction from the bottom surface of the main body portion 51 to a top surface (the positive direction of the Z axis shown in the figure), and runs through the top surface of the main body portion 51. That is, the limiting hole 511 runs through the main body portion 51 along a thickness direction of the main body portion 51 (the Z-axis direction shown in the figure). Exemplarily, there are two limiting holes 511. One limiting hole 511 is located on a right side of the main body portion 51, and the other limiting hole 511 is located on a left side of the main body portion 51. A structure of the limiting hole 511 matches that of the limiting column 144 (as shown in FIG. 11). The floating plate 50 is located on a top side of the base 10, and two limiting columns 144 may be respectively mounted in the two limiting holes 511 to ensure accuracy of assembly between the floating plate 50 and the base 10.

The limiting portion 52 is fixedly connected to the bottom surface of the main body portion 51. The limiting portion 52 extends from the bottom surface of the main body portion 51 along the negative position of the Z axis. Exemplarily, there are two limiting portions 52. One limiting portion 52 is fixedly connected to a front side of the main body portion 51, and the other limiting portion 52 is fixedly connected to a rear side of the main body portion 51. A structure of the limiting portion 52 matches that of the limiting hole (e.g., the limiting hole 128 and the limiting hole 138). One limiting portion 52 may be mounted in the limiting hole 128 and may slide relative to the base 10 in the limiting hole 128, and the other limiting portion 52 may be mounted in the limiting hole 138 and may slide relative to the base 10 in the limiting hole 138, to realize the slidable connection between the floating plate 50 and the base 10, which can not only limit a moving direction of the floating plate 50 relative to the base 10, but also ensure accuracy of assembly between the floating plate 50 and the base 10.

Referring to FIG. 14 and FIG. 15 together, the first connecting portion 53 is fixedly connected to the left side of the main body portion 51. In this embodiment, there are two first connecting portions 53. The two first connecting portions 53 are arranged apart along the Y-axis direction. The two first connecting portions 53 are a first front connecting portion 53a and a first rear connecting portion 53b respectively. The first front connecting portion 53a is fixedly connected to the front side of the main body portion 51, and the first rear connecting portion 53b is fixedly connected to the rear side of the main body portion 51.

Exemplarily, the first front connecting portion 53a includes a first pin 531a and a first fixed portion 532a, the first fixed portion 532a is fixedly connected to the left side of the main body portion 51, and the first pin 531a is fixedly connected to the first fixed portion 532a, to realize a fixed connection between the first pin 531a and the main body portion 51. An axis center of the first pin 531a is parallel to the Y-axis direction. A structure of the first pin 531a matches that of the first auxiliary groove 257a of the first auxiliary portion 254a. The first pin 531a may be mounted in the first auxiliary groove 257a, and may slide and rotate relative to the first auxiliary portion 254a in the first auxiliary groove 257a to realize a slidable and rotatable connection between the first front connecting portion 53a and the first auxiliary portion 254a, thereby realizing a slidable and rotatable connection between the floating plate 50 and the first secondary swing arm 25a.

Similarly, the first rear connecting portion 53b includes a first pin 531b and a first fixed portion 532b. A structure of the first pin 531b matches that of a first auxiliary groove 257b of the first auxiliary portion 254b. The first pin 531b may be mounted in the first auxiliary groove 257b and may slide and rotate relative to the first auxiliary portion 254b in the first auxiliary groove 257b to realize a slidable and rotatable connection between the first rear connecting portion 53b and the first auxiliary portion 254b, thereby realizing a slidable and rotatable connection between the floating plate 50 and the first secondary swing arm 25b.

In some other embodiments, alternatively, the first connecting portion (e.g., the first front connecting portion 53a and/or the first rear connecting portion 53b) may be provided with a first auxiliary groove, the first auxiliary portion (e.g., the first auxiliary portion 254a and/or the first auxiliary portion 254b) includes a first pin, and the first pin is mounted in the first auxiliary groove and may slide and rotate relative to the first connecting portion in the first auxiliary groove, so as to realize a slidable and rotatable connection between the first auxiliary portion and the first connecting portion. The first auxiliary groove has a folded position and a flattened position, and the folded position of the first auxiliary groove is located on a bottom side of the flattened position of the first auxiliary groove. In this case, the folded position of the first auxiliary groove is located on a bottom side of the first auxiliary groove, and the flattened position of the first auxiliary groove is located on a top side of the first auxiliary groove.

The second connecting portion 54 is fixedly connected to the right side of the main body portion 51. In this embodiment, a structure of the second connecting portion 54 and a cooperation relationship between the second connecting portion 54 and the second secondary swing arm (e.g., the second secondary swing arm 26a and the second secondary swing arm 26b) may be obtained with reference to the relevant description of the first connecting portion 53. Exemplarily, the first front connecting portion 53a and the second front connecting portion 54a may be mirror-symmetrical about the main body portion 51, and the first rear connecting portion 53b and the second rear connecting portion 54b may be mirror-symmetrical about the main body portion 51.

The second front connecting portion 54a includes a second pin 541a and a second fixed portion 542a. A structure of the second pin 541a matches that of the second auxiliary groove 267a of the second auxiliary portion 264a. The second pin 541a may be mounted in the second auxiliary groove 267a and may slide and rotate relative to the second auxiliary portion 264a in the second auxiliary groove 267a to realize a slidable and rotatable connection between the second front connecting portion 54a and the second auxiliary portion 264a, thereby realizing a slidable and rotatable connection between the floating plate 50 and the second secondary swing arm 26a.

The second rear connecting portion 54b includes a second pin 541b and a second fixed portion 542b. A structure of the second pin 541b matches that of a second auxiliary groove 267b of the second auxiliary portion 264b. The second pin 541b may be mounted in the second auxiliary groove 267b, and may slide and rotate relative to the second auxiliary portion 264b in the second auxiliary groove 267b to realize a slidable and rotatable connection between the second rear connecting portion 54b and the second auxiliary portion 264b, thereby realizing a slidable and rotatable connection between the floating plate 50 and the second secondary swing arm 26b.

In some other embodiments, alternatively, the second connecting portion (e.g., the second front connecting portion 54a and/or the second rear connecting portion 54b) may be provided with a second auxiliary groove, the second auxiliary portion (e.g., the second auxiliary portion 264a and/or the second auxiliary portion 264b) includes a second pin, and the second pin is mounted in the second auxiliary groove and may slide and rotate relative to the second connecting portion in the second auxiliary groove, so as to realize a slidable and rotatable connection between the second auxiliary portion and the second connecting portion. The second auxiliary groove has a folded position and a flattened position, and the folded position of the second auxiliary groove is located on a bottom side of the flattened position of the second auxiliary groove. In this case, the folded position of the second auxiliary groove is located on a bottom side of the second auxiliary groove, and the flattened position of the second auxiliary groove is located on a top side of the second auxiliary groove.

It should be noted that cooperation relationships between the floating plate 50 and the first connection assembly 20a as well as the second connection assembly 20b are substantially the same. To avoid repetition, in the following, the cooperation relationship between the floating plate 50 and the first connection assembly 20a is taken as an example for description.

When the first fixed frame 21a and the second fixed frame 22a rotate relative to the base 10, the first fixed frame 21a drives the first secondary swing arm 25a to slide relative to the first fixed frame 21a, and the second fixed frame 22a drives the second secondary swing arm 26a to slide relative to the second fixed frame 22a, thereby driving the first connecting portion 53 of the floating plate 50 to slide and rotate in the first auxiliary groove 257a of the first secondary swing arm 25a and the second connecting portion 54 to slide and rotate in the second auxiliary groove 267a of the second secondary swing arm 26a, to drive the floating plate 50 to float or sink relative to the base 10.

Referring to FIG. 6 and FIG. 19, when the foldable mechanism 130 is in the flattened state, both the first connection assembly 20a and the pressing plate assembly 40 are in the flattened state, the first pin 531a of the first front connecting portion 53a is located at the flattened position of the first auxiliary groove 257a of the first auxiliary portion 254a, and the second pin 541a of the second front connecting portion 54a is located at the flattened position of the second auxiliary groove 267a of the second auxiliary portion 264a. The floating plate 50 is located between the first pressing plate 41 and the second pressing plate 42, and the top surface of the floating plate 50 (that is, the top surface of the main body portion 51) is flush with the top surface of the first pressing plate 41 and the top surface of the second pressing plate 42. The top surface of the floating plate 50, the top surface of the first pressing plate 41, and the top surface of the second pressing plate 42 jointly form a support surface 1302.

Referring to FIG. 20, during the folding of the foldable mechanism 130, for example, when the foldable mechanism 130 switches from the flattened state to the folded state, the first connection assembly 20a switches from the flattened state to the folded state, the first auxiliary portion 254a slides and rotates relative to the first front connecting portion 53a, and the second auxiliary portion 264a slides and rotates relative to the second front connecting portion 54a, so as to drive the floating plate 50 to sink relative to the base 10. The first pin 531a slides from the flattened position to the folded position in the first auxiliary groove 257a, and the second pin 541a slides from the flattened position to the folded position in the second auxiliary groove 267a.

Referring to FIG. 21, when the foldable mechanism 130 is in the folded state, both the first connection assembly 20a and the pressing plate assembly 40 are in the folded state, the first pin 531a of the first front connecting portion 53a is located at the folded position of the first auxiliary groove 257a, and the second pin 541a of the second front connecting portion 54a is located at the folded position of the second auxiliary groove 267a. The first fixed frame 21a, the second fixed frame 22a, the first pressing plate 41, the second pressing plate 42, and the floating plate 50 are enclosed to form an avoidance space 1303.

It may be understood that, during the unfolding of the foldable mechanism 130, for example, when the foldable mechanism 130 switches from the folded state to the flattened state, the first connection assembly 20a switches from the folded state to the flattened state, the first auxiliary portion 254a slides and rotates relative to the first front connecting portion 53a, and the second auxiliary portion 264a slides and rotates relative to the second front connecting portion 54a, so as to drive the floating plate 50 to float relative to the base 10. The first pin 531a slides from the folded position to the flattened position in the first auxiliary groove 257a, and the second pin 541a slides from the folded position to the flattened position in the second auxiliary groove 267a.

In the foldable mechanism 130 shown in this embodiment, floating or sinking of the floating plate 50 relative to the base 10 is realized by using the first connecting portion 53 of the floating plate 50 to cooperate with the first auxiliary portion of the first secondary swing arm (i.e., the first auxiliary portion 254a of the first secondary swing arm 25a and the first auxiliary portion 254b of the first secondary swing arm 25b) and the second connecting portion 54 to cooperate with the second auxiliary portion of the second secondary swing arm (i.e., the second auxiliary portion 264a of the second secondary swing arm 26a and the second auxiliary portion 264b of the second secondary swing arm 26b).

In other words, the floating plate 50 can realize floating or sinking relative to the base 10 under the driving of the first secondary swing arm and the second secondary swing arm. The floating plate 50 does not need to be assembled with the base 10 by using a structural member such as a spring, which simplifies an overall structure of the foldable mechanism 130 and is conducive to lightweight design of the foldable terminal 1000. Moreover, the first secondary swing arm on a left side and the second secondary swing arm on a right side can jointly drive the floating plate 50 to float or sink relative to the base 10, ensuring balance of force on the left and right sides of the floating plate 50 during movement relative to the base 10.

In addition, the first secondary swing arm (e.g., the first secondary swing arm 25a and the first secondary swing arm 25b), when rotating relative to the base 10, may drive the floating plate 50 to float or sink relative to the base 10. In this case, the second connecting portion 54 of the floating plate 50 can slide relative to the second auxiliary portion of the second secondary swing arm (e.g., the second auxiliary portion 264a of the second secondary swing arm 26a and the second auxiliary portion 264b of the second secondary swing arm 26b), thereby driving the second secondary swing arm (e.g., the second secondary swing arm 26a and the second secondary swing arm 26b) to rotate relative to the base 10 to realize synchronous rotation between the first secondary swing arm and the second secondary swing arm. Similarly, the second secondary swing arm, when rotating relative to the base 10, may drive the floating plate 50 to float or sink relative to the base, thereby driving the first secondary swing arm to rotate relative to the base 10 to realize synchronous rotation between the first secondary swing arm and the second secondary swing arm.

Referring to FIG. 22 and FIG. 23, the floating plate 50 further includes a first support portion 55 and a second support portion 56, and both of the first support portion 55 and the second support portion 56 are fixedly connected to the main body portion 51. Exemplarily, the first support portion 55 and the second support portion 56 may be integrally formed with the main body portion 51, so as to improve structural strength of the floating plate 50 and ensure structural stability of the floating plate 50. In some other embodiments, the floating plate 50 may alternatively be an integrated structural member formed by assembly. For example, the first support portion 55 and the second support portion 56 may be fixedly connected to the main body portion 51 in a manner such as welding or bonding.

In addition, the main body portion 51 is provided with a first avoiding groove 512 and a second avoiding groove 513. Openings of the first avoiding groove 512 and the second avoiding groove 513 are both located on the bottom surface of the main body portion 51. Both the first avoiding groove 512 and the second avoiding groove 513 are recessed in a direction from the bottom surface of the main body portion 51 to the top surface, and run through the bottom surface of the main body portion 51. That is, both the first avoiding groove 512 and the second avoiding groove 513 run through the main body portion 51 along a thickness direction of the main body portion 51. In addition, the first avoiding groove 512 further runs through a left side surface of the main body portion 51, and the second avoiding groove 513 further runs through a right side surface of the main body portion 51.

Exemplarily, there are three first avoiding grooves 512, and the three first avoiding grooves 512 are arranged apart along the Y-axis direction. The three first avoiding grooves 512 are a first front avoiding groove 512a, a first rear avoiding groove 512b, and a first middle avoiding groove 512c respectively. The first front avoiding groove 512a is located on the front side of the main body portion 51 and located on a side of the limiting portion 52 facing the positive direction of the Y axis, and is disposed apart from the limiting portion 52. The first rear avoiding groove 512b is located on the rear side of the main body portion 51 and located on the side of the limiting portion 52 facing the positive direction of the Y axis, and is disposed apart from the limiting portion 52. The first middle avoiding groove 512c is located on a middle side of the main body portion 51. A structure of the first front avoiding groove 512a matches that of the sliding portion 233a (as shown in FIG. 14) of the first main swing arm 23a, a structure of the first rear avoiding groove 512b matches that of the sliding portion 233b (as shown in FIG. 15) of the first main swing arm 23b, and the first middle avoiding groove 512c matches that of the sliding portion 233c (as shown in FIG. 16) of the first main swing arm 23c. In some other embodiments, there may be one, two, four, or more first avoiding grooves 512. A quantity of the first avoiding groove 512 is not specifically limited in this application.

Exemplarily, there are three second avoiding grooves 513, and the three second avoiding grooves 513 are arranged apart along the Y-axis direction. The three second avoiding grooves 513 are a second front avoiding groove 513a, a second rear avoiding groove 513b, and a second middle avoiding groove 513c respectively. The second front avoiding groove 513a is located on the front side of the main body portion 51 and located on a side of the limiting portion 52 facing the negative direction of the Y axis, and is disposed apart from the limiting portion 52. The second rear avoiding groove 513b is located on the rear side of the main body portion 51 and located on the side of the limiting portion 52 facing the negative direction of the Y axis, and is disposed apart from the limiting portion 52. The second middle avoiding groove 513c is located on the middle side of the main body portion 51 and located on a side of the second middle avoiding groove 513c facing the negative direction of the Y axis, and is disposed apart from the second middle avoiding groove 513c. A structure of the second front avoiding groove 513a matches that of the sliding portion 243a (as shown in FIG. 14) of the second main swing arm 24a, a structure of the second rear avoiding groove 513b matches that of the sliding portion 243b (as shown in FIG. 15) of the second main swing arm 24b, and the second middle avoiding groove 513c matches that of the sliding portion 243c (as shown in FIG. 16) of the second main swing arm 24c. In some other embodiments, there may be one, two, four, or more second avoiding grooves 513. A quantity of the second avoiding groove 513 is not specifically limited in this application.

The first support portion 55 is fixedly connected to a groove wall of the first avoiding groove 512, and extends from the groove wall of the first avoiding groove 512 along the negative direction of the X axis. Exemplarily, there are three first support portions 55, and the three first support portions 55 are fixedly connected to groove walls of the three first avoiding grooves 512 respectively. The three first support portions 55 are a first front support portion 55a, a first rear support portion 55b, and a first middle support portion 55c respectively. The first front support portion 55a is fixedly connected to a groove wall of the first front avoiding groove 512a, the first rear support portion 55b is fixedly connected to a groove wall of the first rear avoiding groove 512b, and the first middle support portion 55c is fixedly connected to a groove wall of the first middle avoiding groove 512c.

Referring to FIG. 14, FIG. 15, and FIG. 16 together, a structure of the first front support portion 55a matches that of the first support groove 235a of the first main swing arm 23a, a structure of the first rear support portion 55b matches that of the first support groove 235b of the first main swing arm 23b, and a structure of the first middle support portion 55c matches that of the first support groove 235c of the first main swing arm 23c. When the foldable mechanism 130 is in the flattened state, the first front support portion 55a may be received in the first support groove 235a of the first main swing arm 23a, the first rear support portion 55b may be received in the first support groove 235b of the first main swing arm 23a, and the first middle support portion 55c may be received in the first support groove 235c of the first main swing arm 23c.

The second support portion 56 is fixedly connected to a groove wall of the second avoiding groove 513, and extends from the groove wall of the second avoiding groove 513 along the positive direction of the X axis. In this embodiment, a structure of the second support portion 56 and a cooperation relationship between the second support portion 56 and the second avoiding groove 513 may be obtained with reference to the relevant description of the first support portion 55.

A structure of the second front support portion 56a matches that of the second support groove 245a of the second main swing arm 24a, a structure of the second rear support portion 56b matches that of the second support groove 245b of the second main swing arm 24b, and a structure of the second middle support portion 56c matches that of the second support groove 245c of the second main swing arm 24c. When the foldable mechanism 130 is in the flattened state, the second front support portion 56a may be received in the second support groove 245a of the second main swing arm 24a, the second rear support portion 56b may be received in the second support groove 245b of the second main swing arm 24a, and the second middle support portion 56c may be received in the second support groove 245c of the second main swing arm 24c.

Figure 25:
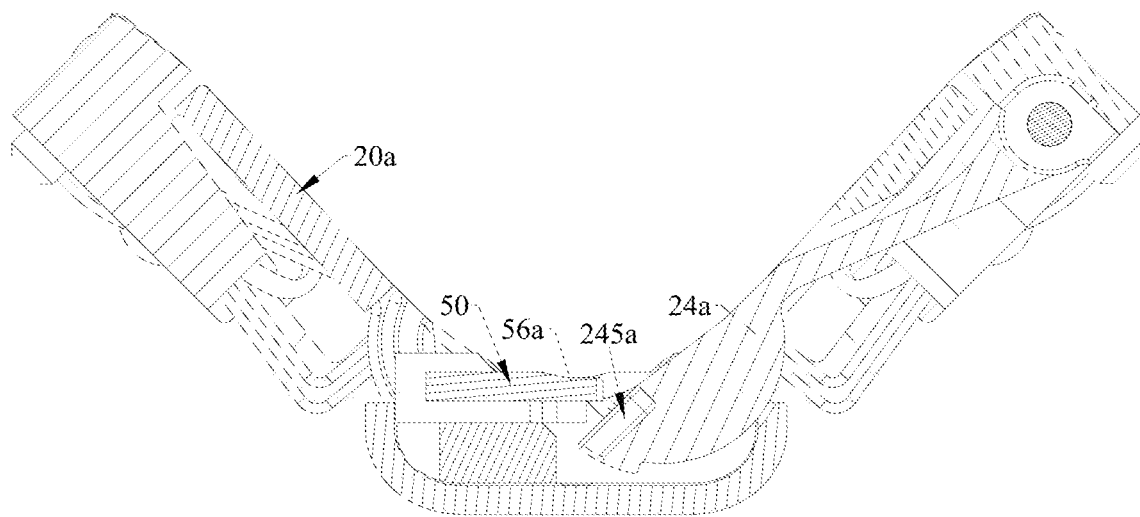
FIG. 25 is a schematic structural diagram of the foldable mechanism shown in FIG. 24 in the unfolded state.
Figure 26:
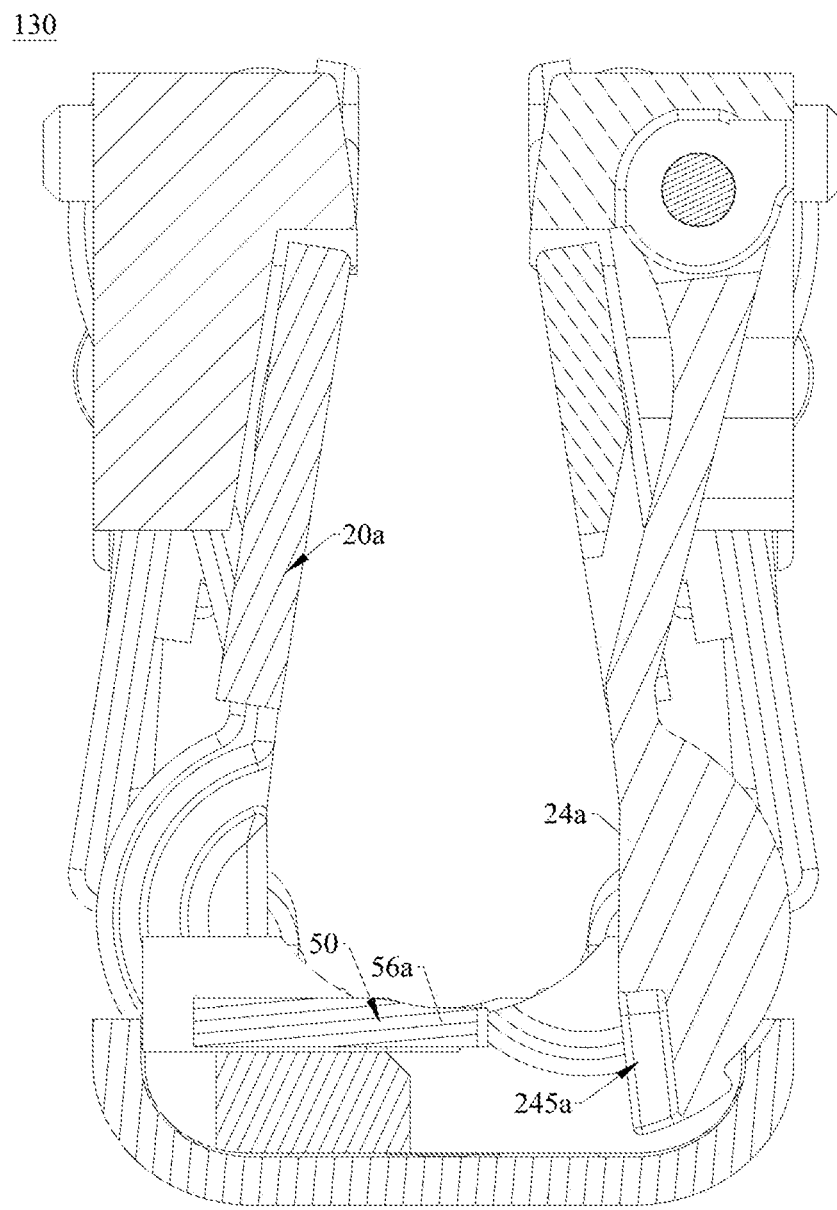
FIG. 26 is a schematic structural diagram of the foldable mechanism shown in FIG. 19 in the folded state.

Referring to FIG. 22, FIG. 23, and FIG. 24 to FIG. 26, FIG. 24 is a schematic diagram of a cross-sectional structure of the foldable mechanism 130 shown in FIG. 6 sectioned along II-II, FIG. 25 is a schematic structural diagram of the foldable mechanism 130 shown in FIG. 24 in the unfolded state, and FIG. 26 is a schematic structural diagram of the foldable mechanism 130 shown in FIG. 19 in the folded state. The state of the foldable mechanism 130 shown in FIG. 25 may be the state of the foldable mechanism 130 in the foldable terminal 1000 shown in FIG. 2.

As shown in FIG. 24, when the foldable mechanism 130 is in the flattened state, both the first connection assembly 20a and the pressing plate assembly 40 are in the flattened state, the sliding portion 233a of the first main swing arm 23a is partially received in the first front avoiding groove 512a, the first front support portion 55a is received in the first support groove 235a of the sliding portion 233a and abuts against a groove bottom wall of the first support groove 235a, the sliding portion 243a of the second main swing arm 24a is partially received in the second front avoiding groove 513a, and the second front support portion 56a is received in the second support groove 245a of the sliding portion 243a and abuts against a groove bottom wall of the second support groove 245a.

In other words, the groove bottom wall of the first support groove 235a abuts against a bottom surface of the first front support portion 55a, the groove bottom wall of the second support groove 245a abuts against a bottom surface of the second front support portion 56a, to realize joint abutting of the sliding portion 233a of the first main swing arm 23a and the second support groove 243a of the second main swing arm 24a against the floating plate 50. In this case, the first main swing arm 23a can support the floating plate 50 through the sliding portion 233a, and the second main swing arm 24a can support the floating plate 50 through the sliding portion 243a, which can not only improve stability of assembly between the floating plate 50 and the first connection assembly 20a relative to the base 10, but also maintain the floating plate 50 in a state of floating relative to the base 10, so as to improve overall structural stability of the foldable mechanism 130.

In this case, the first pressing plate 41 and the first main swing arm 23a can also reuse a size of the foldable mechanism 130 in a thickness direction (the Z-axis direction shown in the figure), and the second pressing plate 42 and the second main swing arm 24a can reuse the size of the foldable mechanism 130 in the thickness direction, which can reduce the size of the foldable mechanism 130 in the thickness direction and is conducive to light and thin design of the foldable mechanism 130, thereby helping to realize light and thin design of the foldable terminal 1000.

As shown in FIG. 25 and FIG. 26, when the foldable mechanism 130 is in the unfolded state, the first connection assembly 20a is in the unfolded state, the first front support portion 55a is not located in the first support groove 235a of the first main swing arm 23a, and the second front support portion 56a is not located in the second support groove 245a of the second main swing arm 24a. In this case, both the first main swing arm 23a and the second main swing arm 24a may not affect floating of the floating plate 50 relative to the base 10. That is, both the first main swing arm 23a and the second main swing arm 24a may not interfere with movement of the floating plate 50, ensuring smooth operation of the foldable mechanism 130.

It should be noted that cooperation relationships between the floating plate 50 and the first damping assembly 30a as well as the second damping assembly 30b are substantially the same. To avoid repetition, in the following, the cooperation relationship between the floating plate 50 and the first damping assembly 30a is taken as an example for description.

Figure 27:
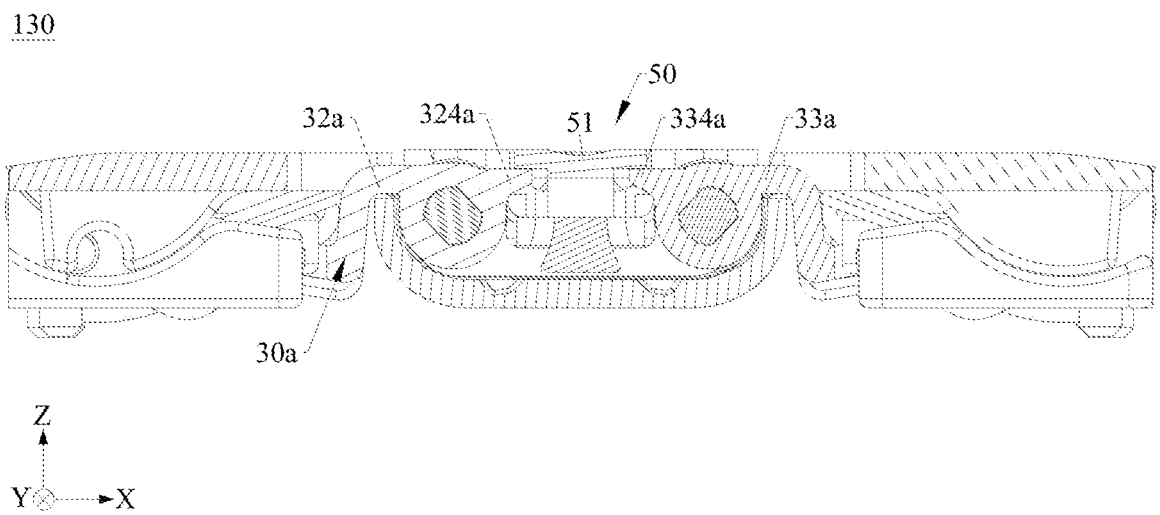
FIG. 27 is a schematic diagram of a cross-sectional structure of the foldable mechanism shown in FIG. 6 sectioned along III-III.
Figure 28:
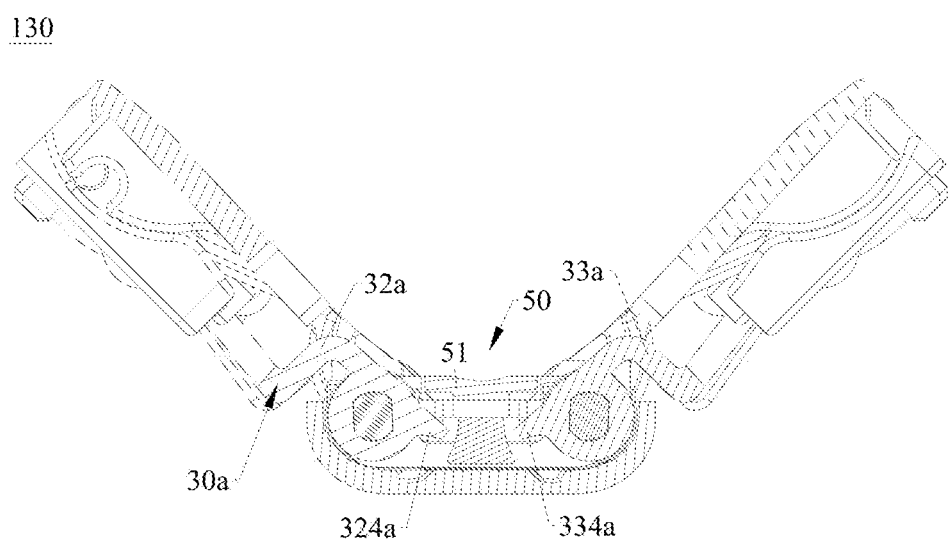
FIG. 28 is a schematic structural diagram of the foldable mechanism shown in FIG. 27 in the unfolded state.
Figure 29:
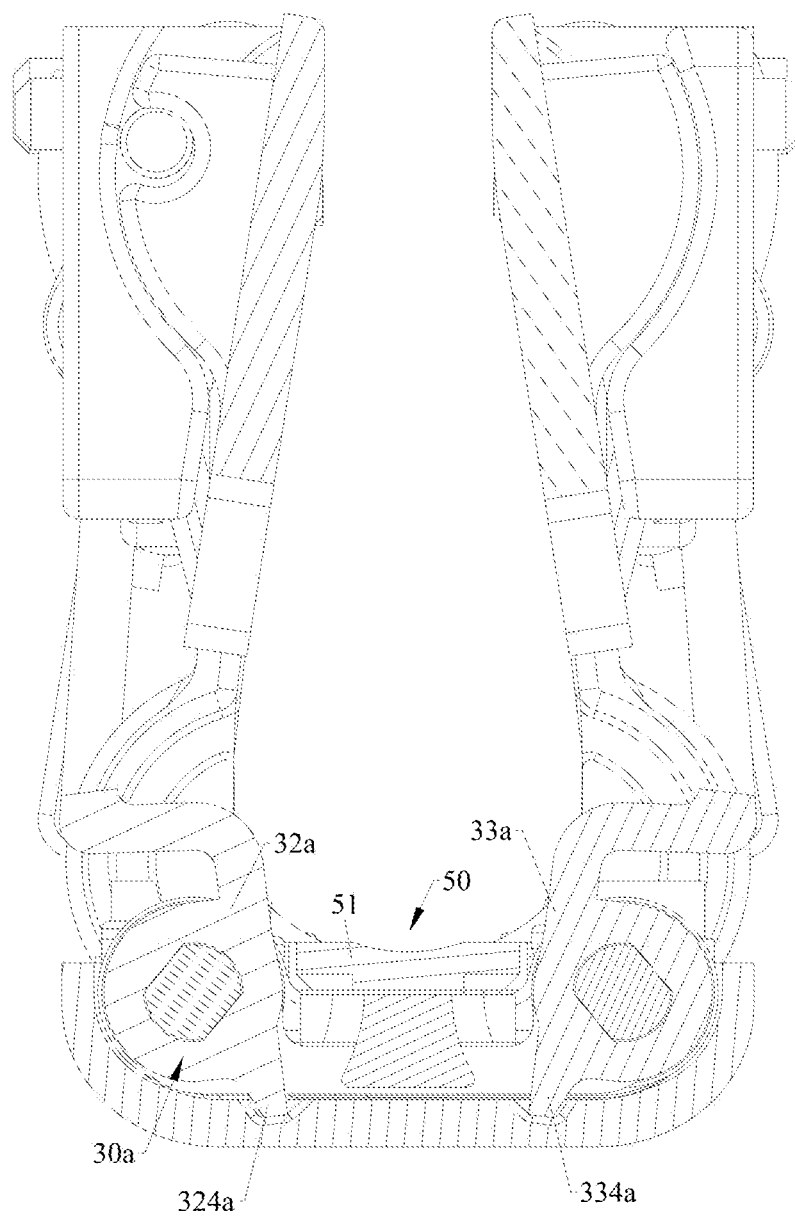
FIG. 29 is a schematic structural diagram of the foldable mechanism shown in FIG. 27 in the folded state.

Referring to FIG. 22, FIG. 23, and FIG. 27 to FIG. 29, FIG. 27 is a schematic diagram of a cross-sectional structure of the foldable mechanism 130 shown in FIG. 6 sectioned along III-III, FIG. 28 is a schematic structural diagram of the foldable mechanism 130 shown in FIG. 27 in the unfolded state, and FIG. 29 is a schematic structural diagram of the foldable mechanism 130 shown in FIG. 27 in the folded state. The state of the foldable mechanism 130 shown in FIG. 28 may be the state of the foldable mechanism 130 in the foldable terminal 1000 shown in FIG. 2.

As shown in FIG. 27, when the foldable mechanism 130 is in the flattened state, the first damping assembly 30a is in the flattened state, and the support portion 324a of the first damping swing arm 32a and the support portion 334a of the second damping swing arm 33a abut against the bottom surface of the main body portion 51 of the floating plate 50 respectively. In this case, the first damping swing arm 32a and the second damping swing arm 33a can support the floating plate 50 to cause the floating plate 50 to remain in the state of floating relative to the base 10, so as to improve the overall structural stability of the foldable mechanism 130.

As shown in FIG. 28 and FIG. 29, when the foldable mechanism 130 is in the unfolded state, the first damping assembly 30a is in the folded state, and both the support portion 324a of the first damping swing arm 32a and the support portion 334a of the second damping swing arm 33a do not abut against the bottom surface of the main body portion 51 of the floating plate 50. In this case, both the first damping swing arm 32a and the second damping swing arm 33a may not affect floating of the floating plate 50 relative to the base 10. That is, both the first damping swing arm 32a and the second damping swing arm 33a may not interfere with movement of the floating plate 50, ensuring smooth operation of the foldable mechanism 130.

Figure 30:
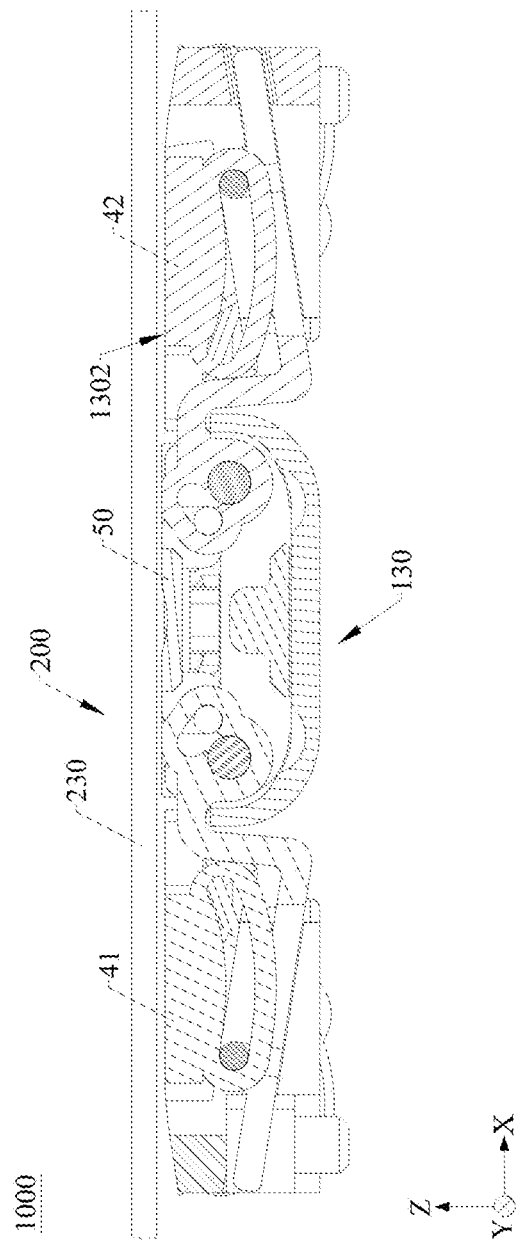
FIG. 30 is a schematic diagram of a cross-sectional structure of the foldable terminal shown in FIG. 3.
Figure 31:
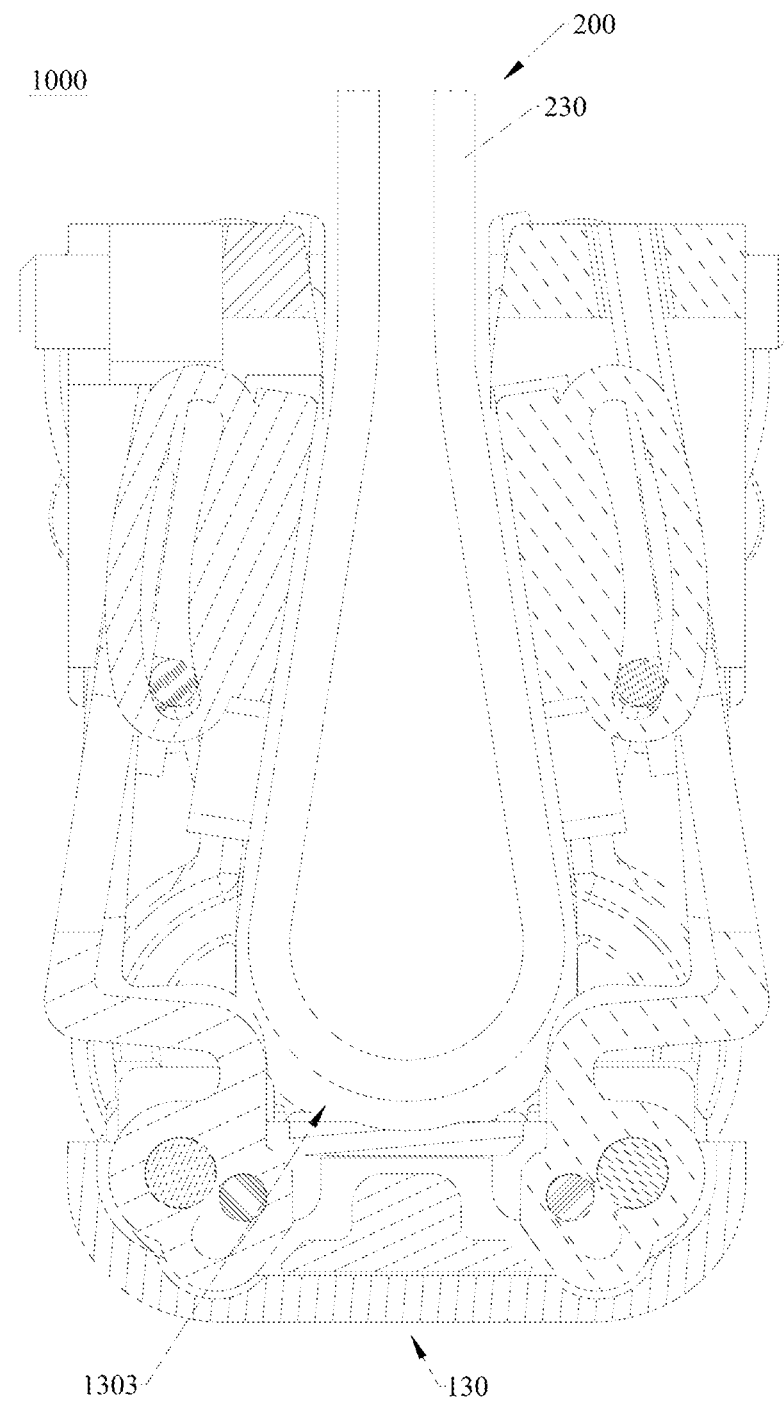
FIG. 31 is a schematic diagram of a cross-sectional structure of the foldable terminal shown in FIG. 1.

Referring to FIG. 4, FIG. 7, FIG. 30, and FIG. 31, FIG. 30 is a schematic diagram of a cross-sectional structure of the foldable terminal 1000 shown in FIG. 3, and FIG. 31 is a schematic diagram of a cross-sectional structure of the foldable terminal 1000 shown in FIG. 1. The foldable terminals 1000 shown in FIG. 30 and FIG. 31 only show the foldable mechanism 130 and the foldable part 230 of the display screen 200.

Specifically, the first fixed frame 21a, the first fixed frame 21b, and the first fixed frame 21c are fixedly connected to the first housing 110, and the second fixed frame 22a, the second fixed frame 22b, and the second fixed frame 22c are fixedly connected to the second housing 120. Exemplarily, the first fixed frame 21a, the first fixed frame 21b, and the first fixed frame 21c may be fixedly connected to the first housing 110 by using fasteners such as screws or bolts, and the second fixed frame 22a, the second fixed frame 22b, and the second fixed frame 22c may be fixedly connected to the second housing 120 by using fasteners such as screws or bolts.

As shown in FIG. 30, the support surface 1302 formed by the first pressing plate 41, the second pressing plate 42, and the floating plate 560 may support the foldable part 230 of the display screen 200, so as to ensure good display of the display screen 200. The support surface 1302 may be flush with the top surface of the first housing 110 and the top surface of the second housing 120, so that the first pressing plate 41, the second pressing plate 42, and the floating plate 50 may jointly support the display screen 200 with the first housing 110 and the second housing 120, thereby implementing effective support of the display screen 200 by the foldable apparatus 100 in the flattened state.

As shown in FIG. 31, when the foldable terminal 1000 is in the folded state, the foldable part 230 of the display screen 200 is located on an inner side of the foldable mechanism 130. Specifically, the foldable part 230 is located in the avoidance space 1303. In this case, the foldable mechanism 130 can avoid an R angle formed when the foldable part 230 is bent, so that the foldable part 230 does not bend at a relatively large angle, thereby preventing an undesirable phenomenon such as a crease in the display screen 200 and helping to prolong a service life of the display screen 200.

In the foldable mechanism 130 used by the foldable terminal 1000 shown in this embodiment, the first secondary swing arm and the second secondary swing arm of the connection assembly 20 (e.g., the first connection assembly 20a and the second connection assembly 20b) can function as pressing plate swing arms to respectively drive the first pressing plate 41 and the second pressing plate 42 to rotate relative to the base 10. That is, in the foldable mechanism 130 shown in this application, the pressing plate swing arm may be omitted, which simplifies an overall structure of the foldable mechanism 130 and is conducive to the lightweight design of the foldable terminal 1000.

In addition, the first secondary swing arm and the second secondary swing arm of the connection assembly 20 (e.g., the first connection assembly 20a and the second connection assembly 20b) can further drive the floating plate 50 to float or sink relative to the base 10, and a structure member such as a spring required for assembly between the floating plate 50 and the base 10 can be omitted, which further simplifies the overall structure of the foldable mechanism 130 and is conducive to the lightweight design of the foldable terminal 1000.

The foregoing descriptions are merely specific implementations of this application, but the protection scope of this application is not limited thereto. Any variation or replacement readily figured out by a person skilled in the art within the technical scope disclosed in this application shall fall within the protection scope of this application. In the case of no conflict, the embodiments of this application and the features in the embodiments can be combined with each other. Therefore, the protection scope of this application shall be subject to the protection scope of the claims.

What is claimed is:

1. A foldable terminal, comprising:
   a first housing;
   a second housing; and
   a foldable mechanism, comprising:
      a base;
      a first fixed frame;
      a first secondary swing arm comprising:
         a first sliding portion slidably connected to the first fixed frame;
         a first auxiliary portion; and
         a first rotating portion fixedly connected between the first sliding portion and the first auxiliary portion, and rotatably connected to the base; and
      a floating plate located on a top side of the base, wherein the floating plate comprises a first connecting portion slidably and rotatably connected to the first auxiliary portion,
   wherein during unfolding of the foldable mechanism, the first auxiliary portion slides and rotates relative to the first connecting portion to drive the floating plate to float relative to the base, and
   wherein during folding of the foldable mechanism, the first auxiliary portion slides and rotates relative to the first connecting portion to drive the floating plate to sink relative to the base.

2. The foldable terminal of claim 1, wherein the first auxiliary portion is provided with a first auxiliary groove having a folded position and a flattened position, wherein the folded position of the first auxiliary groove is located on a top side of the flattened position of the first auxiliary groove, wherein the first connecting portion comprises a first pin mounted in the first auxiliary groove and slidable and rotatable relative to the first auxiliary portion in the first auxiliary groove, wherein when the foldable mechanism is in a folded state, the first pin is located at the folded position of the first auxiliary groove, and wherein when the foldable mechanism is in a flattened state, the first pin is located at the flattened position of the first auxiliary groove.

3. The foldable terminal of claim 2, wherein the foldable mechanism further comprises:
   a second fixed frame; and
   a second secondary swing arm, comprising:
      a second sliding portion slidably connected to the second fixed frame;
      a second auxiliary portion; and
      a second rotating portion fixedly connected between the second sliding portion and the second auxiliary portion, and rotatably connected to the base,
   wherein the floating plate further comprises a second connecting portion slidably and rotatably connected to the second auxiliary portion,
   wherein during unfolding of the foldable mechanism, the second auxiliary portion slides and rotates relative to the second connecting portion to drive the floating plate to float relative to the base, and
   wherein during folding of the foldable mechanism, the second auxiliary portion slides and rotates relative to the second connecting portion to drive the floating plate to sink relative to the base.

4. The foldable terminal of claim 3, wherein the second auxiliary portion is provided with a second auxiliary groove having a folded position and a flattened position, wherein the folded position of the second auxiliary groove is located on a top side of the flattened position of the second auxiliary groove, wherein the second connecting portion comprises a second pin mounted in the second auxiliary groove and slidable and rotatable relative to the second auxiliary portion in the second auxiliary groove, wherein when the foldable mechanism is in the folded state, the first pin is located at the folded position of the first auxiliary groove, and wherein when the foldable mechanism is in the flattened state, the first fixed frame and the second fixed frame are located on two opposite sides of the base, and the first pin is located at the flattened position of the first auxiliary groove.

5. The foldable terminal of claim 3, wherein the foldable mechanism further comprises:
   a first pressing plate slidably and rotatably connected to the first fixed frame, wherein the first pressing plate comprises a first function portion that is slidably and rotatably connected to the first sliding portion; and
   a second pressing plate slidably and rotatably connected to the second fixed frame, wherein the second pressing plate comprises a second function portion that is slidably and rotatably connected to the second sliding portion,
   wherein during unfolding of the foldable mechanism, the first sliding portion slides and rotates relative to the first function portion, and the second sliding portion slides and rotates relative to the second function portion, to drive the first pressing plate and the second pressing plate to be unfolded relative to each other, and
   wherein during folding of the foldable mechanism, the first sliding portion slides and rotates relative to the first function portion, and the second sliding portion slides and rotates relative to the second function portion, to drive the first pressing plate and the second pressing plate to be folded relative to each other.

6. The foldable terminal of claim 5, wherein when the foldable mechanism is in the flattened state, a) the first pressing plate and the second pressing plate are located on two opposite sides of the base, b) a top surface of the first pressing plate, a top surface of the second pressing plate, and a top surface of the floating plate are flush, and c) the top surface of the first pressing plate, the top surface of the second pressing plate, and the top surface of the floating plate form a support surface.

7. The foldable terminal of claim 6, wherein the foldable mechanism further comprises:
   a damping member fixedly connected to the base;
   a first damping swing arm, comprising:
      a rotating portion rotatably connected to the damping member; and
      a sliding portion slidably and rotatably connected to the first fixed frame; and
   a second damping swing arm, comprising:
      a rotating portion rotatably connected to the damping member; and a sliding portion slidably and rotatably connected to the second fixed frame.

8. The foldable terminal of claim 7, wherein a support portion of the first damping swing arm is fixedly connected to a side of the rotating portion of the first damping swing arm away from the sliding portion of the first damping swing arm, and a support portion of the second damping swing arm is fixedly connected to a side of the rotating portion of the second damping swing arm away from the sliding portion of the second damping swing arm, and wherein when the foldable mechanism is in the flattened state, both the support portion of the first damping swing arm and the support portion of the second damping swing arm abut against a bottom surface of the floating plate.

9. The foldable terminal of claim 7, wherein a center of rotation of the first rotating portion relative to the base is a first center, wherein a center of rotation of the first damping swing arm relative to the base is a second center, and wherein the first center and the second center being are spaced apart from each other.

10. The foldable terminal of claim 5, wherein the foldable mechanism further comprises:
    a first main swing arm, comprising:
        a rotating portion that is rotatably connected to the first fixed frame; and
        a sliding portion that is slidably and rotatably connected to the base; and
    a second main swing arm, comprising:
        a rotating portion that is rotatably connected to the second fixed frame; and
        a sliding portion that is slidably and rotatably connected to the base.

11. The foldable terminal of claim 10, wherein when the foldable mechanism is in the flattened state, both the sliding portion of the first main swing arm and the sliding portion of the second main swing arm abut against a bottom surface of the floating plate.

12. The foldable terminal of claim 11, wherein the sliding portion of the first main swing arm is provided with a first support groove, the sliding portion of the second main swing arm is provided with a second support groove, and the floating plate comprises a first support portion and a second support portion, and wherein when the foldable mechanism is in the flattened state, a groove wall of the first support groove abuts against a bottom surface of the first support portion, and a groove wall of the second support groove abuts against a bottom surface of the second support portion.

13. The foldable terminal of claim 5, wherein when the foldable mechanism is in the folded state, a) the first fixed frame and the second fixed frame are folded relative to each other, b) the first pressing plate and the second pressing plate are folded relative to each other, and c) the first fixed frame, the second fixed frame, the first pressing plate, the second pressing plate, and the floating plate are enclosed to form an avoidance space, wherein a cross section of the avoidance space is in a shape of a water drop.

14. The foldable terminal of claim 1, wherein the base is provided with a limiting hole, wherein the floating plate further comprises a limiting portion, and wherein the limiting portion is mounted in the limiting hole and slidable relative to the base in the limiting hole.

15. A foldable terminal, comprising:
    a first housing;
    a second housing; and
    a foldable mechanism connected between the first housing and the second housing, the foldable mechanism comprising:
        a base;
        a first fixed frame;
        a first secondary swing arm, comprising:
            a first sliding portion that is slidably connected to the first fixed frame; and
            a first rotating portion fixedly connected to the first sliding portion, and rotatably connected to the base; and
        a first pressing plate slidably and rotatably connected to the first fixed frame, wherein the first pressing plate comprises a first function portion that is slidably and rotatably connected to the first sliding portion,
        wherein during unfolding or folding of the foldable mechanism, the first sliding portion slides and rotates relative to the first function portion to drive the first pressing plate to rotate relative to the base.

16. The foldable terminal of claim 15, wherein the first function portion is provided with a first function groove having a folded position and a flattened position, wherein the folded position of the first function groove is located on an inner side of the flattened position of the first function groove, wherein the first sliding portion comprises a first pin shaft mounted in the first function groove and slidable and rotatable relative to the first function portion in the first function groove, wherein when the foldable mechanism is in a folded state, the first pin shaft is located at the folded position of the first function groove, and wherein when the foldable mechanism is in a flattened state, the first pin shaft is located at the flattened position of the first function groove.

17. The foldable terminal of claim 16, wherein the first function groove is an arc-shaped groove.

18. The foldable any one terminal of claim 16, wherein the foldable mechanism further comprises:
    a second fixed frame;
    a second secondary swing arm, comprising:
        a second sliding portion slidably connected to the second fixed frame; and
        a second rotating portion fixedly connected to the second sliding portion and rotatably connected to the base; and
    a second pressing plate slidably and rotatably connected to the second fixed frame, the second pressing plate comprising a second function portion that is slidably and rotatably connected to the second sliding portion,
    wherein during unfolding or folding of the foldable mechanism, the second sliding portion slides and rotates relative to the second function portion to drive the second pressing plate to rotate relative to the base.

19. The foldable terminal of claim 18, wherein the second function portion is provided with a second function groove having a folded position and a flattened position, wherein the folded position of the second function groove is located on an inner side of the flattened position of the second function groove, wherein the second sliding portion comprises a second pin shaft mounted in the second function groove and slidable and rotatable relative to the second function portion in the second function groove, wherein when the foldable mechanism is in the folded state, the second pin shaft is located at the folded position of the second function groove, and wherein when the foldable mechanism is in the flattened state, the second pin shaft is located at the flattened position of the second function groove.

20. The foldable terminal of claim 18, wherein the foldable mechanism further comprises a floating plate located on a top side of the base, and wherein when the foldable mechanism is in the flattened state, a) the first pressing plate and the second pressing plate are located on two opposite sides of the base, b) a top surface of the floating plate, a top surface of the first pressing plate, and a top surface of the second pressing plate are flush, and c) the top surface of the first pressing plate, the top surface of the second pressing plate, and the top surface of the floating plate form a support surface.

\* \* \* \* \*